(12) United States Patent
Russ et al.

(10) Patent No.: US 9,120,908 B2
(45) Date of Patent: Sep. 1, 2015

(54) NANOMATERIAL-REINFORCED RESINS AND RELATED MATERIALS

(75) Inventors: Richard Russ, Honolulu, HI (US); Mehrdad Ghasemi-Nejhad, Honolulu, HI (US); Atul Tiwari, Honolulu, HI (US); Anupama Chaturvedi, Honolulu, HI (US); David A. Hummer, Honolulu, HI (US); Vamshi Gudapati, Honolulu, HI (US)

(73) Assignee: UNIVERSITY OF HAWAII, Honolulu, HI (US)

( * ) Notice: Subject to any disclaimer, the term of this patent is extended or adjusted under 35 U.S.C. 154(b) by 1079 days.

(21) Appl. No.: 13/073,040

(22) Filed: Mar. 28, 2011

(65) Prior Publication Data

US 2011/0245378 A1 Oct. 6, 2011

Related U.S. Application Data

(60) Provisional application No. 61/317,852, filed on Mar. 26, 2010, provisional application No. 61/415,470, filed on Nov. 19, 2011, provisional application No. 61/453,732, filed on Mar. 17, 2011.

(51) Int. Cl.
*C08K 3/04* (2006.01)
*C08K 5/20* (2006.01)
*C08K 7/24* (2006.01)
*C08L 79/08* (2006.01)

(52) U.S. Cl.
CPC ... *C08K 3/04* (2013.01); *C08K 7/24* (2013.01); *C08K 2201/011* (2013.01); *C08L 79/08* (2013.01)

(58) Field of Classification Search
USPC .......................................................... 524/495
See application file for complete search history.

(56) References Cited

U.S. PATENT DOCUMENTS

| | | | |
|---|---|---|---|
| 431,644 A | 7/1890 | Buhoup | |
| 4,269,968 A | 5/1981 | Duran et al. | |
| 4,996,270 A | 2/1991 | Czauderna et al. | |
| 5,164,464 A | 11/1992 | Hefner, Jr. et al. | |
| 6,320,019 B1 | 11/2001 | Lee et al. | |
| 6,869,581 B2 | 3/2005 | Kishi et al. | |
| 6,875,274 B2 | 4/2005 | Wong et al. | |
| 6,934,600 B2 | 8/2005 | Jang et al. | |
| 7,071,258 B1 | 7/2006 | Jang et al. | |
| 7,390,474 B2 | 6/2008 | Suzuki et al. | |
| 7,658,870 B2 * | 2/2010 | Nejhad et al. | 252/511 |
| 7,807,127 B1 | 10/2010 | Forohar et al. | |
| 7,824,651 B2 | 11/2010 | Zhamu et al. | |
| 8,129,463 B2 * | 3/2012 | Mao et al. | 524/496 |
| 2005/0127329 A1 | 6/2005 | Wang et al. | |
| 2006/0183841 A1 | 8/2006 | Aneja et al. | |
| 2007/0128960 A1 | 6/2007 | Ghasemi Nejhad et al. | |
| 2009/0001326 A1 | 1/2009 | Sato et al. | |
| 2009/0093611 A1 * | 4/2009 | Yang et al. | 528/421 |
| 2009/0297948 A1 | 12/2009 | Dahn et al. | |
| 2010/0059718 A1 | 3/2010 | Ma et al. | |
| 2010/0240804 A1 * | 9/2010 | Irwin et al. | 523/216 |

FOREIGN PATENT DOCUMENTS

| | | |
|---|---|---|
| CN | 101115791 | 1/2008 |
| WO | WO 0069958 | 11/2000 |
| WO | WO 2005/028174 | 3/2005 |
| WO | WO 2006/086369 | 8/2006 |
| WO | WO 2007/010517 | 1/2007 |
| WO | WO 2007/115162 | 10/2007 |
| WO | WO 2008/060294 | 5/2008 |
| WO | WO 2010/107763 | 9/2010 |

OTHER PUBLICATIONS

Rafiee et al., ACSNANO, 3, 12, 3884-3890, 2009.*
Rafiee et al., Small, 6, 2, 179-183, 2010.*
Sandler et al., Polymer, 44, 5893-5899, 2003.*
U.S. Appl. No. 10/679,871, filed Oct. 6, 2003, Barbara Chabut.
U.S. Appl. No. 11/720,791, filed Jun. 4, 2007, Horst Grafmans.
U.S. Appl. No. 12/589,897, filed Oct. 30, 2009, David O'Hara.
U.S. Appl. No. 61/323,999, filed Apr. 14, 2010, Atul Tiwari.
Kim et al., "Graphene/Polymer Nanocomposites", Macromolecules, Jun. 2010, 43, 6515-6530.
Rafiee et al., "Enhanced Mechanical Properties of Nanocomposites at Low Graphene Content", ACSNANO, Nov. 2009, 3(12), 3884-3890.
Rafiee et al., "Fracture and Fatigue in Graphene Nanocomposites", 2010, 6(2), 179-183.
Sandler et al., "Ultra-low electrical percolation threshold in carbon-nanotube-epoxy composites", Polymer, Apr. 2003, 44, 5893-5899.
Australian Patent Application No. 2011230532: Office Action dated Feb. 6, 2014, 8 pages.
"Composites Basics: Materials", Aug. 16, 2005, http://replay.web.archive.org/20081119160138/http://www.mdacomposities.org/mda/psgbridge_CB_print_materials.htm, accessed May 19, 2011, 17 pages.
"MSDS Material Safety Data Sheet, N, N-Dimethylacetamide", Aug. 16, 2005, http://www.jtbaker.com/msds/englishhtml/d5784.htm, accessed May 19, 2011, 8 pages.
Allaoui et al., "Mechanical and electrical properties of a MWNT/epoxy composite", Composites Science and Technology, 2002, 62, 1993-1998.
Pötschke et al., "Thermoplastic Polyurethane Filled with Carbon Nanotubes for Electrical Dissipative and Conductive Applications", KGK, Sep. 2007, 432-437.

* cited by examiner

*Primary Examiner* — Hui Chin
(74) *Attorney, Agent, or Firm* — Baker & Hostetler LLP

(57) ABSTRACT

Provided are nanomaterial-reinforced resin compositions and related methods. The compositions include a reinforcing material, such as graphene, polyamic acid, carbon nanotubes, or dimethylacetamide that is dispersed into a resin. The reinforcing material is present in the resin at from about 0.001 to about 10 wt %. Also provided are methods of fabricating these compositions and methods of tailoring a composition to achieve a particular set of mechanical properties.

16 Claims, 84 Drawing Sheets

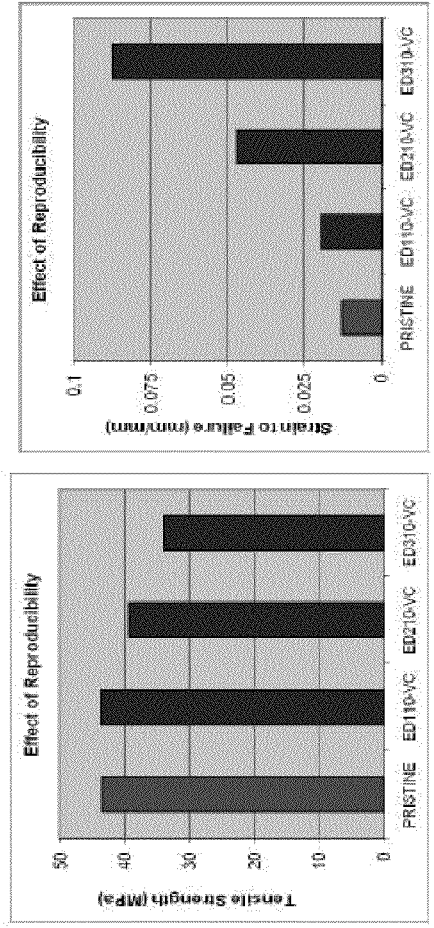
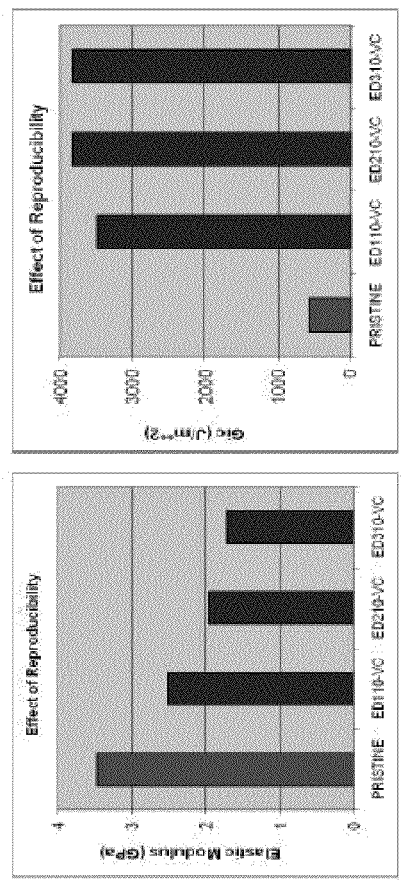
Figure 22A
Figure 22B
Figure 22C
Figure 22D a) Pristine Resin b) Strongest Nanoresin with Optimum Nanomaterials c) Strongest Nanoresin when the Nanomaterials percentage exceeds the optimum value a) Pristine Resin b) Strongest Nanoresin c) Toughest Nanoresin Properties of vinyl ester resin

| Color | Styrene content | Specific gravity @25°C | VOC content | Physical state | Self life |
|---|---|---|---|---|---|
| Blue | 43 wt% | 1.04-1.12 | 486 gm/l | liquid | 3-5 months @ 25 °C |

Chemical structure of vinyl ester resin a)

b)

a)

b)

c)

a)

b)

a)

b)

c)

a)

b)

NANOMATERIAL-REINFORCED RESINS AND RELATED MATERIALS

RELATED APPLICATIONS

The present application claims the benefit of U.S. 61/317,852 (filed Mar. 26, 2010), U.S. 61/415,470 (filed Nov. 19, 2010), and U.S. 61/453,732 (filed Mar. 17, 2011). These applications are incorporated herein by reference in their entireties for all purposes.

TECHNICAL FIELD

The present disclosure relates to the fields of nanoscale materials and to the field of resin compositions.

BACKGROUND

Existing advanced composite materials used in, for example, aerospace structures and aeronautical applications do not satisfy the performance demands of those and other applications. Accordingly, there is a need for reinforced composite materials having improved mechanical properties, such as higher ultimate strength, strain-to-failure, fracture toughness, fatigue life, impact resistance, damage tolerance, damping and other advantages. There is also a related need for methods of fabricating such improved materials.

SUMMARY

In a first aspect, the present invention provides compositions, the compositions including a resin having a reinforcement dispersed within, the reinforcement comprising graphene bodies, polyamic acid, carbon nanotubes, a reinforcing solvent, or any combination thereof, and the reinforcement being present at from about 0.001 to about 10 wt % based on the total weight of the composition.

Also provided are methods of forming a composition, comprising contacting a reinforcement comprising at least one of (a) graphene bodies, (b) polyamic acid, (c) an amide, or (d) carbon nanotubes, with at least one resin so as to form a precursor mixture having the reinforcement present at from about 0.001% to about 1.0% by weight of the precursor mixture.

Further disclosed are methods of synthesizing a reinforced resin composition, comprising selecting at least one resin from the group consisting of epoxies, polyesters, and vinylesters; selecting at least one reinforcement material from the group consisting of graphene, carbon nanotubes, polyamic acids, and amides; and dispersing the at least one reinforcement material into the at least one resin so as to form a reinforced resin composition in which the reinforcement is present at from about 0.001% to about 1.0% by weight of the reinforced resin composition.

Additionally provided are cured nanocomposite materials. These materials comprise cured resin; and nanoparticles dispersed throughout the cured nanocomposite material, wherein the weight fraction of nanoparticles is in the range of from about 0.0005 wt % to less than about 1 wt % based on total weight of the cured nanocomposite resin.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings:

FIG. 22 illustrates the reproducibility for DMAC nanoresins a) ultimate tensile strength. b) strain-to-failure. c) elastic modulus. d) fracture toughness;

DETAILED DESCRIPTION OF ILLUSTRATIVE EMBODIMENTS

Figure 1:
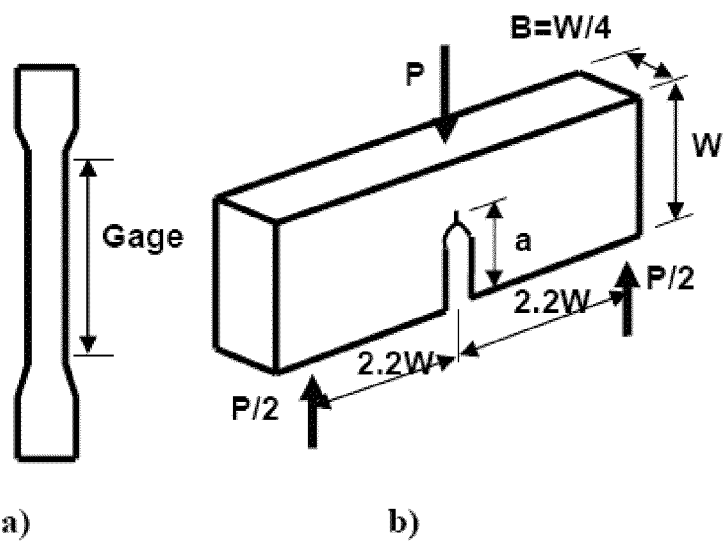
FIG. 1 illustrates schematics of test samples a) tensile tests, and b) SENB tests.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise.

The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

A variety of patents and other publications are mentioned herein. Each of these is incorporated herein by reference in its entirety for any and all purposes.

In a first aspect, the present disclosure provides compositions. The compositions suitably include a resin having a reinforcement dispersed within. The reinforcement is suitably graphene bodies, polyamic acid, carbon nanotubes, a reinforcing solvent, or combinations of these.

A variety of resins may be used in the disclosed compositions. Epoxies, vinylesters, and polyesters are all considered suitable. Epoxies (generally referring to the product of the reaction between an epoxide and a polyamine) are considered especially suitable. One illustrative epoxy is an epoxy based on diglycidyl ether of bisphenol A and alkylglycidyl ether.

Vinylesters and polyesters are also suitable for the disclosed compositions. A variety of vinylesters may be used. The Hydrex™ vinyl ester system from Reichhold is one suitable vinylester. Vipel and Ashland are also suitable commercial producers of vinylesters. Other vinylester compositions are described in U.S. Pat. No. 4,31,644, U.S. Pat. No. 5,164,464, U.S. application Ser. No. 10/679,871, U.S. Pat. No. 4,996,270, each of which is incorporated herein by reference.

Suitable polyesters include (but are not limited to) polyglycolide, polylactic acid, polycaprolactone, Polyethylene adipate (PEA), Polyhydroxyalkanoate (PHA), polyethylene terephtalate (PET), polybutylene terephthalate (PBT), polytrimethylene terephthalate (PTT), polyethylene naphthalate (PEN), and aromatic polyesters are all suitable for use in the disclosed compositions. One exemplary polyester is Hexion 712-3765 (www.hexion.com; available from Momentive); exemplary embodiments using this polyester are described elsewhere herein. A non-exhaustive list of polyester suppliers includes Ashland, Reichhold, AOC (www.aoc-resins.com), DSM (www.dsm.com), and Total (www.total.com).

The foregoing list of resins should not be understood as limiting the scope of the present disclosure. Any of the foregoing resins (epoxy, vinylester, and polyester) may be present as a copolymer (graft, block, random, alternating, periodic).

A variety of other resins (including thermosets and thermoplastics) may be used with the disclosed reinforcement materials. Polyethylene, PMMA, polystyrene, polypropylene, maleimides, and the like are all suitable resin candidates. Virtually any resin will exhibit enhanced mechanical properties as a result of the disclosed reinforcement materials and methods.

Turning to reinforcement materials, the materials may include a reinforcing solvent. Without being bound to any single theory, the use of a reinforcing solvent confers a mechanical toughness on the resultant composition.

Reinforcing solvents may include one or more of a number of species. Volatile polar protic solvents are one type of useful reinforcing solvent. A nonexclusive listing of such solvents includes formic acid, methanol, ethanol, n-propanol, isopropanol, n-butanol, acetic acid, and water are considered suitable. As described elsewhere herein, the inclusion of a reinforcing solvent in a resin confers toughness on the resultant composition. Aprotic solvents, such as acetone, tetrahydrofuran (THF), dichloromethane (DCM), dimethylformamide (DMF), dimethylsulfoxide (DMSO), dimethylacetamide (DMAC), ethyl acetate, and n-methylpyrrolidone (NMP) are all considered suitable. DMAC is especially suitable for the disclosed compositions, and the exemplary embodiments provided herein characterize DMAC-containing resins. Other acetamides, including N,N disubstituted acetamides are also suitable.

The reinforcing solvent may also be a non-polar solvent. Suitable non-polar solvents include toluene, hexane, 1,4-dioxane, and diethylether. Chloroform may also be used as a non-polar solvent in the disclosed compositions and methods.

Polyamic acids are also suitable reinforcing materials. Without being bound to any particular theory of operation, the inclusion of polyamic acid in the disclosed compositions confers mechanical toughness on the resultant composition.

A variety of polyamic acids may be used as reinforcement materials. A partial listing of suitable acids includes: pyromellitic dianhydride-4,4'-oxydianiline, 3,3',4,4'-diphenylsulfone tetracarboxylic dianhydride-4,4'-oxidianiline, 2,2'-Bis-(3,4-dicarboxyphenyl)hexafluoropropane dianhydride-oxydianiline, 3,3',4,4'-biphenyltetracarboxylic dianhydride-4,4'-oxydianiline, 4,4'-oxydiphthalic anhydride-4,4'-oxydianiline, 4,4'-bisphenol A dianhydride-4,4'-oxydianiline, ethylene glycol bis(trimellitic anhydride)-4,4'-oxydianiline, and the like. The foregoing is a non-exclusive list and should not be read to limit the polyamic acids that may be used in the disclosed compositions.

The reinforcement is suitably distributed uniformly within the resin, though this is not required. The composition may include two or more regions of differing reinforcement dispersion (e.g., a first region with a comparatively high concentration of reinforcement, and a second region with a comparatively lower concentration of reinforcement).

Regarding graphene bodies as reinforcements, graphene bodies that have a cross-sectional dimension in the range of from about 0.1 nm to about 500 nm, or even from about 1 nm to about 100 nm, or even from about 5 nm to about 50 nm are considered especially suitable. The graphene bodies may be of virtually any shape; they may be plate-like, rod-like, or even block-like. A graphene body may have an aspect ratio (e.g., ratio of length to width, or ratio of height to length) in the range of from about 1:20,000, or from about 10:10,000, or from about 20:5000, or from about 50:1000, or even about 100:500.

The graphene reinforcement bodies may also be multilayered. A graphene body may include 1, 2, 5, 10, 20, 50, 100, 200, 500, or even more layers. The graphene may also be functionalized (i.e., bear one or more functional groups). A graphene body may include a hydroxyl group, a carboxyl group, a carbonyl group, an epoxy group, or any combination thereof. Carboxyl-bearing graphene is considered particularly suitable. Graphene may be purchased commercially. Sources of graphene include Graphene Industries (www.grapheneindustries.com), Graphene Solutions (www.graphenesolutions.com), and other providers known to those in the art.

Alternatively, the user may manufacture graphene. Methods for making graphene include the well-known Hummers method. Other methods of making graphene are described herein in more detail below.

Other suitable reinforcement materials include carbon nanotubes and other materials listed in U.S. Pat. No. 7,658,870, which patent is incorporated herein by reference in its entirety. Those materials may be inorganic in nature, and include $TiO_2$, ZnO, SiC, and $Y_2O_3$. Such materials suitably have at least one dimension (e.g., diameter) of about 100 nm or less, although this is not a requirement. Carbon nanotubes used as reinforcing materials may be standard (i.e., substantially or entirely free of functional groups). Alternatively, the carbon nanotubes may be functionalized (e.g., via acid treatment). Carbon nanotubes may bear carboxyl groups (e.g., U.S. Pat. No. 7,807,127, incorporated herein by reference). Alcohol groups, amino groups, and other functional groups may be present on the carbon nanotubes.

Any combination of the foregoing resins and reinforcement materials is considered suitable. Some compositions may include two or more resins. Compositions may also include multiple reinforcement materials. For example, a composition may include graphene bodies and dimethylacetamide. Similarly, a composition may also include polyamic acid along with an amide, such as dimethylacetamide. A composition may include polyester, graphene, and polyamic acid. As described elsewhere herein, the user may tailor the resin and reinforcement materials to achieve a final composition that has a particular mechanical properties profile. For example, a combination of epoxy and graphene may exhibit particular strength.

When the resin is a vinylester, carbon nanotubes are considered an especially suitable reinforcement. These compositions may also include dimethylacetamide as a solvent. Polyester resins used with polyamic acid reinforcement material are also suitable compostions. The use of graphene together with polyester resin is especially suitable. Epoxy resin used with graphene is also suitable; the composition may additionally contain polyamic acid, dimethylacetamide, or both. Where graphene bodies are chosen as the reinforcement material, the bodies may be of virtually any (rod, plate, sheet, chunk, block) shape. Exemplary graphene forms are described in U.S. Pat. No. 7,071,258, U.S. Pat. No. 6,869,581, and U.S. application Ser. No. 12/589,897, incorporated by reference herein in their entireties.

The reinforcement is suitably present at from about 0.001 wt % to about 10 wt % based on the total weight of the composition, although the reinforcement may even be present as low as about 0.0005 wt % or even about 1.5 wt %, about 2 wt %, about 3 wt %, or even about 5 wt % in some embodiments. Other suitable weight percentages based on total weight of the composition can be as low as 0.0005 wt % up to any one of the following weight percentages: 0.002, 0.005, 0.008, 0.01, 0.02, 0.05, 0.08, 0.1, 0.2, 0.5, 0.8, 1 and 1.2 wt %. It has been discovered that the presence of the reinforcement at these weight percentages provides results that are both surprising and also superior as compared to existing and to state-of-the-art resin materials.

For some DMAC and polyamic acid-containing materials, the reinforcement material is suitably present in the range of from about 0.1 to 10 wt %, or even from about 2 to about 3 wt % when polyester and vinylesters serve as the resin. In embodiments where epoxy is the resin, a reinforcement material is suitably present at from about 5 to about 7 wt %. As discussed elsewhere herein, DMAC and polyamic acid (along with other reinforcing solvents) confer mechanical toughness on the resultant compositions.

Other reinforcement materials confer mechanical strength on the resulting compositions. These strengthening materials include nanoparticles (including nanodiamonds). Loadings of about 0.001 to 1 wt %, or even about 0.2 wt % are considered suitable for nanoparticles. Other suitable weight percentages based on total weight of the composition can be as low as 0.0005 wt % up to any one of the following weight percentages: 0.002, 0.005, 0.008, 0.01, 0.02, 0.05, 0.08, 0.1, 0.2, 0.5, and 0.8 wt %. Carbon nanotubes also confer strengthening on resin compositions. The nanotubes are suitably present in the range of from about 0.01 to about 1 wt %; a loading of about 0.02 wt % is particularly suitable.

Graphene sheets are also suitable reinforcement materials. Where the graphene reinforces polyester or vinyl ester, the graphene is suitably present in the range of from about 0.001 to about 1 wt %, and even more suitably at about 0.002 wt %. Where graphene reinforces epoxy, the graphene may suitably be present in the range of from about 0.001 to about 1 wt %, and even more suitably at about 0.006 wt %. Other suitable weight percentages based on total weight of the composition can be as low as 0.0005 wt % up to any one of the following weight percentages: 0.002, 0.005, 0.008, 0.01, 0.02, 0.05, 0.08, 0.1, 0.2, 0.5, and 0.8 wt %.

While graphene, nanoparticles, and carbon nanotubes are referred to herein as strengthening reinforcements, it is to be understood that graphene, nanoparticles, and carbon nanotubes do also act to toughen the resultant compositions. In some embodiments, the graphene, nanoparticles, and carbon nanotubes may not toughen the compositions as efficiently as polyamic acid or DMAC, but the graphene, nanoparticles, and carbon nanotubes do nonetheless strengthen the resultant compositions.

The resin in the disclosed compositions is suitably cured. In some embodiments, however, the resin may be in an uncured or only partially cured state. It is to be understood that the present disclosure includes both intermediates (i.e., compositions where the resin is not cured or is only partially cured) and final compositions that include cured resin.

Compositions may also include other reinforcements, such as fibers, rebar, fiberglass, and the like. Glass fiber and carbon fiber are considered especially suitable reinforcement materials, particularly for marine and aerospace applications, however these applications do not necessarily require glass fiber, carbon fiber, or both.

Integration of the reinforcement material effects significant improvements in the resin's mechanical properties, as described in additional detail in the examples below. Inclusion of the reinforcement improves at least one of tensile strength, strain-to-failure, fracture toughness, critical stress intensity factor, critical strain energy release rate, damping factor, or elastic modulus of the composition by from about 1% to about 600% relative to resin that is essentially free of reinforcement. This may be observed in compositions where the reinforced and non-reinforced resins have been cured. The relative improvement may be in the range of from 10% to about 100%, or even in the range of from 20% to about 50%.

The inclusion of the reinforcement also alters at least one of tensile strength, strain-to-failure, fracture toughness, critical stress intensity factor, critical strain energy release rate, damping factor, or elastic modulus of a carbon fiber-containing composition according to the present disclosure by an amount in the range of from about 10% to about 250% relative to the so-called "pristine" carbon fiber resin that is essentially free of reinforcement.

The present disclosure also provides methods of forming compositions. These methods include contacting a reinforcement comprising at least one of (a) graphene bodies, (b) polyamic acid, (c) a reinforcing solvent, or (d) carbon nanotubes, with at least one resin so as to form a precursor mixture having the reinforcement present in the range of from about 0.001% to about 10% by weight of the precursor mixture.

Suitable resins include epoxies, polyesters, and vinylesters, as described elsewhere herein. The resin may also be a thermoset or a thermoplastic, as described above.

The reinforcing materials may be combined, dispersed, or even mixed with a first solvent. The solvent may be an acetamide, an alcohol, or both. N,N disubstituted amides are considered particularly suitable, including dimethylacetamide (DMAC).

The first solvent may be present so as to comprise from about 0.1% to about 10% of the weight of the precursor mixture, or even from about 0.5% to about 1% of the weight of the precursor mixture.

Reinforcement materials may be dispersed in the first solvent by a variety of means. Mixing, sonication, shaking, and the like may all be used to disperse the reinforcement material in the first solvent. Once dispersed in the first solvent, the reinforcement material may then be mixed with the resin. In other embodiments, the reinforcement material is dispersed directly into the resin.

When the reinforcement is graphene bodies, the graphene bodies are suitably present at from about 0.001% to about 0.1% by weight of the precursor mixture. Suitable graphene bodies are described elsewhere herein. Suitable polyamic acids, carbon nanotubes, and reinforcement solvents are also described elsewhere herein.

The user may also employ a second solvent. The second solvent may be added to the first solvent, added to the resin, or even added to the resin-reinforcement mixture. The second solvent includes methyl ethyl ketone, diaryl peroxide, dialkyl peroxides, ketone peroxide, a perester, a diacylperoxide, a hydroperoxide, and the like.

The precursor mixture is suitably cured. The curing cycle may be performed according to the resin manufacturer's specifications. Curing may take place for less than about 24 hours, less than 12 hours, less than 5 hours, or even less than 1 hour.

In some embodiments—including the exemplary methods described below—the curing includes exposing the precursor mixture to a first temperature for a first time period and a second temperature for a second time period. The first and second temperatures may differ from each other; they may differ by at least about 5 degrees C., 10 degrees C., 25 degrees C., 50 degrees C., or even more. As described below, cure cycles can involve two (or more) temperature exposures.

The duration of the temperature exposures may be the same or different. The durations of exposure can differ from one another by from about 1 minute to about 20 hours, or even by from about 60 minutes to about 10 hours. Exemplary, non-limiting curing cycles are described in the appended examples. Curing may be performed in an autoclave, a convection oven, or both.

A cure temperature may be fairly moderate; materials may be cured at room temperature or at only about 30 degrees C. Curing may also occur at higher temperatures, such as 80 degrees C., 100 degrees C., 120 degrees C., or even 150, 200, or even 250 degrees C.

The present disclosure also provides methods of synthesizing reinforced resin compositions. The methods include selecting at least one resin from the group consisting of epoxies, polyesters, and vinylesters; selecting at least one reinforcement material from the group consisting of graphene, carbon nanotubes, reinforcement solvents, polyamic acids, and dispersing the at least one reinforcement material into the at least one resin so as to form a reinforced resin composition in which the reinforcement is present at from about 0.001% to about 10% by weight of the reinforced resin composition.

Suitable epoxies, polyesters, and vinylesters are described elsewhere herein. Suitable reinforcement materials are also described elsewhere herein. Reinforcement materials selected from the group consisting of graphene, polyamic acids, and disubstituted amides (such as N,N disubstituted amides) are considered especially suitable In some embodiments, the user may select the at least one resin, the at least one reinforcement material, or both, based on an estimate of one or more mechanical properties of the reinforced resin composition that includes the selected at least one resin, the selected at least one reinforcement material, or both. This enables the user to apply a system for synthesizing a composition having the desired mechanical property set. The estimate may be present in a table or other representation. The estimate may be present on a computer-readable medium, such as a USB drive or computer hard drive.

One such example is set forth below in the form of a tunability matrix. By evaluating the mechanical properties of a variety of compositions, the user can determine which resins, reinforcement materials, and processing conditions combine to produce a composition having the desired set of mechanical properties.

The user may also cure the reinforced resin composition. Suitable curing cycles are described elsewhere herein; the curing may entail exposing the composition to two (or more) different temperatures for two (or more) different durations.

Also provided are cured nanocomposite materials. These materials include a cured resin and nanoparticles dispersed throughout the cured nanocomposite material, wherein the weight fraction of nanoparticles is in the range of from about 0.0005 wt % to less than about 0.1 wt % based on total weight of the cured nanocomposite resin.

The cured resin may include a number of different materials. A non-exclusive listing of such materials includes vinyl esters, polyesters, epoxies, polyethylenes, polystyrenes, polypropylenes, and the like. Vinyl esters, polyesters, and epoxies are considered especially suitable for the disclosed compositions.

The nanoparticles suitably have a cross-sectional dimension in the range of from about 1 nm to about 1000 nm, or from about 20 nm to about 500 nm, or from about 50 nm to about 200 nm, or even about 100 nm. The nanoparticles may comprise a variety of materials, including SiC, $TiO_2$, $Y_2O_3$, carbon, Au, Ag, Cu, Ge, Pt, Fe, CoPt, PbS, CdS, CdSe, CdTe, ZnO, PbSe, ZnSe, montmorillonite, vermiculite, hectorite, $CaCO_3$, ferric oxide, and the like. SiC, $TiO_2$, $Y_2O_3$, and carbon are considered especially suitable nanoparticles.

Without being bound to any particular theory, the nanoparticles confer improved mechanical properties on the cured nanocomposite materials. A cured nanocomposite according to the present disclosure is characterized as having at least one of: tensile strength, toughness, strain energy release rate, modulus, strain-to-failure, or damping factor that is at least 50% higher than the corresponding property of the resin cured with no nanoparticles. The property may be from 50% to 600% higher, or from 70% to 500% higher, or from 80% to 200% higher than the corresponding property of the resin cured with no nanoparticles. Damping is the dissipation of vibrational energy under cyclic loading. Damping factor is a measure of the ability of the material or structure to damp out the vibration as fast as possible. The higher the damping factor is for a material, the faster the imposed vibration damps out within a given time interval (normally measured in milliseconds), to reduce the level of vibration to at least below 0.707× original amplitude in less than a second for a free vibration test.

The following are illustrative, non-limiting embodiments of the present invention. These embodiments should not be understood as limiting the present disclosure in any way.

Illustrative Embodiments

Composition Tunability

In one aspect, the present disclosure provides enhancements of the mechanical properties of a matrix phase by combining the matrix with other constituents that act as a reinforcing phase with the matrix and cause the matrix become either stronger or tougher or both.

It is to be understood that the embodiments described herein are illustrative only and do not limit the scope of the claimed invention. For example, while epoxy materials are among those materials characterized herein, the present invention is applicable to essentially any other polymeric system capable of having a reinforcing materials dispersed therein. Epoxies are considered especially suitable matrix materials based on their mechanical properties.

The illustrative reinforcing materials mentioned herein include acid treated (or functionalized) graphene sheets, graphene sheets, acid treated (or functionalized) single-walled carbon nanotubes, e.g., AT-SWCNTs, SWCNTs, poly (amic) acid, and Dimethylacetamide (DMA or DMAC), are not to be considered exclusive and may be used individually or in combination with one another. Other reinforcing materials are suitably incorporated into the inventive compositions, and the listing of materials here is not exhaustive. In addition to the individual usage of the materials, combinations of the referenced materials are also suitable.

Thermoset resins, such as epoxy, are useful in composite structural materials wherein high mechanical performance is desired. Many different efforts in improving mechanical properties of resins include the dispersion of rubber particles in the epoxy, although this method may reduce elevated temperature performance by lowering the glass transition temperature.

Structural reinforcements specifically in polymer composites depend on the ability to transfer load from the matrix to the reinforcing materials. The use of nanomaterials/nanotubes in composites for structural applications has, however, been disappointing, due to issues such as dispersion/agglomerations, alignment, and interfacial strength.

Three manufacturing parameters of interest include (1) nanomaterials, (2) nanomanufacturing, and (3) nanoprocessing. These examined in detail herein, and can be represented by a matrix as set forth below.

In one embodiment, the present application provides techniques to improve the toughness, ultimate tensile strength, and strain-to-failure of resin compositions. This may be accomplished by combining the resin (e.g., epoxy) with other constituents that act as a reinforcing phase.

To achieve these goals in producing tough materials, strong materials, or materials having both strength and toughness, i.e., to achieve tunability within the spectrum of "strongest" to "toughest"), several families of nanomaterials were considered: 1—Acid Treated (or functionalized) Graphene Sheets (Gr), reduced graphene, 2—Acid treated (or functionalized) Single-walled carbon nanotubes (AT-SWCNTs), 3—SWCNTs, 4—Polyamic acid (P), and 5—Dimethylacetamide ("DMA" or "DMAC"). The resin (e.g., epoxy) that results from the inclusion of these materials is, in some embodiments, referred to as tunable nanoresin.

In the case of DMAC and polyamic acid, these constituents may be combined with pristine epoxy resin and are fully soluble in each other. In the cases of functionalized Gr, acid treated SWCNTs, and SWCNTs, the constituents are combined with the pristine epoxy resin. Ethyl alcohol (which may be evaporated later in or after mixing) is useful as a solvent to disperse Gr as well as SWCNTs. DMAC is a suitable solvent for polyamic acid. A small amount of a fluorosurfactant agent (which may be evaporated later during the mixing) is useful with polyamic acid.

One parameter of interest is the effect of various nanomanufacturing techniques, which techniques include varying the weight percentages of the reinforcing phases, such as DMAC, polyamic acid, acid treated SWCNTs and Gr, as well as their preparation and dispersion/mixing within the resins to avoid agglomeration and achieve dispersion. The user's preferred loading of a reinforcing material varies among various nanomaterials and resins.

Another parameter of interest concerns the cure cycles (termed nanoprocessing) on the resultant products, as inclusion of nanomaterials alters the cure-kinetics of the resins and their cure cycles. The proposed reinforcing constituents provide substantial enhancements of fracture toughness, ultimate tensile strength, and strain-to-failure for the developed nanoresins. Depending on the (1) nanomaterials, (2) nanomanufacturing, and (3) nanoprocessing. Each of these three parameters has a number of sub-parameters (described elsewhere herein) that may be examined to yield a mathematical matrix that gives users sufficient parameters to achieve tenability of the properties. The combination of various sub-parameters (from various three main parameters, explained above) allows production of a nanoresin (explained elsewhere herein) that is tuned to a certain application due to its specific desired properties.

The present invention also provides processes for producing high performance nanoresins having a wide range of properties. Such nanoresins include strong resins, tough resins, or resins possessing both of these qualities.

Without being bound to any single theory of operation, we believe that three parameters contribute to achieving such an extra-ordinary tunable properties with substantial enhancements: (1) nanomaterials; (2) nanomanufacturing; and (3) nanoprocessing. As one example, a strong nanoresin having a high ultimate tensile strength (so-called "strongest" nanoresin) is suitable for continuous-fiber nanocomposite materials. The effects of the strongest nanoresin on the mechanical properties of the manufactured nanocomposites have been investigated utilizing unidirectional graphite fibers and plain weave E-glass fabric using various types of nanoresins.

It is to be understood that various samples are referred to herein as "strongest," "strong and tough," "toughest," and the like for the sake of convenience. These labels should not be understood as limiting the present disclosure in any way. For example, while a graphene-epoxy material was labeled "strongest" for purposes of the studies described herein, that should not be understood as specifying that no other material made according to the present disclosure could be stronger than that resin or that the graphene-epoxy resin could not be formulated or processed to possess mechanical toughness. These labels are for convenience only and are not to be construed as limiting the mechanical properties of any composition.

The characterization of the nanoresin mechanical properties is evaluated using tensile and fracture mechanics (using single-edge-notch-bend, SENB) test specimens. Tensile properties such as ultimate tensile strength, strain-to-failure, and elastic modulus are measured in accordance to ASTM D638 methods while, fracture properties such as strain energy release rate was calculated in accordance to ASTM standard D5045. Several specimens were tested for each family of the nanoresin materials using an Instron™ universal testing machine type 4200.

To demonstrate the percentages of mechanical property improvement, tests were performed on pristine epoxy as well as the resins incorporating reinforcement materials. These results demonstrate significant improvements in ultimate tensile strength, strain-to-failure, and strain energy release rate ($G_{IC}$).

Laminated structural composites suitably possess mechanical performance over a large range of temperatures. Micro-cracking in brittle epoxies at very small strain levels, however, restricts existing designs, resulting in increased weight for composite structures.

To address these issues, improved ductility as indicated by increased strain-to-failure and increased fracture toughness is highly desirable. Dispersion of nanomaterials within the resin enhances the value and performance of the resultant materials. Inclusion of nanomaterials alters cure-kinetics of the epoxy resins and their cure cycles, and is discussed in the context of the "nanoprocessing" parameter described elsewhere herein.

1. Nano-Materials

The following exemplary nanomaterials were investigated; this listing is not exclusive and should not be read as limiting the scope of the present disclosures:

1.1. Acid treated (or functionalized) Graphene (Gr),
1.2. Acid treated (or functionalized) Single-walled carbon nanotubes (AT-SWCNTs),
1.3. SWCNTs,
1.4. Polyamic acid (P),
1.5. Dimethylacetamide (DMAC), and
1.6 Unfunctionalized graphene.

The resulting epoxy resin is referred to as tunable nanoresin, where material 1.1 provides a marked improvement in strength. As one moves from 1.1. towards 1.5, the reinforcement material's contribution transitions from conferring increased strength to increased toughness. In the particular case of DMAC solution and polyamic acid, these constituents are combined chemically with the pristine epoxy resin and are fully soluble in each other. In the cases of Gr, acid treated SWCNTs, and SWCNTs, these constituents are combined with the pristine epoxy resin physically. Alcohol is a suitable solvent to disperse Gr as well as SWCNTs, and also have used DMAC solution as a solvent for the polyamic acid. SWCNTs and Graphene Sheets may be functionalized by acid treatment.

Polyamic acid materials are defined as an acid that includes both a carboxylic acid and an amide functional group. One such material is Duramide 100 (Fuji Film, www.fujifilm.com). Aromatic polyimides are suitable polyamic acids for the disclosed compositions and methods. Some suitable polyamic acids are described on Table 2.12 of Polyimide Membranes Applications, Fabrications, and Properties (Haruhiko Ohya, Vladislav V. Kudryavtsev, Svetlana I. Semenova) (1996, Kodansha Ltd.). An exemplary synthesis for polyamic acid is set forth in U.S. Pat. No. 4,269,968, which includes reacting an aromatic dianhydride with an aromatic diamine. The polyamic acid need not necessarily be aromatic, as they can be synthesized by reacting a dianhydride with a diamine. The dianhydride suitably includes one or more carboxyl or other functional groups. U.S. Pat. No. 6,320,019 also describes an exemplary polyamic acid synthesis. Polyamic acids are available from Sigma Aldrich (www.sigmaaldrich.com).

DMAC is known as N,N dimethylacetamide. DMAC may be prepared in a number of ways, including by reacting dimethyl acetate with dimethylamine. A variety of DMAC syntheses are set forth in U.S. Ser. No. 11/720,791, incorporated herein by reference. DMAC is a polar solvent characterized by a comparatively high boiling point. Other disubstituted diamides (e.g., N,N-disubstituted diamides, having the formula R(CO)NR'R") are considered suitable reinforcements, along with DMAC. (R, R', and R" can include carbon or hydrogen.) Such materials include diethylacetamide, methylethylacetamide, N,N-dimethyloctanamide, N,N-dimethyldecanamide. A general formula for N,N disubstituted amides is set forth in U.S. Pat. No. 4,115,204, incorporated herein by reference. Dimethylformamide may also be used, along with other compounds having the formula H(CO)NRR'. DMAC and other suitable reinforcements are available from Sigma Aldrich, www.sigmaaldrrich.com.

2. Nano-Manufacturing

Nanomanufacturing includes a variety of considerations. Some of these include, inter alia:

Identifying a suitable weight percentage of nanomaterials: this step determines the percentage of the nanomaterial that can be included in the resin to still give a good dispersion of nanomaterials in the resin (i.e., prevent agglomeration) and to produce the highest properties improvements.

Preparing nanomaterials to be mixed within the resin: this step provides procedures and processes to prepare the nanomaterials such that when prepared/functionalized nanomaterials are mixed within the resin with the user's preferred weight percentage, the nanomaterials provide dispersions of the prepared nanomaterials in the resin (i.e., reducing or eliminating agglomeration) to produce improvements.

Procedures and processes to mix the prepared nanomaterials within the resin: this step provides procedures and processes to mix the prepared/functionalized nanomaterials within the resin such that when these prepared/functionalized nanomaterials are mixed within the resin with a preferred weight percentage so as to provide dispersions of the prepared nanomaterials in the resin (i.e., prevent agglomeration) to produce the highest properties improvements.

The following sets forth in further details the nanomanufacturing steps outlined above:

2.1.1. Weight Percentage of Nanomaterials:

This step determines the percentage of the nanomaterial and is explained elsewhere herein.

2.2.1. Preparations of the Nanomaterials to be Mixed within the Resin (Sonication and Dispersion of Nano-Materials, Such as SWCNT & Gr)

This section describes an exemplary, non-limiting mixing technique to disperse nanomaterials such as Single-Walled Carbon Nanotubes (SWCNTs), Acid treated SWCNTs, or Graphene within an epoxy system utilizing a sonication machine and a hot plate magnetic stirrer. In some embodiments, nano-manufacturing of the nanoresin follows three major steps.

In a first step, the user varies the percentage of the nanomaterials to obtain a loading. In a second step, the user disperses the required nanomaterials within a proper solvent such as ethyl alcohol solution. In another step, the user achieves a uniform dispersion of nanomaterials-ethyl alcohol solution into the Part A of the epoxy system, and evaporates the ethyl alcohol solution and minimizes the amount of micro-bubbles forming during manual mixing process. After the nanomanufacturing step, varying the cure cycles (and using high temperature furnaces such as convection oven for nanoresin and autoclave for the nanocomposite) constitute what is termed "nano-processing."

The dispersion of nanomaterials within the epoxy system poses challenges due to the high viscosity of the epoxy material and the agglomeration of the nanomaterials (due to Van der Waal forces between them). In some embodiments, an ethyl alcohol solution is used (its viscosity is much lower in comparison to that of epoxy) as a proper medium to disperse the required amount of the nanomaterials.

Nanomaterials and an alcohol solution are suitably mixed using sonication for almost two days while the water temperature was set at about 30 deg. C. The ratio of nanomaterials to ethyl alcohol may be of such a range that the viscosity of the mixture remains similar to that of ethyl alcohol. Ethyl alcohol effected uniform dispersion of the nanomaterials in the ethyl alcohol solution and inside the epoxy and also shortened the evaporation process. The nanomaterials-ethyl alcohol mixture is added to the required amount of Part A of epoxy followed by a slow manual stirring for about 10 minutes.

During the first 10 to 20 stirrer strokes, nanomaterials transfer into Part A of the epoxy and the clear ethyl alcohol solution remains at the top (and forms a separation). Excess ethyl alcohol may be removed using a suction device. This can shorten ethyl alcohol evaporation time.

To achieve homogeneous mixing of the nanomaterials within the epoxy, the user may hold the mixing dish at a 45 degree angle, using a glass rod as a mixing device, and then perform manual mixing with rotations and counter-rotations. Bubbles that may form can be removed via sonication with degassing.

2.3.1. Procedures and Processes to Mix the Prepared Nanomaterials within the Resin (Shear Mixing of Nano-Materials, Such as SWCNT & Gr)

To achieve dispersion of the nanomaterials, elimination of bubbles, and complete evaporation of ethyl alcohol solution from the mixture, one may use a hot plate magnetic stirrer and a flow of cold air (suitably tangent to the wall of the container and at a 45 degree angle with respect to the mixture surface, so as to create a shear flow vortex).

In one experiment, to evaporate the volatile ethyl alcohol from the mixture, the hot plate magnetic stirrer was set at 250 rpm employing constant heat at about 30 deg. ° C. The heat kept the viscosity low and relatively constant as the ethyl alcohol evaporated. In some cases, without thermal treatment, the mixture solvent can effect the characteristics of the resin.

In addition to heating and mixing utilizing the hot plate magnetic stirrer, a flow of cold air assisted with the alcohol evaporation and bubble removal. To obtain a homogeneous mixture, cold air may be adjusted to about a 45-degree angle with respect to the mixture surface and tangent to the wall of the container; where the rotation created by the air flow suitably has the same rotation as the vortex generated by the magnetic stirrer. The air may be adjusted such that a layer of mixture at the top shears over the adjacent layer and moves the mixture top surface in the direction of the vortex generated by the magnetic stirrer.

Part B (hardener) is then suitably added to the mixture, with a Part A:Part B ratio of about 3:1. Mixing of nanomaterials-Part A and Part B may be performed with slow manual stirring. Further degassing of the system can be acheived in a vacuum furnace if needed. The mixture may then be poured into a moled (e.g., aluminum) and kept in a closed container to avoid reaction with the open air.

2.2.2. & 2.3.2. Preparations and Mixing of the Nanomaterials within the Resin (Nano-Manufacturing of Polyamic Acid)

Polyamic acid nanoresin manufacturing may include several steps. Step one is the preparation of the polyamic acid solution. Step two is mixing the polyamic acid solution with Part B or Part A of the epoxy system. Step three is a cure cycle (i.e., 30 minutes at 200° C.).

Mechanical properties of polyamic acid nanoresins can be affected by mixing the polyamic acid first with Part A or first with Part B of the epoxy system, regardless of the weight percentages of other required solvents. Polyamic acid solution may be first mixed with Part B of epoxy system and then Part A.

In one non-limiting example, polyamic acid 3% by weight was added first to a Dimethylacetamide (DMAC) solution 6% by weight followed by manual stirring using a glass rod. A fluorosurfactant agent 0.7% by weight was added to this solution, followed by very slow manual stirring for about another 5 minutes at room temperature. This solution was sonicated for about 2 minutes. At this stage the solution had a yellowish color and a viscosity similar to water.

The polyamic acid-DMAC-fluorosurfactant mixture was added to the required amount of Part B of epoxy at room temperature, followed by very slow manual stirring for about 30 minutes. Polyamic acid solution cluttered Part B of the epoxy into the form of white tiny particles that are broken down into smaller pieces and dispersed uniformly. The user may hold the dish at a 45-degree angle and shear the mixture between the glass rod and the dish wall.

At some weight percentages of the fluorosurfactant, polyamic acid clutters Part B and will not dissolve. This mixture is added to Part A of epoxy, followed by very slow manual stirring for about 10 minutes. Occasional applied heat in the range of 50° C. lowered the viscosity of the mixture and allowed trapped air bubbles to rise to the surface and burst. The mixer can be placed in a vacuum oven for further degassing if needed. Next, the mixture was poured into an aluminum mold and was kept in a closed container to avoid direct contact with the open air. This mixture was ready to be cured using high temperature furnaces.

2.2.3. & 2.3.3. Preparations and Mixing of the Nanomaterials within the Resin (Nano-Manufacturing of Dimethylacetamide)

Manufacturing of Dimethylacetamide (DMAC) nanoresin material may include several steps, including (1) preparation of DMAC-epoxy solution, and (2) employing a cure cycle. Different weight percentages of DMAC were mixed with required amount of Part A of the epoxy at room temperature followed by very slow manual stirring for about 15 minutes. Because combining DMAC solution with epoxy Part A lowers the epoxy viscosity, shear mixing was always needed.

A glass rod placed inside the mixture was stirred clockwise and counterclockwise at fifty strokes each times for about 8 sequences. The mixture was suitably degassed using sonication. Part B of the epoxy is then suitably added to this homogeneous solution to effect an epoxy resin at an epoxy-to-hardener ratio of 3:1. Mixing of Part A and Part B continues with slow manual stirring for about 10 minutes. Occasional applied heat in the range of 50 deg. C. reduces the viscosity of the mixture and allows trapped air bubbles to rise to the surface and burst. The mixer can be placed in a vacuum oven for further degassing if needed.

2.4. Material, Dimensions, and Formula

Pristine epoxy was used as a base material, which included of Part A resin and Part B hardener mixed together with a ratio of 3:1, respectively. This epoxy was based on diglycidyl ether of bisphenol A (DGEBA), alkylglycidyl ether and modified aliphatic amines as Part B.

Specimens were cut from a square plate with overall dimensions of 20×20 cm in sides and an average thickness of about 0.3 cm. To characterize the mechanical properties of the developed nanoresin materials two different mechanical testing were performed. 1—tensile tests for the determination and tailoring of the ultimate tensile strength, strain-to-failure, and elastic Young's modulus, and 2—single-edge-notch-bending (SENB) tests for strain energy release rate ($G_{IC}$).

Due to the nature of these tests, at least five specimens were tested and the reported results are based on the average values. Tensile test specimens were prepared in form of dog-bone shapes and in accordance to the ASTM standards (see FIG. 1a), with overall gauge length of 25.4 mm, average width of 8.0 mm, and average thickness of about 3 mm. Tensile properties such as strength, strain-to-failure, and elastic modulus were measured from the recorded stress-strain diagrams. Strain was measured using an extensometer having gauge length of 25.0 mm that was attached to the thickness side of the specimen.

An Instron™ universal testing machine was used where the cross-head speed was set at constant rate of 1.0 mm/min. Fracture test specimens followed ASTM standards with a nominal span length (L) of 56 mm, width (W) of about 12.8 mm, an average thickness (B) of about 3.2 mm, and a ratio of width-to-thickness (W/B) of about 4.0. An artificial notch about 6 mm long and about 1.5 mm wide was cut in the middle of the span along the specimen width using a milling cutter machine. Subsequently, a natural crack was initiated by inserting a sharp razor blade and moving it back and forth (see FIG. 1b).

All SENB specimens were followed the ASTM standard procedures of crack length "a" to specimen width ratio "a/W" of approximately 0.5 to validate the SENB tests. Once again, the Instron universal testing machine equipped with necessary fixtures was used to perform the SENB tests. For the SENB tests the Instron cross-head speed was set at the constant rate of 0.25 mm/min. Reported values for the strain energy release rate ($G_{IC}$) are in accordance with the ASTM formulas and based on average of at least five test specimens. For each SENB test, the applied load versus loading-point displacement was recorded. For the results to be considered valid, the size criteria relation as shown by Eq. (1) was satisfied. Strain energy release rate was calculated in correspondence to the total energy required to cause failure due to the presence of an artificial sharp crack (FIG. 1). The fracture toughness was calculated as a measure of the material resistance to failure in the presence of a sharp induced crack.

$$B, a, (W - a) > 2.5 \left( \frac{K_Q}{\sigma_Y} \right)^2 \tag{1}$$

where, $K_Q$ represents conditional or trial $K_{IC}$ value and $\sigma_Y$ is the yield strength of the material for the temperature and the loading rate of the test. For the SENB specimens with the span length to width ratio "L/W" of 4, $K_Q$ is equivalent to $K_{IC}$ and in the units of MPa–m$^{1/2}$ as described by Eq. (2).

$$K_{IC} = \left( \frac{P_Q}{BW^{1/2}} \right) f(x) \tag{2}$$

where, $P_Q$ is the maximum applied load measured from the load-displacement curve in unit of KN. B and W are the specimen's thickness and width, respectively, in cm. Function $f(x)$ is defined by the following expression as shown in Eq. (3), as x is the ratio of the measured crack length over the specimen width.

$$f(x) = 6x^{1/2} \frac{[1.99 - x(1-x)(2.15 - 3.9x + 2.7x^2)]}{(1 + 2x)(1 - x)^{3/2}} \tag{3}$$

The calculation of the critical strain energy release rate ($G_{IC}$) in units of KJ/m² is based on the corrected strain energy as it is defined by U (Refer to ASTM standard D5045) as shown in Eq. (4).

$$G_{IC} = U/(BW\phi) \tag{4}$$

where U represents corrected strain energy and is the energy difference that is calculated from the area under the recorded load-displacement curve associated with the SENB samples and its correction test. $\phi$ is defined as an energy calibration factor.

3. Nano-Processing (Cure Cycles & Processing Equipment)

Nanoprocessing includes, for example, the aspects of 3.1) Cure Cycle: this step investigates cure cycles to produce property improvements.

3.2) Processing Equipment: this step determines equipment to useful in producing improved materials.

3.1) Cure Cycle

To examine the effects of various cure cycles on the mechanical properties of these new generation of epoxy resins referred to as nanoresins, three different cure cycles were considered. The inclusion of nanomaterials and the steps during the nanomanufacturing may alter the characteristics of the developed nanoresins such that the cure cycle and processing procedures could be altered. Accordingly, to manufacture high-performance nanoresins, the cure process (i.e., nano-processing) may be adjusted as well.

The cure cycles for nanoresins suitably follow a specific temperature-time curve with no external pressure. For the first cure cycle, the manufacturer suggested temperature-time curve was followed; for the sake of brevity this is designated by the letter "F" and was a comparatively slow cure cycle. The second cure cycle is an alternative one, designated by the letter "V" and is a comparatively medium-pace cure cycle. The third cure cycle corresponds to the polyamic acid cure temperature and is designated by "A" and is a comparatively fast cure cycle. Type "F" (i.e., the resin manufacturer recommended) cure cycle was employed to cure the pristine epoxy resin which was used as the base epoxy material for the comparison with the developed nanoresins:

"F" is a slow cure cycle and was the manufacturer suggested cycle:
- 24 hours @ Room Temperature,
- 4 hours @ 35° C.
- 2 hours @ 49° C.
- 4 hours @ 57° C.
- 2 hours @ 66° C., with heating rate of about 1° C./min "V" is a medium cure cycle and was employed as follows:
- 5 hours @ Room Temperature
- 1 hour @ 120° C., with a heating rate of 1° C./min "A" is a fast cure cycle and was employed as follows:
- Minutes @ 200° C., with heating rate of 1° C./min 3.2 Processing Equipment:

Processing equipment included convention ovens and, on selected specimens, autoclaves, to examine the effect of high temperature furnaces on the mechanical properties of the proposed nanoresin materials. For identification purposes, the last letter "A" within a specimen name description indicates an autoclave process, while the last letter "C" is indicative of a convection oven.

Acid Treated Graphene Sheet Nanoresins

Acid treated graphene sheets (Gr) are used with pristine epoxy to improve its mechanical properties. Without being bound to any single theory of operation, graphene reinforcing constituents may elevate the load transfer mechanism between the matrix and the reinforcing constituent. However, mechanical properties of the Gr-epoxy (i.e., nanoresin) material can be degraded significantly due to the improper dispersion and/or irregular geometry of the graphene sheets/platelets.

The majority of the mixing techniques reported in the literature have not been successful. Normally, graphene sheets and platelets are in the form of aggregates and clusters, and the homogeneous dispersion of such materials within epoxies, due to their high viscosity, is hence a major challenge. Provided here, however, are new mixing techniques that have been developed and described.

This section focuses on the effects of different weight percentages of the graphene sheets/platelets, and also two different cure cycles, i.e., comparatively slow as indicated by letter "F" and medium-pace as indicated by letter "V".

Figure 2:
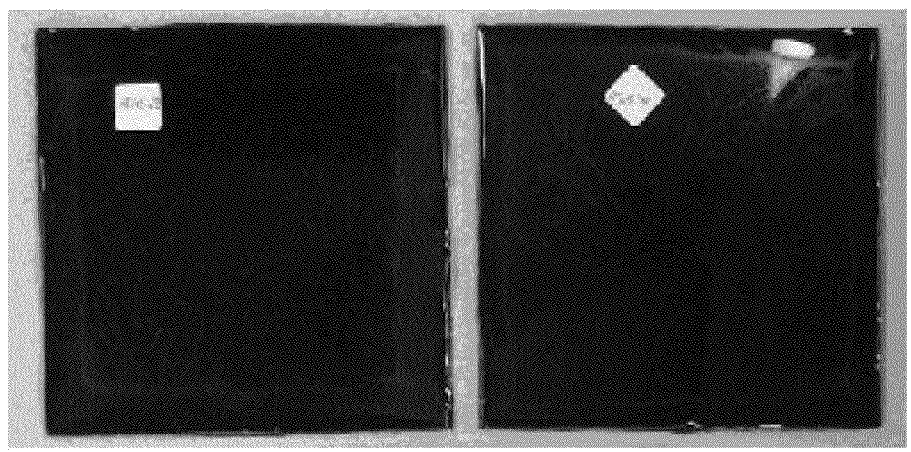
FIG. 2 illustrates graphene-based nanoresin plates.

To accomplish these goals two groups of specimens with graphene inclusions between 0.004-0.008% in increment of 0.002 using the "F" cure cycle and also, specimens with graphene inclusion between 0.006-0.1 in increment of 0.002 using "V" cure cycle, were prepared. FIG. 2 illustrates two exemplary graphene-based nanoresin plates with different weight fractions and cured at different cure cycles. Visual examinations of these plates showed no air bubbles and very smooth surfaces (see FIG. 2).

Specimen Name Description:

A first sample code letter "E" stands for epoxy resin, while the next letter (or letters) identifies the nanomaterial employed such as Graphene Sheet (i.e., Gr) in this case. The first-appearing number refers to the number of plates manufactured while the remaining numbers are indicative of the weight percentage of the nanomaterials used (e.g., 006 is equivalent to 0.006% Gr inclusion based on the weight of the nanoresin). The last code letter refers to the type of the cure cycle employed, for example, "F" or "V". A convection oven was used for both cure cycles.

I.1. Graphene Sheet Based Nanoresin Experimental Results

I.1.1. Slow Cure Cycle ("F" Cure Cycle)

Experimental results based on tensile tests for pristine epoxy (designated by FGH-3S) and graphene sheet based nanoresin (i.e., exemplary stress-strain plot for EGR1006-F) employing "F" type cure cycle were as follows.

Figure 3B:
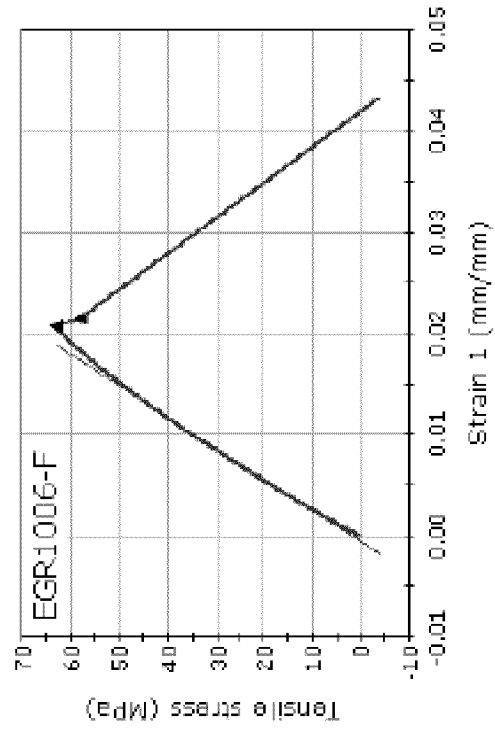
FIG. 3 illustrates exemplary stress-strain plots for a) pristine epoxy, and b) graphene nanoresin.
Figure 3A:
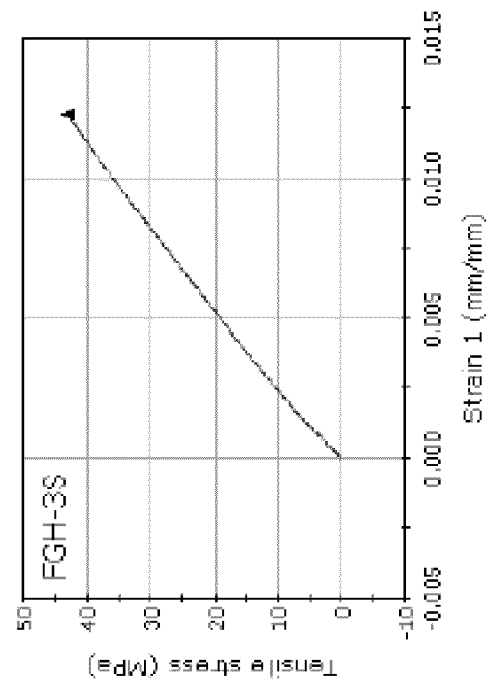

As previously described, the "F" type cure cycle is the manufacturer suggested cure cycle. A detailed examination of the pristine epoxy specimens revealed that they failed in a brittle fashion as the fracture surface was smooth and normal to the load direction (FIG. 3a). Specimens with a graphene sheet inclusion of from about 0.004 to 0.008% demonstrated similar brittle fracture but the fracture surface was ragged and the ultimate tensile strength in comparison to the pristine was much higher (FIG. 3b).

Figure 4B:
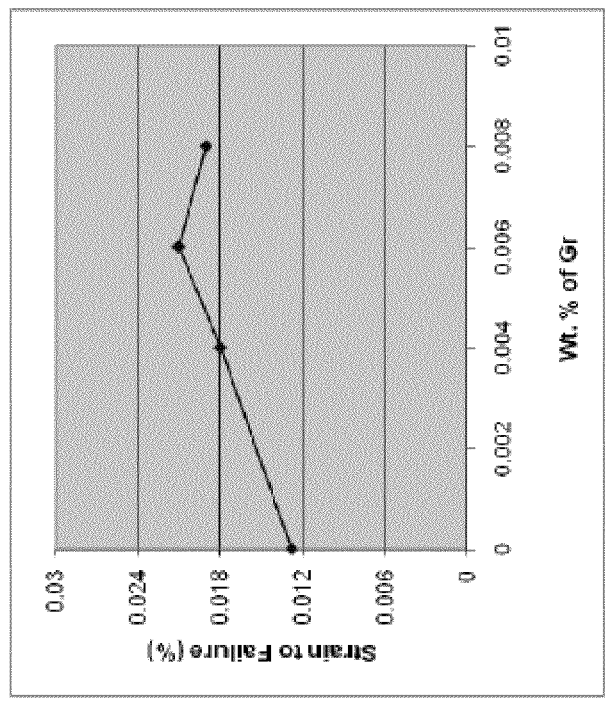
FIG. 4 illustrates tensile properties of graphene nanoresin employing "F" cure cycle a) Ultimate Tensile strength. b) Strain-to-failure.
Figure 4A:
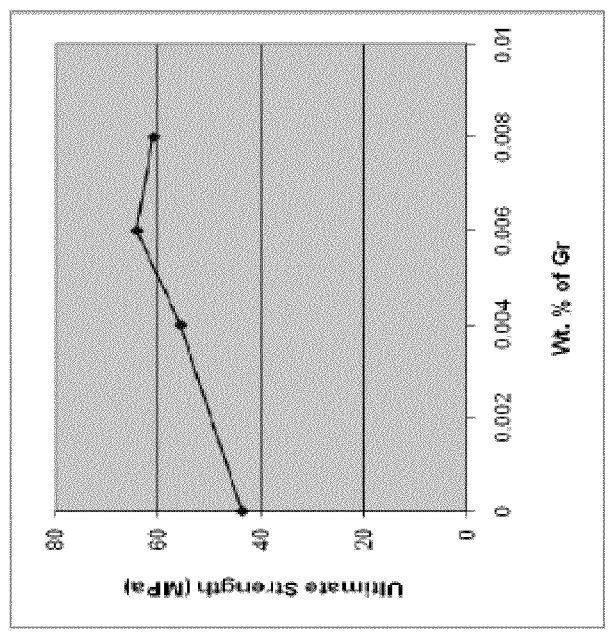

FIGS. 4a and 4b compare the ultimate tensile strength and strain-to-failure of graphene nanoresin against the weight percentage of graphene sheets with respect to the pristine epoxy, respectively. These results demonstrate a highest ultimate strength and strain-to-failure occurring at 0.006% by weight of graphene sheet concentration, after which the strength and strain-to-failure decrease (although at even up to 0.01%, improvements can still be seen). The enhancement in strength is about 43% and the strain-to-failure enhancement is about 64%. Elastic modulus reduced by about 7% and remained almost constant.

Figure 5A:
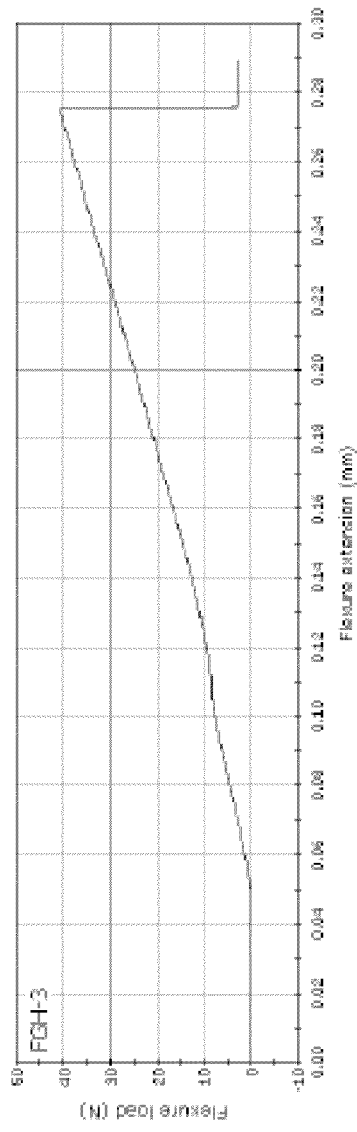
FIG. 5 illustrates $G_{IC}$ employing "F" cure cycle a) pristine load-displ. b) graphene nanoresin load-displ. c) variation of $G_{IC}$ vs weight % of graphene sheets inclusions within the nanoresin.
Figure 5B:
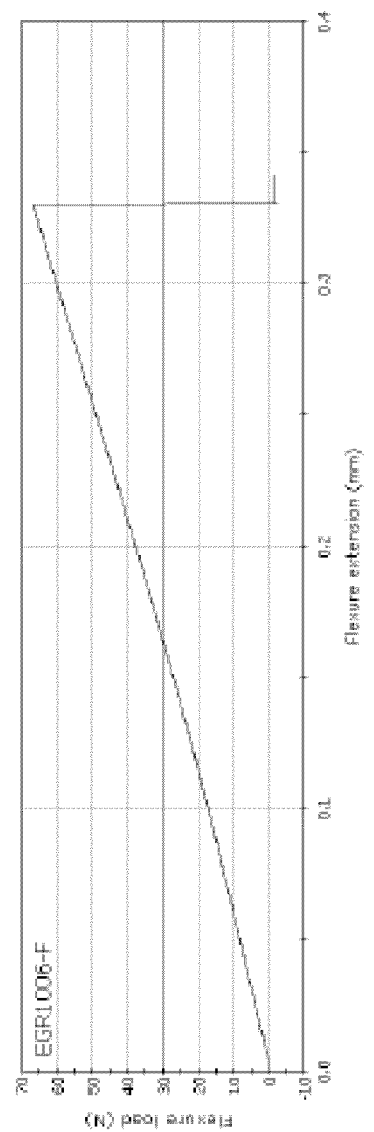

The fracture toughness or material resistance to crack initiation and propagation uses an energy calculation using a load versus load-point displacement plot. FIG. 5a shows a exemplary load vs. load-point displacement for the pristine epoxy from the SENB test, while FIG. 5b shows the similar plot for the graphene nanoresin with graphene inclusion at 0.006%.

Figure 5C:
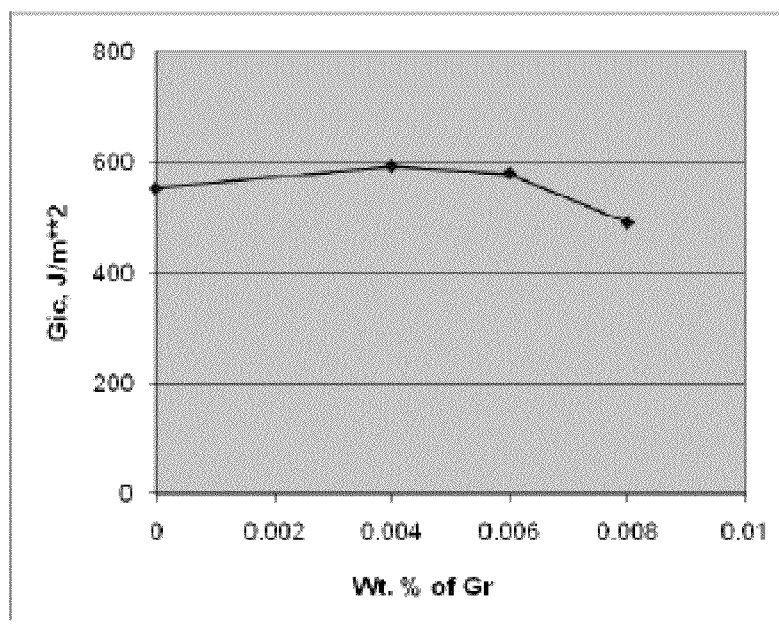

For the tests performed, the cross head travel rate was maintained at 0.25 mm/min. Comparison of the fracture toughness test results are shown in FIG. 5c, where $G_{IC}$s are displayed vs. different weight percentages of graphene sheets inclusion. The plot shows that the maximum improvement of $G_{IC}$ was obtained at 0.004% of graphenes and it reduced slightly at 0.006%. The enhancement in $G_{IC}$ at 0.004% graphene is about 7% and at 0.006% graphene is about 5%. As explained earlier, the ultimate tensile strength was improved substantially at 0.006% of graphene sheets inclusion while the fracture toughness increased slightly and was almost close to that of the pristine epoxy.

Table 1 gives the comparison in ultimate tensile strength, strain-to-failure, elastic modulus, and fracture toughness between the pristine epoxy and the graphene nanoresin employing the "F" type cure cycle. Results indicate that the ultimate tensile strength has been increased by about 43%, strain-to-failure improved by about 64%, elastic modulus reduced slightly (by 7%), and fracture toughness improved slightly (i.e., 7%). The percentage of enhancements are listed inside the parentheses.

TABLE 1

Graphene nanoresin properties improvements employing "F" type cure cycle.

| Material | Strength (MPa) | Strain (mm/mm) | E (GPa) | $G_{IC}$ (J/M2) |
|---|---|---|---|---|
| Pristine Epoxy | 43.7 | 0.0128 | 3.47 | 553 |
| Graphene-Nanoresin "F" Cure Cycle | 62.5 (43%) | 0.021 (64%) | 3.22 (−7%) | 592 (7%) |

I.1.2. Medium Cure Cycle ("V" Cure Cycle)

Figure 6:
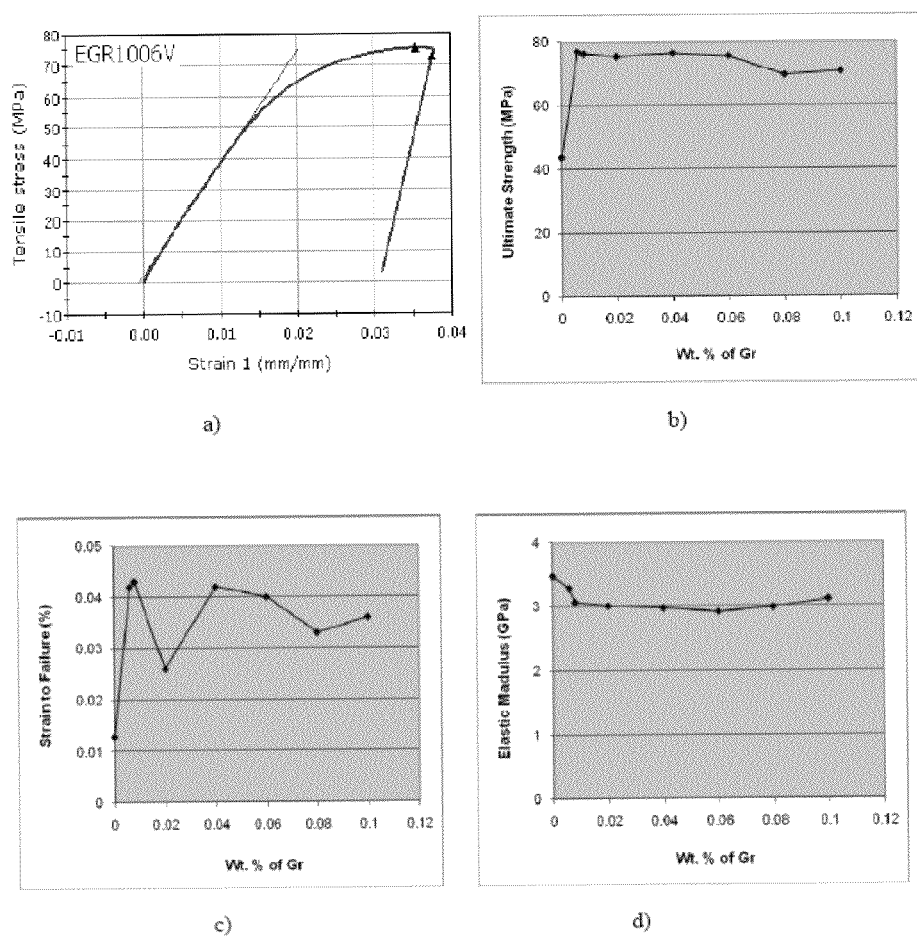
FIG. 6 illustrates tensile properties of graphene nanoresin employing "V" cure cycle a) exemplary non-linear stress-strain plot. b) ultimate tensile strength vs Wt % of Gr. c) strain-to-failure vs Wt % of Gr. d) elastic modulus vs Wt % of Gr.

The experimental results from the tensile tests for a graphene-containing epoxy nanoresin employing the "V" type cure cycle (i.e., exemplary stress-strain plot, EGR1006-V) are discussed in the following. As mention earlier the "V" type cure cycle is the medium cure cycle. As explained in the previous sections, the pristine epoxy specimens failed in a brittle fashion, while the graphene nanoresins cured using the "V" type cure cycle with the graphene sheets inclusion between 0.006% to 0.1% yielded before failure in a rather ductile manner (FIG. 6a). The visual examination of the graphene nanoresin fracture surfaces revealed ragged surfaces. The characteristics of the stress-strain curve change as the slow cure cycle turns to the medium cure cycle.

By increasing the cure cycle temperature and shortening its time, the graphene nanoresin becomes stronger with higher ultimate strength, strain-to-failure, and fracture toughness (compare FIGS. 3b and 6a). FIGS. 6b, 6c, and 6d show variation of the ultimate tensile strength, strain-to-failure, and elastic modulus of graphene nanoresin against the weight percentage of graphene sheets with respect to the pristine epoxy.

These results demonstrate that a high tensile strength as well as a strain-to-failure occurred at 0.006% by weight of graphene concentration. After this loading, the ultimate tensile strength reduced slightly but remained nearly constant while the strain-to-failure reduced with drastic drop at 0.02% (FIG. 6c). Elastic modulus reduced slightly (FIG. 6d). By changing the cure cycle from slow (i.e., "F") to medium (i.e., "V") at 0.006%, the strength enhancement is now about 76% and that for strain-to-failure is about 228%. The elastic modulus was reduced overall by about 10% to 15%, but remained almost constant as graphene weight percentage increased (FIG. 6d).

Figure 7:
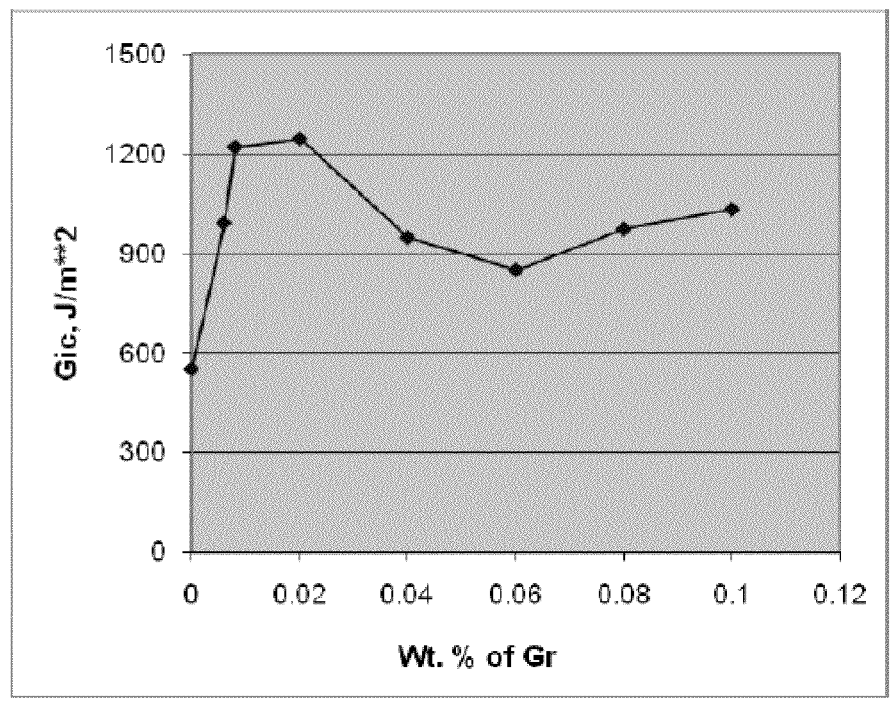
FIG. 7 illustrates $G_{IC}$ vs weight % of graphene in nanoresin employing "V" cure cycle.

Fracture toughness test results for the "V" type cure cycle are shown in FIG. 7, where $G_{IC}$s are plotted vs. different weight percentages of graphene. The plot shows that maximum $G_{IC}$ is reached in the range of 0.008 to 0.02% of graphene and then decreased slightly; however, up to 0.1% of the graphene content we still have improvement, but never reached to the level of 0.008% to 0.02%. A comparison of $G_{IC}$ associated with the "F" (in FIG. 5) and "V" (in FIG. 7) demonstrated that $G_1$ almost doubled as the cure temperature increased and the corresponding cure time decreased (see FIG. 5 with ~600 J/m² and FIG. 7 with ~1200 J/m²). The enhancement in $G_{IC}$ at 0.02% of the graphene is about 125% and at 0.006% of graphene is about 79%.

Table 2 compares data for average ultimate tensile strength, average strain-to-failure, average elastic modulus, and average fracture toughness between pristine epoxy and graphene nanoresin with load fraction from 0.006% to 0.1 employing medium cure cycle (i.e., "V"). The results indicated that average ultimate tensile strength increased by 70%, average strain-to-failure improved by 189%, average elastic modulus reduced by 12%, and average fracture toughness increased by 88%. Percentage enhancement is given inside the parentheses.

TABLE 2

Comparison data for the graphene nanoresin employing "V" type cure cycle.

| Material | Strength (MPa) | Strain (mm/mm) | E (GPa) | $G_{IC}$ (J/M2) |
|---|---|---|---|---|
| Pristine Epoxy | 43.7 | 0.0128 | 3.47 | 553 |
| Graphene-Nanoresin "V" Cure Cycle | 74.3 (70%) | 0.037 (189%) | 3.04 (−12%) | 1037.5 (88%) |

I.1.3. Effects of Cure Cycles "V" vs "F" at Fixed 0.006% Graphene Inclusion

The inclusion of nanomaterials such as graphene sheets and the proposed nanomanufacturing techniques alter the characteristics of the developed nanoresin to some extend such that a new cure cycle (i.e., nanoprocessing) may be identified as well. Therefore, to obtain super performing nanoresins the corresponding cure cycle may be adjusted. To examine the effects of the cure cycles on the mechanical properties of the nanoresins, two different cure cycles at fixed 0.006% of graphene were studied.

First, a cure cycle following the manufacturer suggested temperature-time curve is designated by letter "F" as explained in Section 3 (i.e., slow cure cycle). The second cure cycle is an alternative one developed here and is designated by letter "V" as explained in Section 3 (i.e., medium cure cycle). The "V" cure cycle follows higher temperature and shorter time, as compared with "F" cure cycle.

Figure 8:
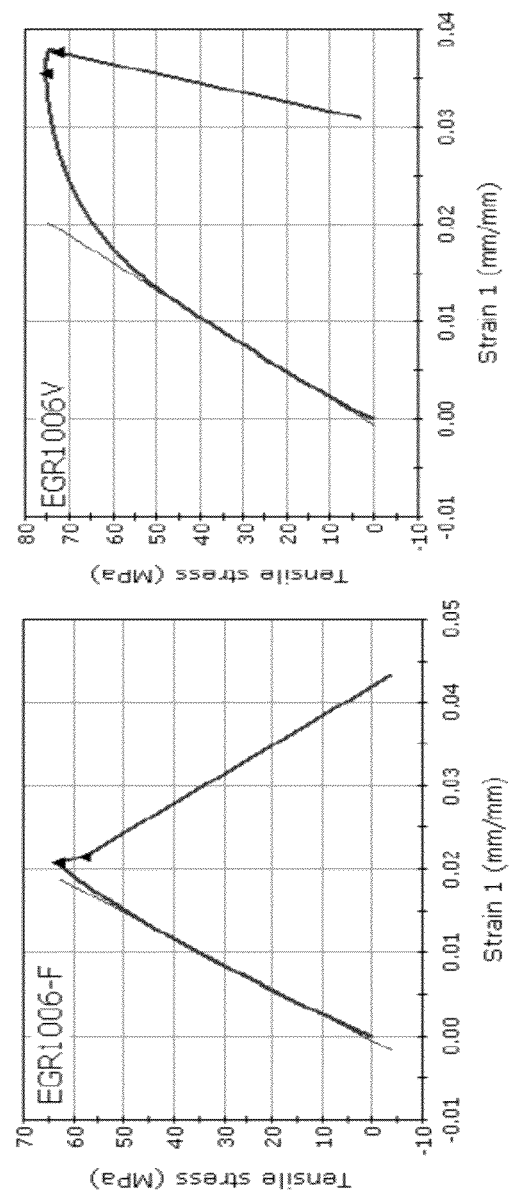
FIG. 8 illustrates exemplary stress-strain curves a) slow=F, and b) medium=V cure cycles.

FIGS. 8a and 8b represent exemplary tensile stress-strain curves for graphene nanoresins using fixed amount of graphene inclusion at 0.006% employing "F" and "V" cure cycle, respectively. These plots were selected randomly from a group of five replica specimens tested in this work; the results reported in Table 3 are the average of those five replica samples. It is clear that graphene nanoresin specimen cured at "V" cure cycle behaved more in a nonlinear manner possessing higher ultimate strength and strain-to-failure (see FIGS. 8a and 8b).

Figure 9:
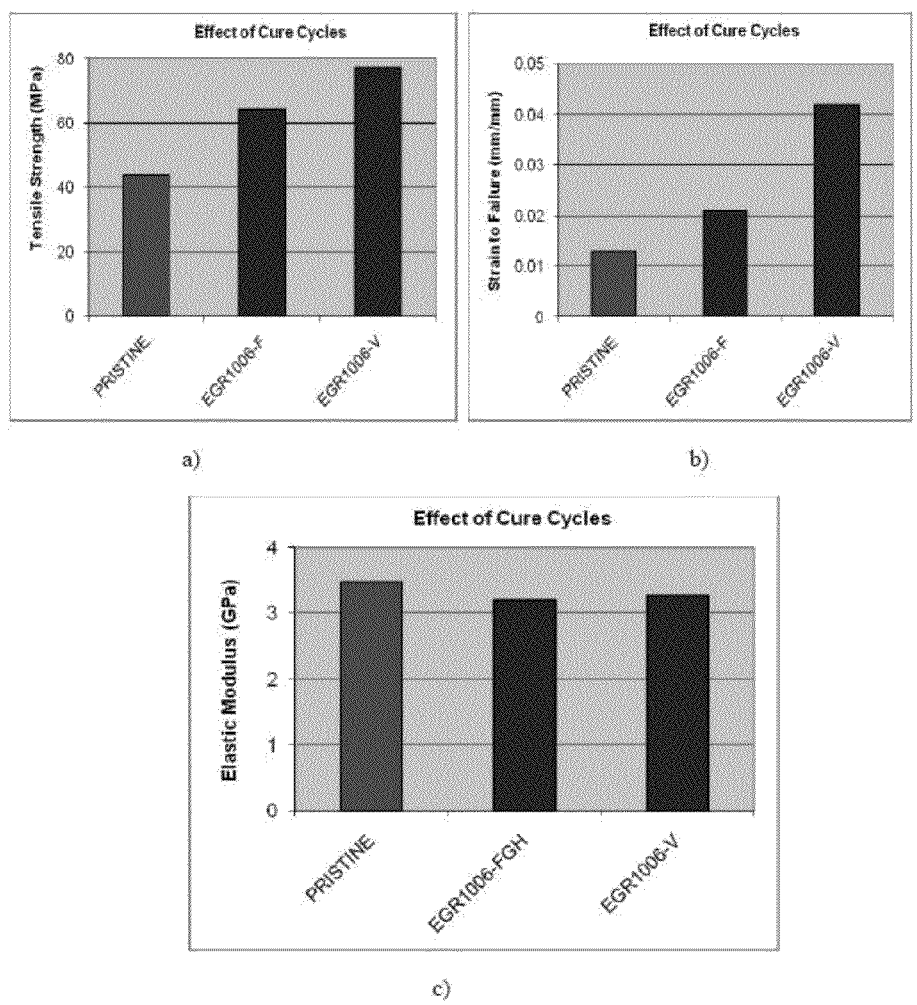
FIG. 9 illustrates a comparison of tensile properties at 0.006% of graphene due to "F" and "V" type cure cycles a) ultimate tensile strength. b) strain-to-failure. c) elastic modulus.

FIGS. 9a, 9b, and 9c show bar-chart comparisons between ultimate strength, strain-to-failure, and elastic modulus for different cure cycles. The results indicate ultimate strength improved by about 20%, strain-to-failure increased by about 100%, and elastic modulus, practically, remained identical when the alternate "V" cure cycle was employed.

Figure 10:
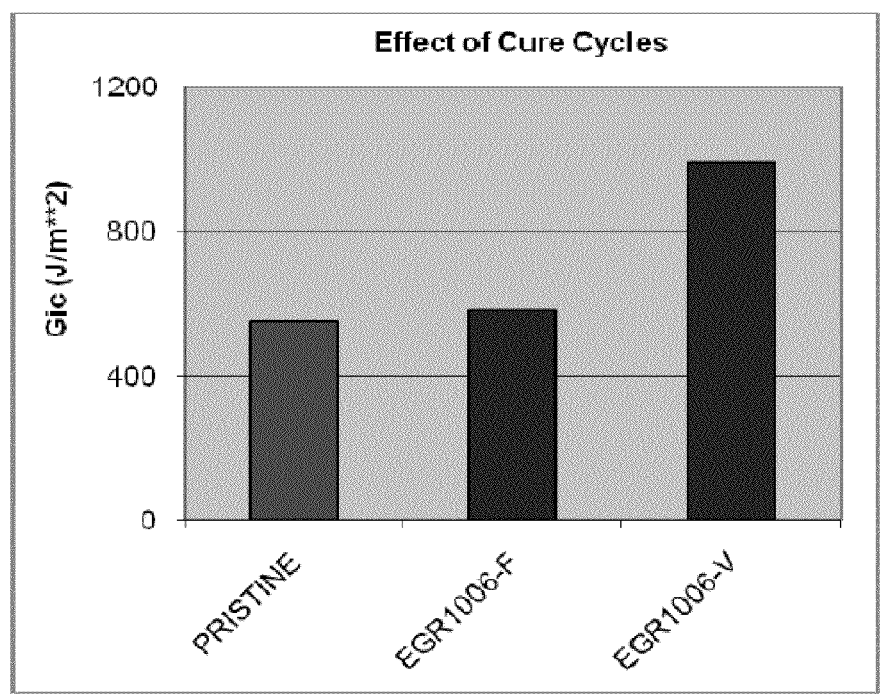
FIG. 10 illustrates a comparison of properties at 0.006% of graphene for "F" and "V" cure cycles.

FIG. 10 shows the comparison of the fracture toughness test results between the "F" and "V" cure cycles at 0.006% of graphene sheets inclusion. The plot shows that $G_{IC}$ obtained from "V" cure cycle is enhanced by about 71% as compared with that of "F" cure cycle.

Table 3 gives a comparison of the ultimate tensile strength, strain-to-failure, elastic modulus, and fracture toughness between two identical graphene nanoresins with graphene inclusion fixed at 0.006% and only cured employing two different "F" and "V" cure cycles. The percentage of the enhancements with respect to the property of pristine epoxy are presented inside the parentheses.

TABLE 3

Comparison of graphene nanoresin properties employing "F" and "V" cure cycles.

| Material | Strength (MPa) | Strain (mm/mm) | E (GPa) | $G_{IC}$ (J/M2) |
|---|---|---|---|---|
| Pristine Epoxy | 43.7 | 0.0128 | 3.47 | 553 |
| Graphene-Nanoresin "F" Cure Cycle @0.006% | 64.15 (47%) | 0.021 (64%) | 3.2 (−7%) | 580.12 (5%) |
| Graphene-Nanoresin "V" Cure Cycle @0.006% | 76.9 (76%) | 0.042 (228%) | 3.28 (−6%) | 991.68 (79%) |

I.2. Damping of STRONGEST Nanoresin:

The damping properties (i.e., vibration and acoustic controls) of the STRONGEST nanoresin were improved by about 250% as compared with the pristine resin.

II. Stronger & Tough Nanoresin: Acid Treated SWCNT Nanoresins

II.1. Acid Treated Procedure

Acid treatment of single-walled carbon nanotubes (SWCNTs) using nitric acid were performed as follows: a specific amount of SWCNTs was added to the nitric acid in the ratio of 3:1, utilizing the proper size beaker and diluted using water. The beaker was submerged in a dish filled with silicone oil to provide uniform temperature, utilizing a hot plate magnetic stirrer.

The hot plate temperature was set at about 115 C and the magnetic stirrer at about 1000 rpm.

After twenty four hours of mixing, the user transfers the mixture to a larger beaker and fills it with additional water. The user sonicates this mixture for about 5 minutes, covers the beaker top and leaves it under the hood (e.g., overnight) until acid treated SWCNTs precipitate completely at the bottom. The user may filter this mixture using a membrane filter with a pore size of 0.5 micrometer. To achieve the proper pH of about 7, one can wash this mixture with the distilled water a few times. Then, transfer the filtered acid treated (i.e., functionalized) SWCNTs into another smaller beaker and evaporate the extra water using the hot plate.

II.2. Cure Cycles (i.e., Nanoprocessing)

This section focuses on the effects of three different cure cycles (i.e., F, V, and A) on the mechanical properties of the acid treated SWCNTs nanoresins accompanied with two different weight percentages of 0.02% and 0.05% inclusion. As explained earlier, "F" cure cycle represents slow, "V" represents medium, and "A" represents fast curing. It should be noted that as the cure temperature increases, the cure time decreases from slow to fast cure cycle.

Figure 11:
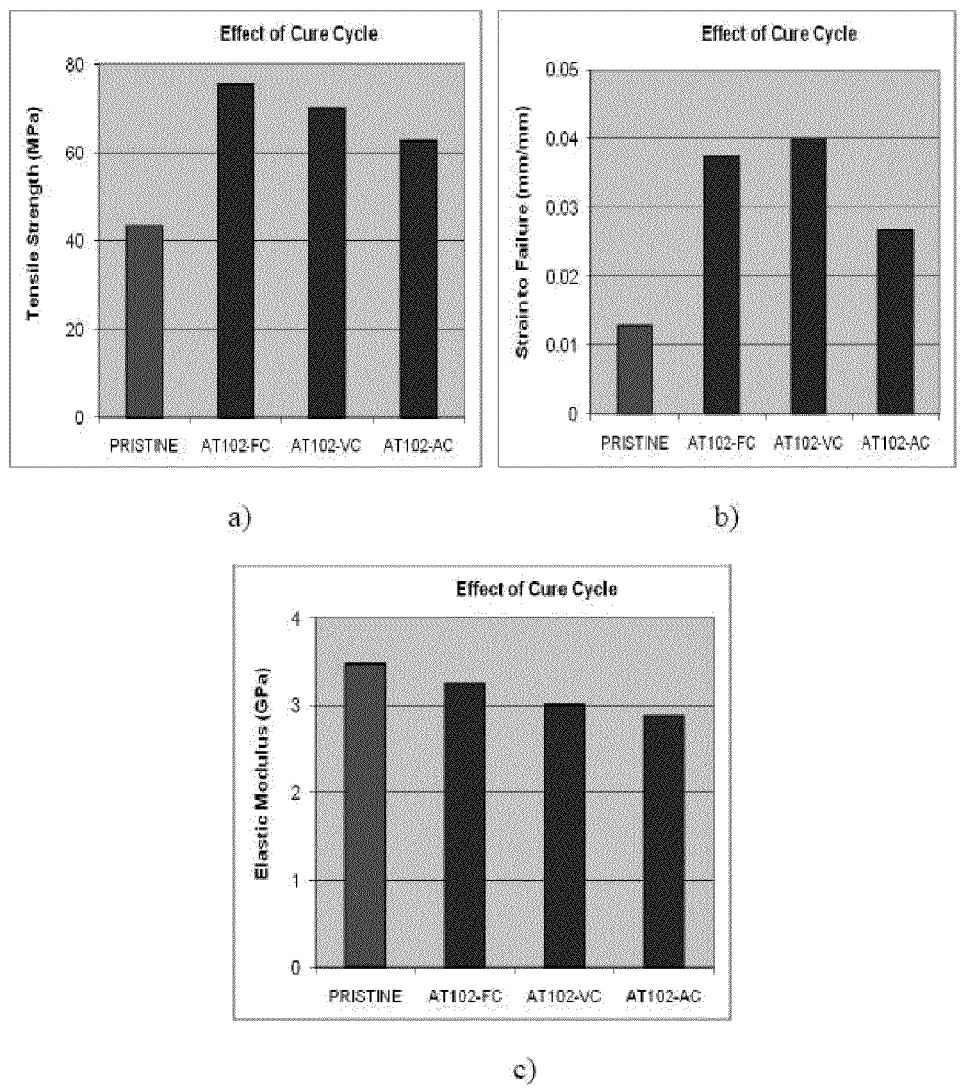
FIG. 11 illustrates a comparison of tensile test properties at 0.02% for the acid treated SWCNTs employing "F", "V", and "A" cure cycle a) ultimate tensile strength. b) strain-to-failure. c) elastic modulus.

First letters "AT" identify the "Acid Treated" SWCNTs, while the first number after these letters represent the number of plates manufactured, followed by the percentage of the CNTs employed. For the last two letters, the first letter indicates the type of cure cycle (e.g., "F" or "V", etc) while the second letter refers to the type of furnace (or processing equipment). For example, see AT102-FC in FIG. 11. A convection oven was used for the embodiment described here.

II.3. Experimental Results

FIGS. 11a, 11b, and 11c compare pristine epoxy and acid treated SWCNT nanoresins in terms of ultimate tensile strength, strain-to-failure, and elastic modulus employing various cure cycles with the percentage of the AT-SWCNT inclusion fixed at 0.02%. The results indicate that the highest ultimate strength was achieved through employing the slow cure cycle while the strain-to-failure reached its maximum value by employing the medium cure cycle (FIGS. 11a and 11b). Strain-to-failure remained nearly constant regardless of the slow or medium cure cycles. The elastic modulus was degraded from slow to fast curing cycle as the curing temperature increased and the curing time decreased (FIG. 11c).

Figure 12:
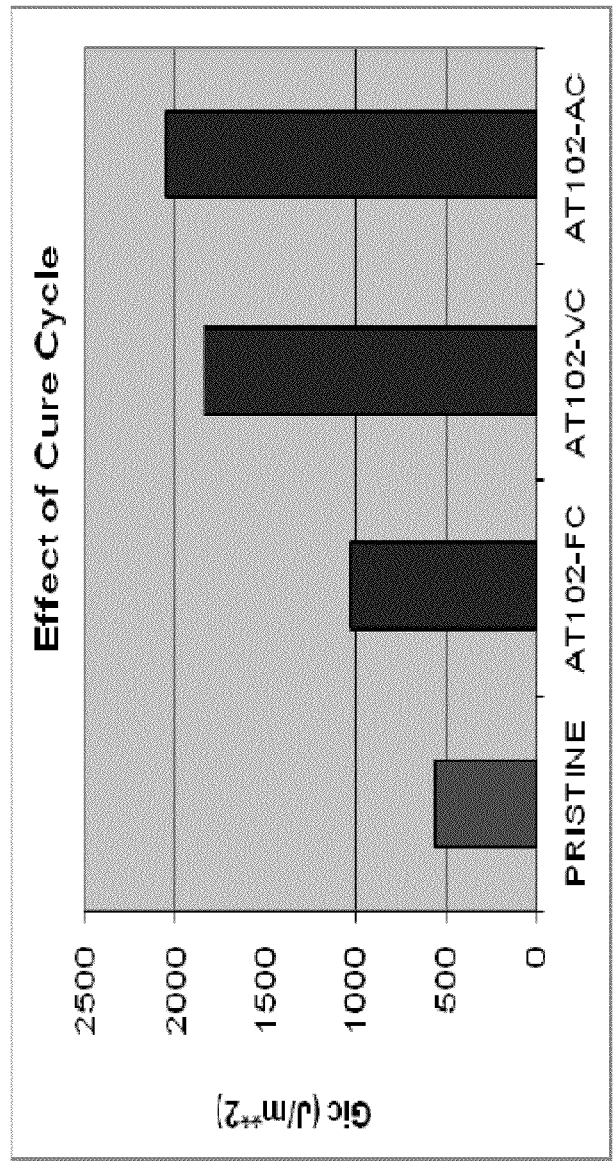
FIG. 12 illustrates a comparison of $G_{IC}$ at 0.02% loading for the acid treated SWCNTs for "F", "V", and "A" cure cycles.

FIG. 12 shows the comparison between the pristine epoxy and the acid treated SWCNT nanoresins for strain energy release rate (i.e., $G_{IC}$) for various cure cycles. The results indicate that $G_{IC}$ increases in a consistence manner as the curing temperature increases and the curing time decreases. The maximum $G_{IC}$ occurred employing the "A" type cure cycle (FIG. 12).

Table 4 gives the comparison between the ultimate tensile strength, strain-to-failure, elastic modulus, and fracture toughness for the acid treated SWCNT nanoresins with the inclusion fixed at 0.02%, employing the three different cure cycles mentioned above. In general, the ultimate tensile strength decreased by increasing the cure temperature and shortening the cure cycle. Fracture toughness increased by increasing the cure temperature and shortening the cure cycle (see Table 4). The percentage of the enhancements are listed inside the parentheses.

TABLE 4

Enhancements of acid treated SWCNTs nanoresins employing three different cure cycles.

| Material | Strength (MPa) | Strain (mm/mm) | E (GPa) | $G_{IC}$ (J/M2) |
|---|---|---|---|---|
| Pristine Epoxy | 43.7 | 0.0128 | 3.47 | 553 |
| AT102-FC | 75.6 (73%) | 0.037 (189%) | 3.25 (−7%) | 1034.25 (87%) |
| AT102-VC | 70.23 (61%) | 0.04 (213%) | 3.0 (−16%) | 1837.58 (232%) |
| AT102-AC | 62.75 (44%) | 0.0268 (109%) | 2.87 (−21%) | 2056.53 (272%) |

Figure 13:
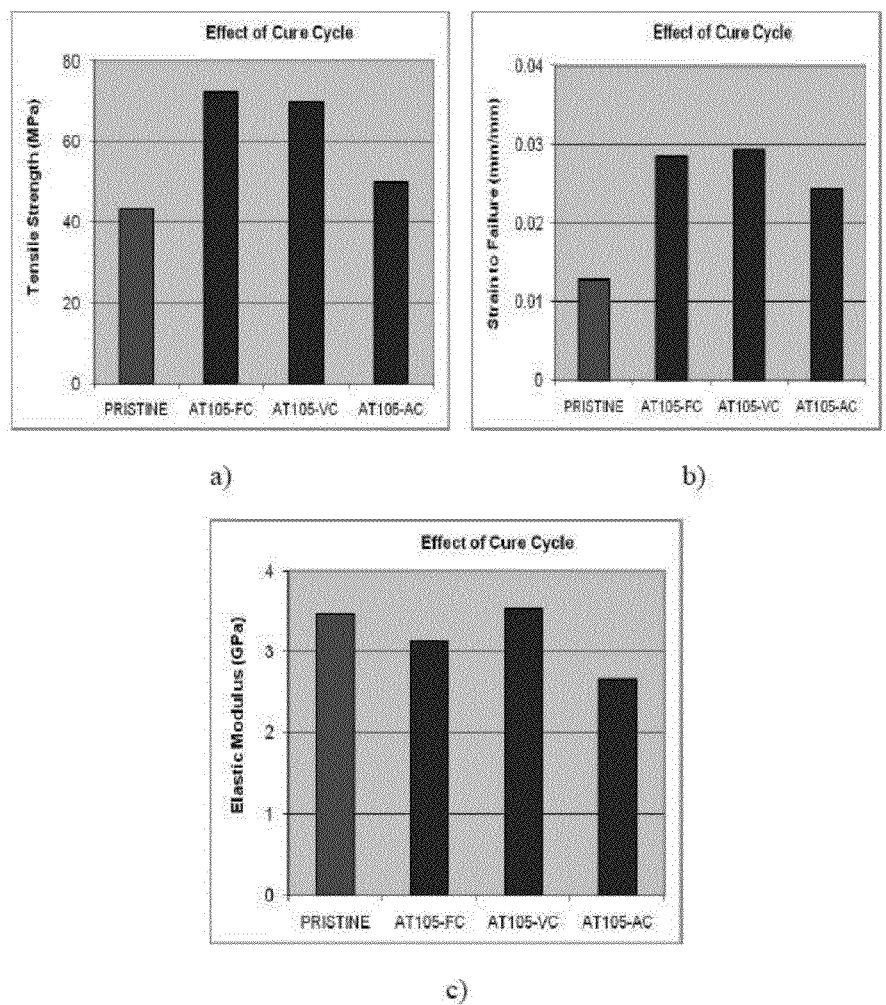
FIG. 13 illustrates a comparison of tensile test properties at 0.05% of acid treated SWCNTs for "F", "V", and "A" cure cycle a) ultimate tensile strength. b) strain-to-failure. c) elastic modulus.

FIGS. 13a, 13b, and 13c show a bar-chart comparison between the pristine epoxy and the acid treated SWCNTs nanoresins in terms of ultimate tensile strength, strain-to-failure, and elastic modulus employing the above mentioned cure cycles with percentage of inclusion fixed at 0.05%. A high ultimate strength was achieved by employing the slow cure cycle; strain-to-failure reached a high value by employing the medium cure cycle (FIGS. 13a and 13b). Strain-to-failure remained nearly constant regardless of the slow or medium cure cycle. The results in terms of ultimate strength and strain-to-failure for both 0.02% and 0.05% inclusions employing the three different cure cycles are nearly the same.

Figure 14:
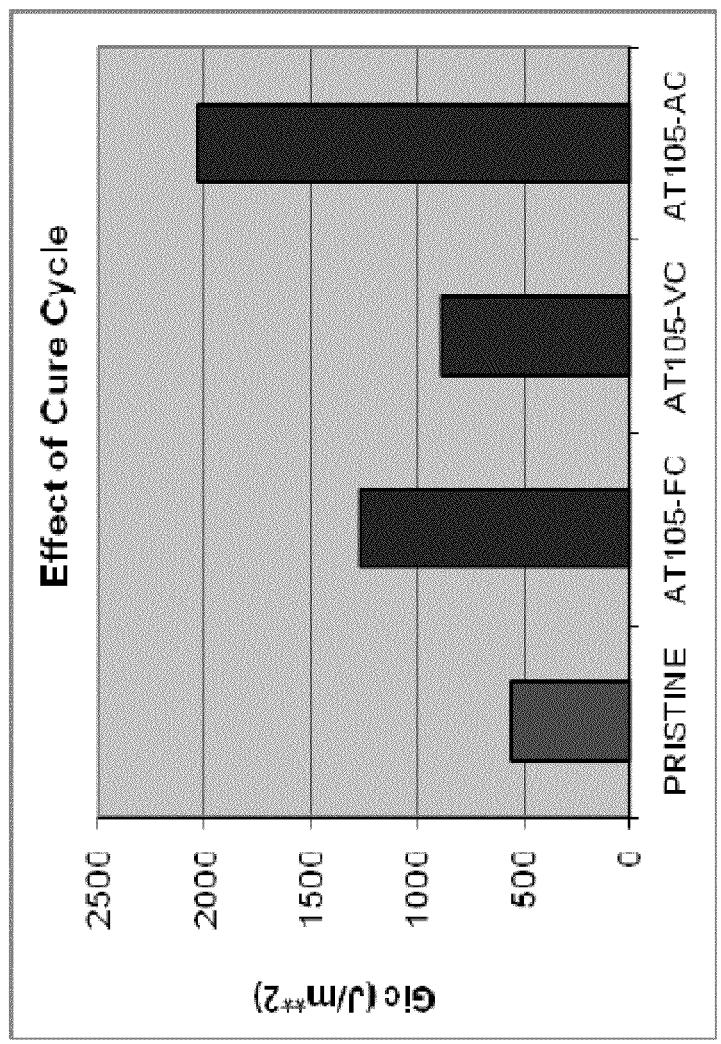
FIG. 14 illustrates a comparison of $G_{IC}$ at 0.05% loading for acid treated SWCNTs for "F", "V", and "A" cures.

FIG. 14 shows the comparison between the pristine epoxy and the acid treated SWCNT nanoresins in terms of strain energy release rate (i.e., $G_{IC}$) for the different cure cycles. Once again, the fracture toughness increased but in a random manner while the maximum $G_{IC}$ occurred employing the "A" type cure cycle similar to that of 0.02% inclusion case (FIG. 12).

Table 5 gives the comparison between the ultimate tensile strength, strain-to-failure, elastic modulus, and fracture toughness for the acid treated SWCNT nanoresins with the inclusion fixed at 0.05% and employing the three different cure cycles.

The results once again indicate that the mechanical properties are influenced by an alternative cure cycle. The results remained nearly identical as the acid treated inclusion increased from 0.02% to 0.05%. The percentage of enhancements are listed inside the parentheses. The acid treated SWCNT nanoresin had the next highest ultimate tensile strength after the graphene nanoresins and a higher fracture toughness with respect to the graphene nanoresin.

TABLE 5

Enhancements of acid treated SWCNTs nanoresins employing the three different cure cycles.

| Material | Strength (MPa) | Strain (mm/mm) | E (GPa) | $G_{IC}$ (J/M2) |
|---|---|---|---|---|
| Pristine Epoxy | 43.7 | 0.0128 | 3.47 | 553 |
| AT105-FC | 72.2 (65%) | 0.0285 (123%) | 3.14 (−11%) | 1271.6 (130%) |
| AT105-VC | 69.89 (60%) | 0.0294 (130%) | 3.53 (2%) | 890.5 (61%) |
| AT105-AC | 49.97 (14%) | 0.0244 (91%) | 2.65 (−18%) | 2042.99 (269%) |

II.4. Damping of the STRONGER & TOUGH Nanoresin:

It was found that the damping properties (i.e., vibration and acoustic controls) of the nanoresin was improved by about 300% as compared with the pristine resin.

III. Strong & Tough Nanoresin: SWCNT Nanoresins

This section focuses on the effects of the three proposed cure cycles from slow to fast on the mechanical properties of the SWCNTs nanoresins at 0.02% inclusion.

Specimen Name Description: The letters "SW" identify the SWCNTs, while the first number after the letters represent the number of plates manufactured, followed by the percentage of the SWCNTs employed. For the last two letters, the first letter indicates the type of cure cycle (e.g., "F" or "V", etc) while the second letter refers to the type of furnace (i.e., nanoprocessing equipment). For example, SW102-FC in FIG. 15. A convection oven was used for all the cases here.

III.1. Experimental Results

Figures 15A, 15B:
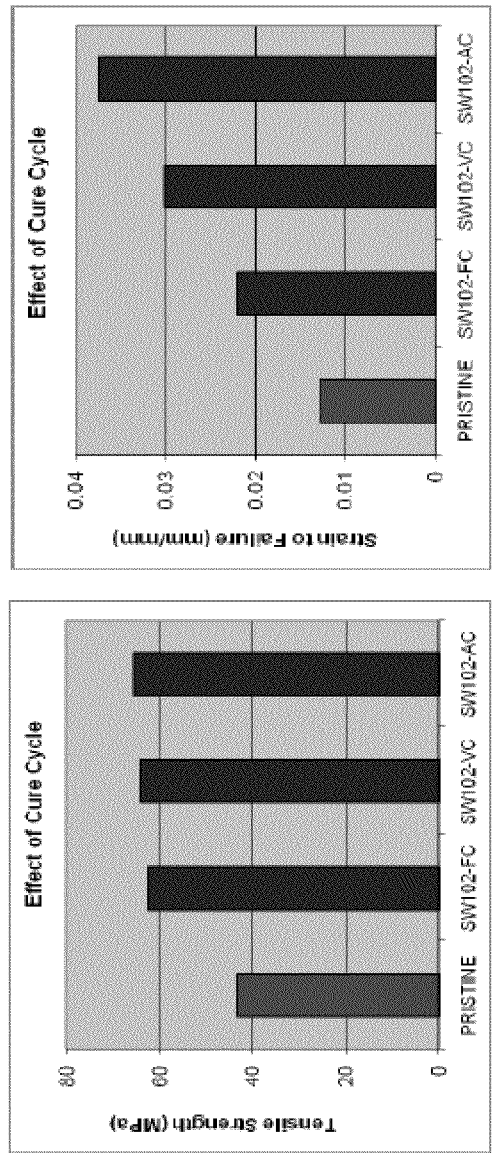
FIG. 15 illustrates a comparison of tensile test properties at 0.02% of SWCNTs for "F", "V", and "A" cure cycles a) ultimate tensile strength. b) strain-to-failure. c) elastic modulus.
Figure 15C:
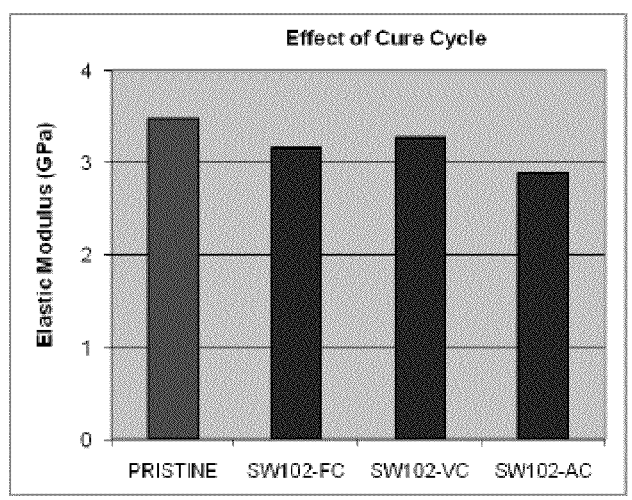

FIGS. 15a, 15b, and 15c compare pristine epoxy and SWCNTs nanoresins in terms of ultimate tensile strength, strain-to-failure, and elastic modulus for the three cure cycles when the percentage of inclusion remained fixed at 0.02%.

The results indicate that the ultimate strength increased slightly and remained almost identical regardless of the cure cycle (FIG. 15a). Strain-to-failure increased substantially and in a consistent manner as cure temperature increased and the cure time decreased (FIG. 15b). The elastic modulus degraded slightly from slow to fast cure cycle (FIG. 15c).

Figure 16:
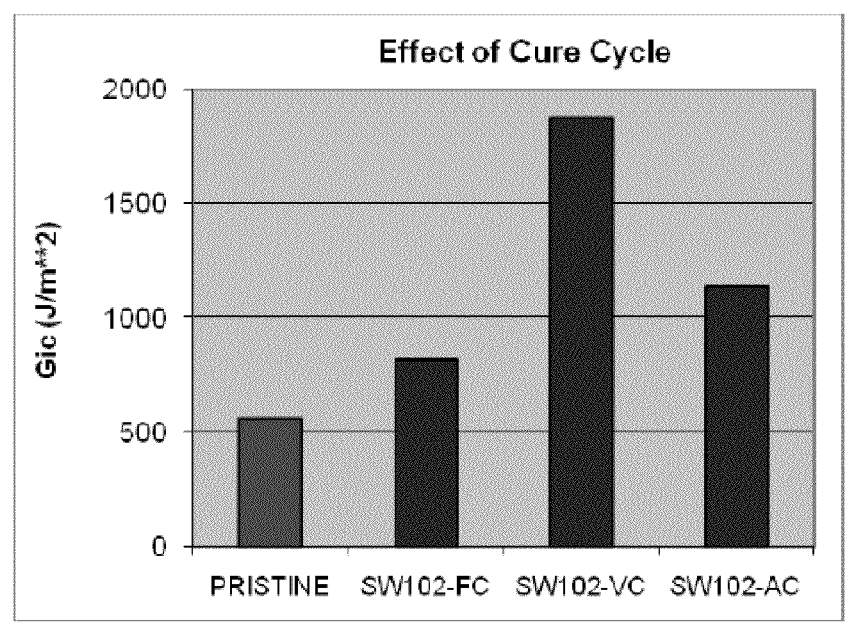
FIG. 16 illustrates a comparison of $G_{IC}$ at 0.02% loading of SWCNTs for "F", "V", and "A" cure cycles.

FIG. 16 shows the comparison between the pristine epoxy and the SWCNTs nanoresins in terms of strain energy release rate (i.e., $G_{IC}$) for the different cure cycles. The results indicate that $G_{IC}$ increases in a random manner and reached the maximum value employing the medium cure cycle.

Table 6 compares ultimate tensile strength, strain-to-failure, elastic modulus, and fracture toughness for the SWCNTs nanoresins with the inclusion fixed at 0.02% for all three different cure cycles. These data again demonstrate that the mechanical properties can be influenced by an alternative cure cycle. The percentage of the enhancements are listed inside the parentheses. The SWCNTs nanoresin was designated strong and tough due to having ultimate tensile strength and fracture toughness which are lower than the acid treated SWCNT nanoresins.

TABLE 6

Enhancements of SWCNTs nanoresins employing the three different cure cycles.

| Material | Strength (MPa) | Strain (mm/mm) | E (GPa) | $G_{IC}$ (J/M2) |
|---|---|---|---|---|
| Pristine Epoxy | 43.7 | 0.0128 | 3.47 | 553 |
| SW102-FC | 62.4 (43%) | 0.022 (72%) | 3.16 (−10%) | 819.6 (48%) |
| SW102-VC | 64.2 (47%) | 0.0302 (136%) | 3.27 (−6%) | 1872.7 (239%) |
| SW102-AC | 65.52 (50%) | 0.0374 (192%) | 2.89 (−20%) | 1140.71 (106%) |

III.2. Damping of the STRONG & TOUGH Nanoresin:

It was found that the damping properties (i.e., vibration and acoustic controls) of the STRONGE & TOUGH nanoresin was improved by about 300% as compared with the pristine resin.

IV. Tougher & Strong Nanoresin: Polyamic Acid Nanoresins

Polyamic acid is another exemplary reinforcing constituent that can be combined with a so-called pristine epoxy. Without being bound to any single theory, it is believed that polyamic acid molecules behave as rigid bars within the pristine epoxy as the molecules combine at a microscopic level after the curing process.

Polyamic acid is not soluble either in Part A or Part B of epoxy. Accordingly, dimethylacetamide solution (i.e., DMAC) was used as a solvent to resolve the required weight percentage of the polyamic acid, and a fluorosurfactant solution was used as a surfactant to reduce the liquid surface tension.

Polyamic acid has a yellowish color, has similar viscosity to that of pristine epoxy at room temperature, and is typically kept in a freezer. DMAC solution and fluorosurfactant agent are both colorless and are low in viscosity, similar to water. The curing cycle for polyamic acid was to cure at 200° C. for 30 minutes. The mixture of polyamic acid solution-epoxy is referred to as polyamic acid nanoresin.

Figure 17:
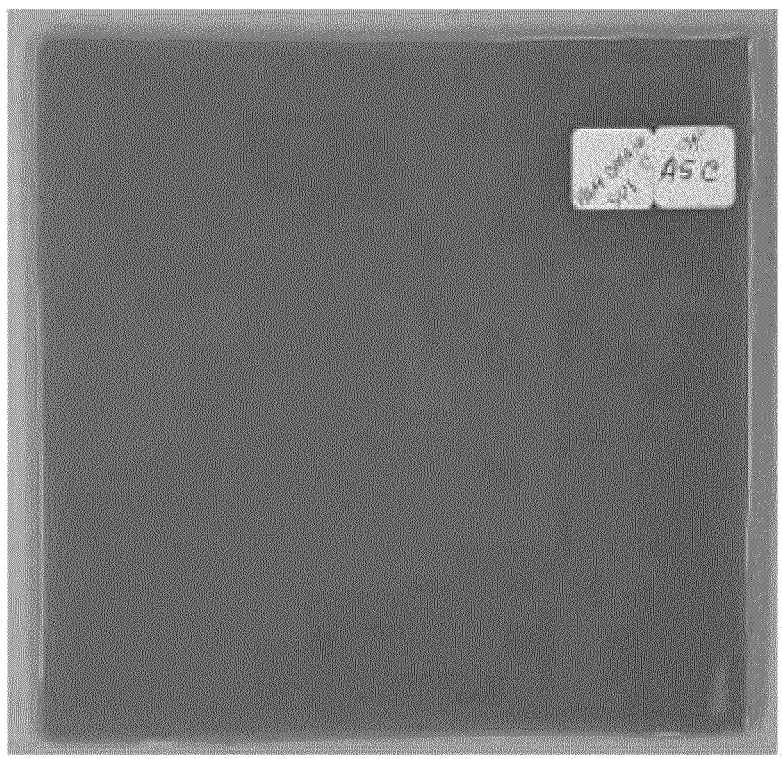
FIG. 17 illustrates a polyamic acid nanoresin plate.
Figure 18:
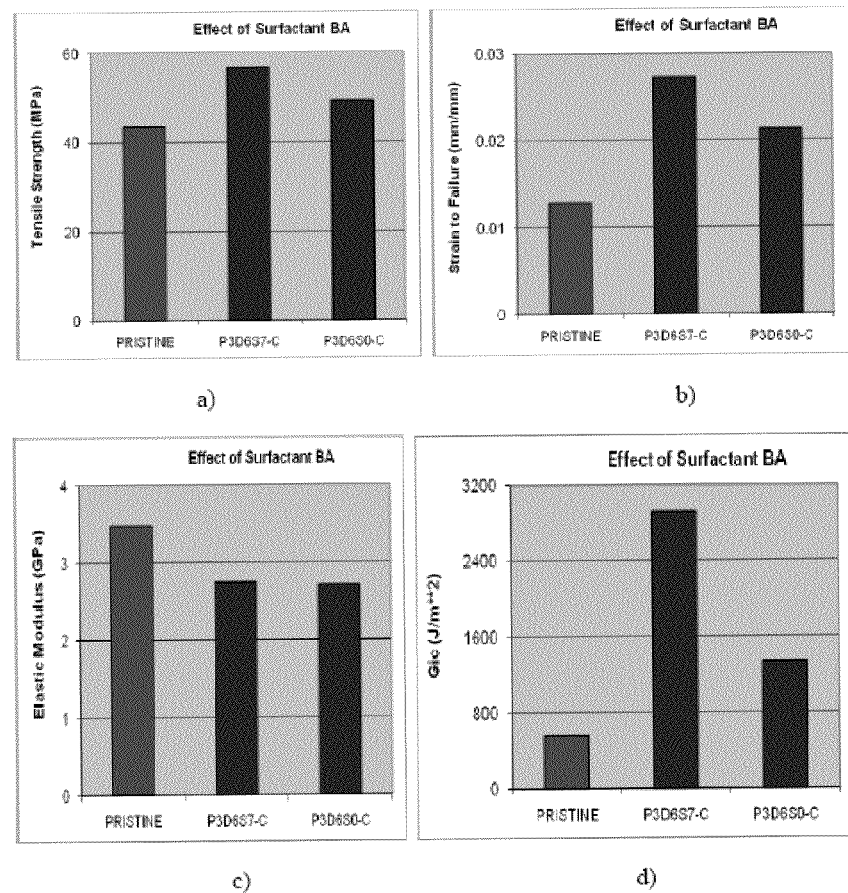
FIG. 18 illustrates the effects of the surfactant agent on the polyamic acid nanoresin a) ultimate tensile strength. b) strain-to-failure. c) elastic modulus. d) fracture toughness.
Figure 19:
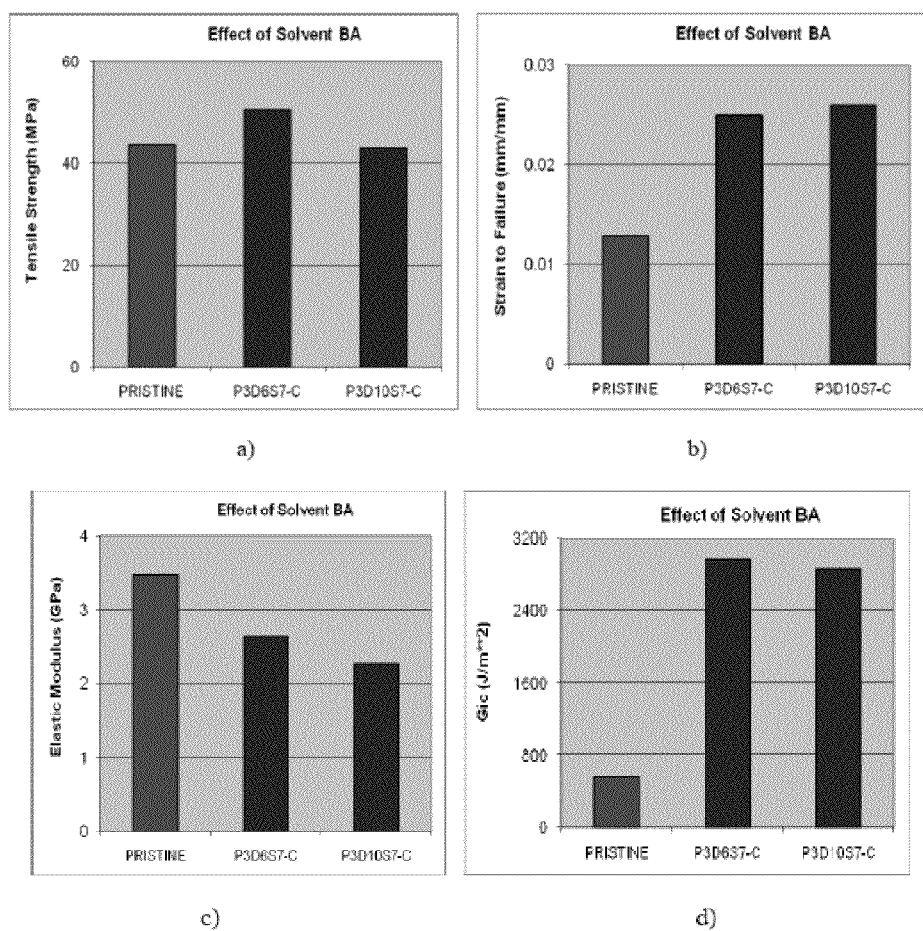
FIG. 19 illustrates the effects of DMAC solvent on the polyamic acid nanoresin mechanical properties a) ultimate tensile strength. b) strain-to-failure. c) elastic modulus. d) fracture toughness.

FIG. 17 shows a polyamic acid nanoresin plate cured for 30 minutes at 200° C. using the suggested mixing technique as explained above in the nanomanufacturing section. Visual examination of all plates manufactured showed no sign of air bubbles and very smooth surfaces due to the proper mixing technique. A yellowish color of the plate is representative of the polyamic acid within the mixture.

Polyamic acid solution was first mixed with Part B of the epoxy and then the resulting solution into Part A. A convection oven was used as the required furnace to cure the nanoresin plates.

Specimen Name Description:

The letter "P" refers to the polyamic acid, second letter "D" refers to the dimethylacetamide solvent, and the third letter "S" refers to the fluorosurfactant agent. The last letter identifies the type of high temperature furnace used either convection oven or autoclave. The numbers following the letters are representative of the weight percentages of each corresponding item. For example, P3D6S7-C refers to using 3% by weight polyamic acid, 6% by weight DMAC solvent, and "7" represents 0.7% by weight of the surfactant agent. The last letter "C" stands for convection oven or letter "A" for autoclave.

IV.1. Experimental Results

FIGS. 18a, 18b, 18c, and 18d demonstrate the effects of the fluorosurfactant agent as comparing the pristine epoxy with the polyamic acid nanoresins in terms of ultimate strength, strain-to-failure, elastic modulus, and fracture toughness, respectively. The results indicate that the ultimate strength, strain-to-failure, and fracture toughness are affected and enhanced by the usage of a surfactant agent. The elastic modulus degraded slightly and remained constant independent of the surfactant agent.

Table 7 gives the enhancements of the mechanical properties for the polyamic acid nanoresins utilizing 0.7% by weight of surfactant agent. Significant improvements in ultimate tensile strength by about 30%, strain-to-failure by about 26%, and fracture toughness by about 428% are attributed to the presence of the surfactant agent within the polyamic acid nanoresin which enhances the mixing and uniformity of the solution (and prevents separation). The percentage of the enhancements are listed in parentheses.

TABLE 7

Effects of the surfactant agent on the polyamic acid nanoresin properties.

| Material | Strength (MPa) | Strain (mm/mm) | E (GPa) | $G_{IC}$ (J/M2) |
|---|---|---|---|---|
| Pristine Epoxy | 43.7 | 0.0128 | 3.47 | 553 |
| P3D6S7-C | 56.65 (30%) | 0.0273 (113%) | 2.75 (−26) | 2918.42 (428%) |
| P3D6S0-C | 49.1 (12%) | 0.0214 (67%) | 2.71 (−28) | 1340.42 (142%) |

This section focuses on the effects of the dimethylacetamide solvent (i.e. DMAC) on the mechanical properties and enhancements of the polyamic acid nanoresins. Two different weight percentages of DMAC solvent 8% and 10% were selected, while the weight percentage of the required surfactant agent was kept constant at 0.7%.

FIGS. 19a, 19b, 19c, and 19d demonstrate the effects of the DMAC solvent, in comparing the pristine epoxy with the polyamic acid nanoresins in terms of ultimate strength, strain-to-failure, elastic modulus, and fracture toughness, respectively. The results indicate that the ultimate strength increased slightly at 8% by weight of the solvent and degraded at 10% by weight of the solvent.

Strain-to-failure increased and remained constant independent of the different percentages of the solvent. The elastic modulus degraded somewhat by increasing the amount of the solvent. The DMAC solvent had an effect on the fracture toughness in terms of making the pristine epoxy tougher.

Table 8 gives the enhancements of the mechanical properties for the polyamic acid nanoresins by utilizing different weight percentages of the DMAC solvent (i.e., 8% and 10%) while the surfactant agent was fixed at 0.7% by weight. For these combinations of polyamic acid nanoresins, the ultimate tensile strength was improved by about 15%, strain-to-failure by 95%, and fracture toughness by 437%, and elastic modulus was degraded by about 32% due to the inclusion of the DMAC solvent set at 8%. The percentage of enhancements are listed inside the parentheses. The polyamic acid nanoresin was labeled tougher and strong due to having fracture toughness which is much higher than the acid treated SWCNT and SWCNTs nanoresins while the ultimate tensile strength is much lower.

TABLE 8

Effects of the DMAC solvent on the polyamic acid nanoresin mechanical properties.

| Material | Strength (MPa) | Strain (mm/mm) | E (GPa) | $G_{IC}$ (J/M2) |
|---|---|---|---|---|
| Pristine Epoxy | 43.7 | 0.0128 | 3.47 | 553 |
| P3D8S7-C | 50.4 (15%) | 0.025 (95%) | 2.63 (−32%) | 2968 (437%) |
| P3D10S7-C | 42.97 (−2%) | 0.026 (103%) | 2.26 (−54%) | 2860 (417%) |

IV.2. Damping of the TOUGHER & STRONG Nanoresin:

It was found that the damping properties (i.e., vibration and acoustic controls) of the TOUGHER & STRONG nanoresin was improved by about 350% as compared with the pristine resin.

V. Toughest Nanoresin: DMAC Nanoresins

V.1. Effects of Dimethylacetamide Weight Fraction

Direct mixing of polyamic acid with Part A or Part B of epoxy may be performed where problem dimethylacetamide solution (i.e., DMAC) is used as a solvent, and a fluorosurfactant agent can also be used to reduce the liquid surface tension as demonstrated in the previous section. The DMAC solvent is colorless and low in viscosity liquid, similar to water. The mixture of DMAC solvent and epoxy resin is referred to as DMAC nanoresin.

To achieve this goal, DMAC nanoresins with three different weight percentages of DMAC, i.e., 4%, 8%, and 10% by weight were considered. The cure temperature for this family of DMAC nanoresins is the medium cure cycle designated by "V". Convection oven is utilized as the high temperature furnace.

Specimen Name Description:

A first code letter "E" refers to the epoxy followed by the letter "D" identifying the dimethylacetamide solution. The first number following letter "D" indicates the number of plates manufactured while the second number (or numbers) indicates the required weight percentage of DMAC solvent. The last two letters identify the type of the cure cycle employed (i.e., "V" for the medium cure cycle) followed by the type of high temperature furnace utilized such as convection oven (i.e., "C"), respectively. For example, ED14-VC refers to using 4% by weight of DMAC in an epoxy with "V" type cure cycle, and convection oven.

V.2. Results

Figure 20:
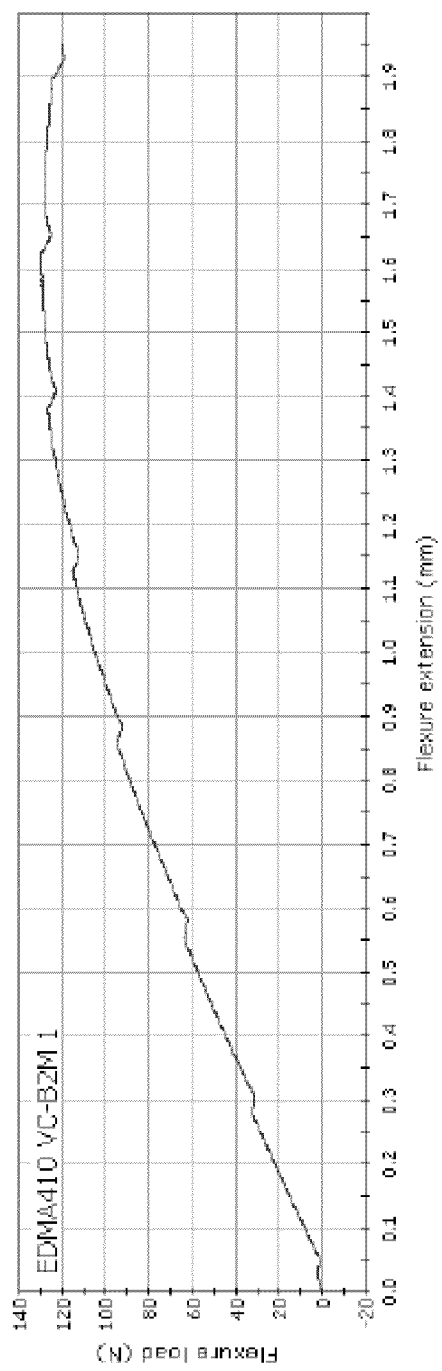
FIG. 20 illustrates exemplary load vs. load-point displacement for a DMAC nanoresin.

FIG. 20 shows an exemplary load vs. load-point displacement for a DMAC nanoresin with 10% of DMAC solution employing the medium cure cycle and utilizing a convection oven. Load vs. load point displacement curve is needed in order to calculate the fracture toughness (i.e., $G_{IC}$). For all the tests, the cross head travel rate was maintained at 0.25 mm/min. FIG. 21d shows the fracture toughness comparison vs. the weight fraction of DMAC between the pristine epoxy and the DMAC nanoresins. The $G_{IC}$ value increased almost in a linear manner with increase in DMAC.

Figure 21B:
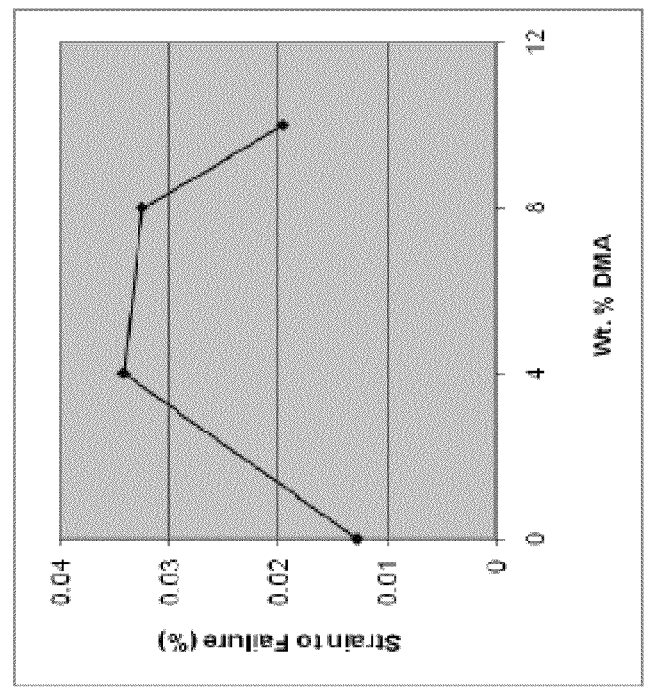
FIG. 21 illustrates the effects of DMAC weight % on DMAC nanoresins mechanical properties a) ultimate tensile strength. b) strain-to-failure. c) elastic modulus. d) fracture toughness.
Figure 21A:
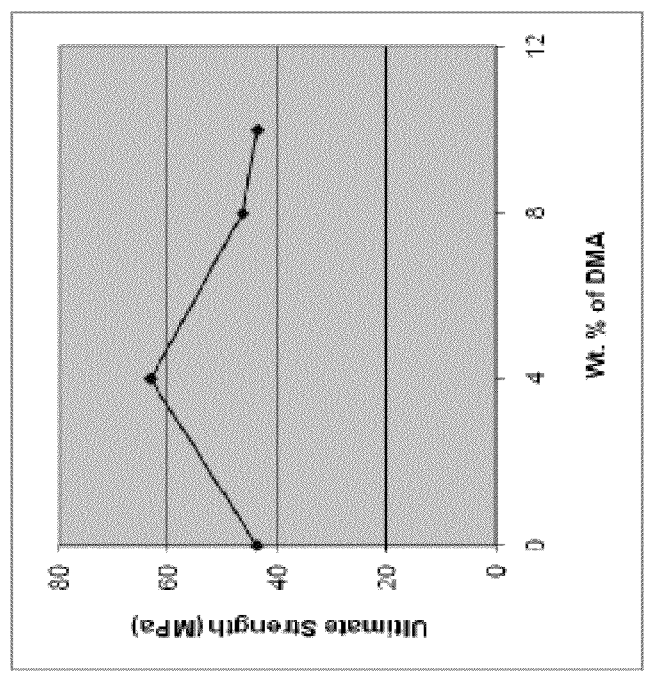
Figure 21D:
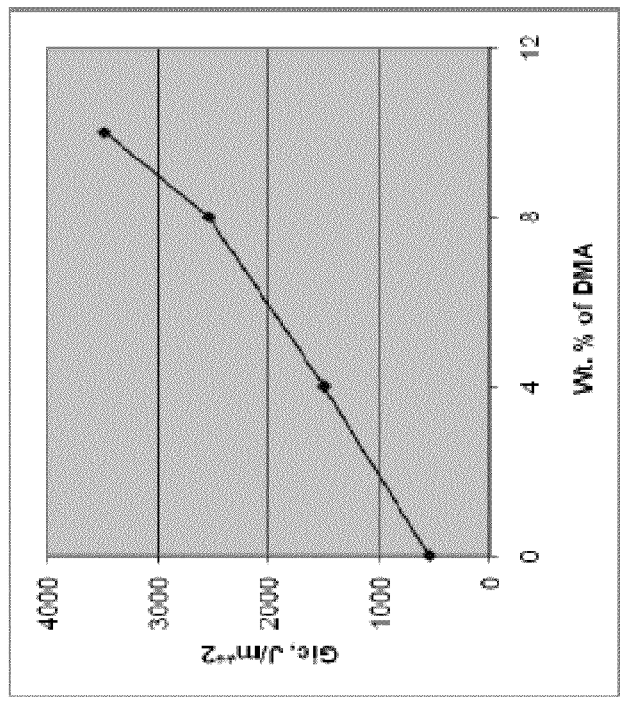
Figure 21C:
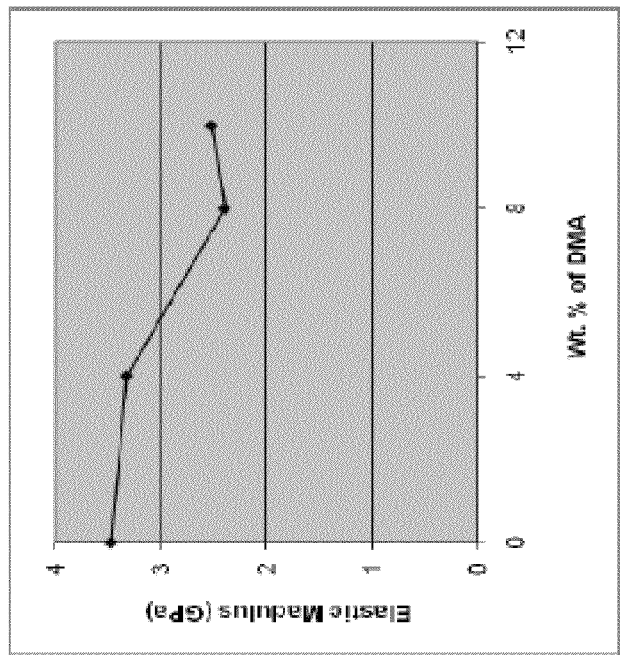

FIGS. 21a, 21b, and 21c show the comparison between the ultimate tensile strength, strain-to-failure, and elastic modulus vs. the DMAC weight fraction. The results indicate that the highest ultimate strength and the highest strain-to-failure were achieved at 4% by weight of DMAC. Beyond 4% DMAC inclusion, the ultimate strength reduced to the value of pristine epoxy while the strain-to-failure was about double. The elastic modulus degraded substantially as the DMAC percentage increased.

Without being bound to any single theory, DMAC nanoresins' mechanical properties are affected by the DMAC different weight fractions. Table 9 gives the alteration of the mechanical properties in terms of ultimate strength, strain-to-failure, elastic modulus, and fracture toughness as a function of the DMAC different weight fractions. The percentage of the enhancements or degradations are listed inside the parentheses, below.

TABLE 9

Effects of the DMAC weight fraction on mechanical properties.

| Material | Strength (MPa) | Strain (mm/mm) | E (GPa) | $G_{IC}$ (J/M2) |
|---|---|---|---|---|
| Pristine Epoxy | 43.7 | 0.0128 | 3.47 | 553 |
| ED14-VC | 63.18 (45%) | 0.0342 (167%) | 3.32 (−5%) | 1501 (171%) |

TABLE 9-continued

Effects of the DMAC weight fraction on mechanical properties.

| Material | Strength (MPa) | Strain (mm/mm) | E (GPa) | $G_{IC}$ (J/M2) |
|---|---|---|---|---|
| ED18-VC | 46.4 (6%) | 0.0325 (154%) | 2.39 (−45%) | 2547.5 (361%) |
| ED110-VC | 43.58 (−0.3) | 0.0196 (53%) | 2.52 (−38%) | 3492 (531%) |

V.3. Reproducibility of DMAC Nanoresins

The results demonstrate that the fracture toughness of the nanoresin improved by about 500% when the DMAC weight fraction was selected at 10%, while the ultimate tensile strength did not change as compared with the pristine resin (see Table 9). Also, the strain-to-failure demonstrated about 53% improvement at the 10% DMAC weight fraction, while the elastic modulus degraded by 38%.

To investigate the reproducibility of the results—especially the fracture toughness—two other DMAC nanoresin plates similar to that of ED110-VC were manufactured. FIGS. 22a, 22b, 22c, and 22d show the comparison between the ultimate tensile strength, strain-to-failure, elastic modulus, and fracture toughness, respectively for the three identical DMAC nanoresins manufactured at different times employing the same mixing technique.

Fracture toughness values remained constant and showed improvement of about 600% (FIG. 22d). The ultimate strength; however, remained in the range of the pristine epoxy (FIG. 22a). The strain-to-failure was improved significantly for the second plate by about 267% and by 580% for the third plate. The Elastic modulus degraded at about 100% for the third plate. Toughening of a brittle epoxy can be obtained using the DMAC nanoresin and at 10% weight fraction which demonstrated the highest fracture toughness.

Table 10 gives the enhancements of the mechanical properties in terms of ultimate strength, strain-to-failure, elastic modulus, and fracture toughness for three different DMAC nanoresins at 10% DMAC weight fraction. The percentage of enhancements or degradations are listed in the parentheses. The DMAC nanoresin was designated toughest due to having the highest fracture toughness.

TABLE 10

Reproducibility of data based on DMAC weight fraction of 10%.

| Material | Strength (MPa) | Strain (mm/mm) | E (GPa) | $G_{IC}$ (J/M2) |
|---|---|---|---|---|
| Pristine Epoxy | 43.7 | 0.0128 | 3.47 | 553 |
| ED110-VC | 43.58 (−0.3%) | 0.0196 (53%) | 2.52 (−38%) | 3492 (531%) |
| ED210-VC | 39.27 (−11%) | 0.047 (267%) | 1.96 (−77%) | 3830 (592%) |
| ED310-VC | 33.93 (−29%) | 0.0871 (580%) | 1.72 (−102%) | 3831.9 (593%) |

V.4. Damping of TOUGHEST Nanoresin:

It was found that the damping properties (i.e., vibration and acoustic controls) of the TOUGHEST nanoresin improved by about 400% as compared with the pristine resin.

Tunable Nanoresin Technology Converts Brittle Matrices into Tough Ones

Figure 23:
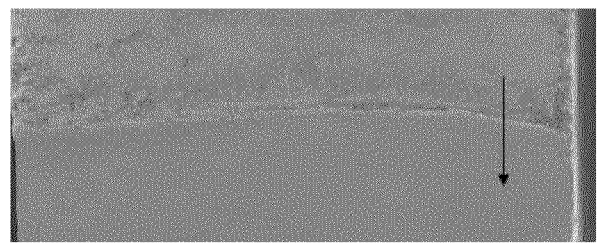
FIG. 23 illustrates low magnification SEM micrographs of SENB fracture surfaces of a) pristine epoxy, b) strongest nanoresin with suitable percentage of nanomaterial, and c) strongest nanoresin when the nanomaterial percentage exceeds the optimum value (crack tip propagation from top to bottom)
Figure 23:
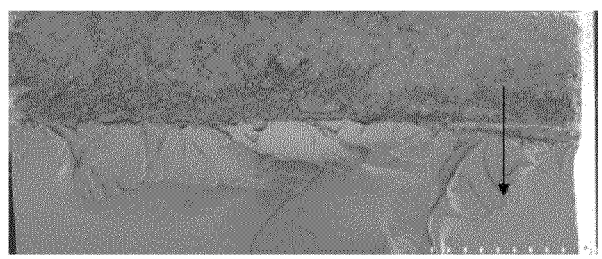
Figure 23:
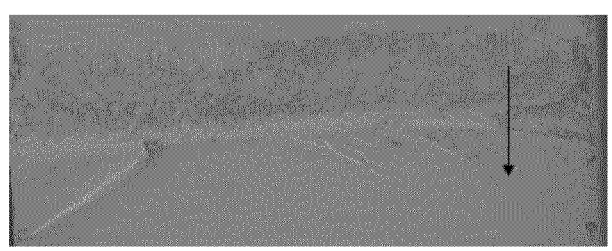

All various Tunable Nanoresins transferred, for example, the brittle pristine epoxy into a tough one with various degrees of toughness which of course increases as one moves from STRONGEST towards TOUGHEST. For example, FIG. 23 shows the transformation of the brittle pristine epoxy into a tough one for strongest ones (SEM obtained from the SENB tests). The pristine fracture surface demonstrate a brittle failure (see FIG. 23a); the Strongest Nanoresin with its percentage of Nanomaterials (e.g., see FIG. 4) exhibits a tough fracture surface (see FIG. 23b); and when the percentage of the nanomaterial inclusion exceeds well beyond a suitable value (e.g. see FIG. 4), once again, the fracture surface appeared brittle (see FIG. 23c).

Figure 24:
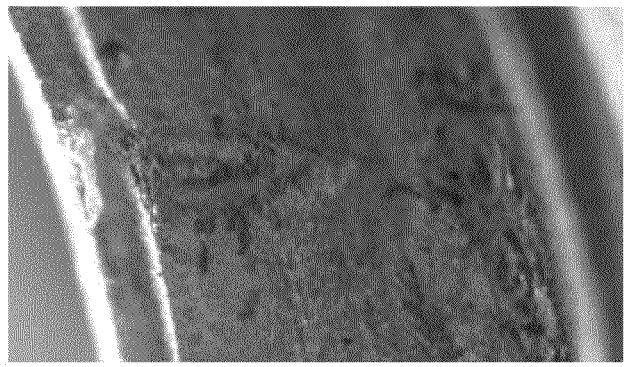
FIG. 24 illustrates low magnification SEM micrographs of drilled hole edges of a) pristine epoxy, b) strongest nanoresin, and c) toughest nanoresin.
Figure 24:
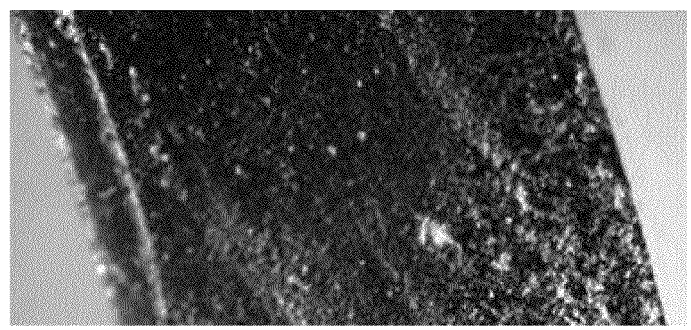
Figure 24:
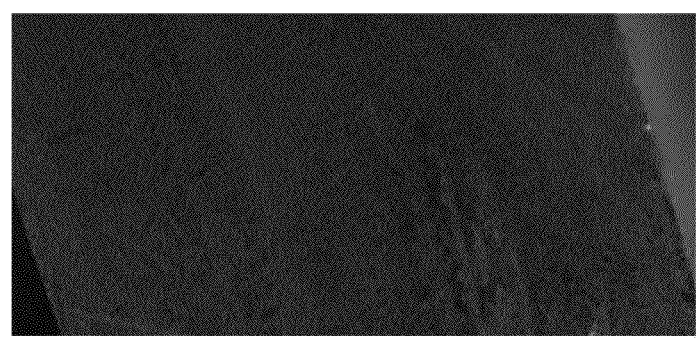

In addition, machining and drilling of the developed Nanoresin samples give far better cut-edge quality (free from cracks) as compared with those for the pristine resin (see FIG. 24).

Nanoresins Tunability Matrix (NTM)

To manufacture a desired nanoresin with a specific characteristic/properties over the entire spectrum from strongest to toughest and in between, one can use the Nanoresin Tunability Matrix (NTM) explained below. This matrix is a non-limiting tool that provides some basis for one of skill in the art to select the materials and processing techniques that may be well-suited to creation of a nanoresin with particular performance characteristics.

For a nanoresin having a desired property, its corresponding recipe, taken from the desired property column of the matrix, is provided after the NTM disclosed herein. This matrix is formed with the "Ti:j, k-l" components, where the "i" component gives a desired property and it can be either of the numbers 1 through 5 for the Strongest to Toughest, respectively (see the five columns under the "properties (i)" in the NTM). When "i" is fixed, then "j" goes from 1 to 6 (see the column under "parameter (j)" in the NTM), and for each "j" there is a fixed "k-l" (see the column under "ingredient (k-l) in the NTM). It should be noted that when there is no information available for "k" or "l" in the NTM, they take the value of "0".

The specific protocols for 1) Strongest, 2) Stronger & Tough, 3) Strong & Tough, 4) Tougher & Strong, and 5) Toughest are given following the NTM. In principle, for any application, when the desired properties are known (i.e., 1 through 5), then the recipe to produce the Nanoresins with the desired properties can be taken off the NTM, as given for the case of epoxy resin following the NTM, as examples developed and introduced in this work.

Nanoresin Tunability Matrix (NTM)
Tunable$_{NanoResin}$: $T_{NR}$ (i: j, k – l)
(i = property): Recipe (j = parameter, k = ingredient – l = ingredient mix)

| | | ←Properties (i)→ | | | | |
|---|---|---|---|---|---|---|
| ←Recipe (j, k – l)→ | | (1) | (2) Stronger & Tough | (3) Strong & Tough | (4) Tougher & Strong | (5) |
| Parameter (j) | Ingredient (k – l) | Strongest | | | | Toughest |
| (1) Resin | (1) Epoxy | T1: 1, 1 – 0 | T2: 1, 1 – 0 | T3: 1, 1 – 0 | T4: 1, 1 – 0 | T5: 1, 1 – 0 |
| | (2) Poly-ester | T1: 1, 2 – 0 | T2: 1, 2 – 0 | T3: 1, 2 – 0 | T4: 1, 2 – 0 | T5: 1, 2 – 0 |
| | (3) Vinyl-ester | T1: 1, 3 – 0 | T2: 1, 3 – 0 | T3: 1, 3 – 0 | T4: 1, 3 – 0 | T5: 1, 3 – 0 |
| (2) Nano-Materials | (1) FGr | T1: 2, 1 – 0 | T2: 2, 1 – 0 | T3: 2, 1 – 0 | T4: 2, 1 – 0 | T5: 2, 1 – 0 |
| | (2) FCNT | T1: 2, 2 – 0 | T2: 2, 2 – 0 | T3: 2, 2 – 0 | T4: 2, 2 – 0 | T5: 2, 2 – 0 |
| | (3) SWCNTs | T1: 2, 3 – 0 | T2: 2, 3 – 0 | T3: 2, 3 – 0 | T4: 2, 3 – 0 | T5: 2, 3 – 0 |
| | (4) Polyimide | T1: 2, 4 – 0 | T2: 2, 4 – 0 | T3: 2, 4 – 0 | T4: 2, 4 – 0 | T5: 2, 4 – 0 |
| | (5) DMAC | T1: 2, 5 – 0 | T2: 2, 5 – 0 | T3: 2, 5 – 0 | T4: 2, 5 – 0 | T5: 2, 5 – 0 |
| (3) Nano-Manufacturing (Percentage of Nanomaterial) | (1) 0.001 < x < 0.01 | T1: 3, 1 – 0 | T2: 3, 1 – 0 | T3: 3, 1 – 0 | T4: 3, 1 – 0 | T5: 3, 1 – 0 |
| | (2) 0.01 < x < 0.05 | T1: 3, 2 – 0 | T2: 3, 2 – 0 | T3: 3, 2 – 0 | T4: 3, 2 – 0 | T5: 3, 2 – 0 |
| | (3) 0.05 < x < 0.1 | T1: 3, 3 – 0 | T2: 3, 3 – 0 | T3: 3, 3 – 0 | T4: 3, 3 – 0 | T5: 3, 3 – 0 |
| | (4) 0.1 < x < 0.5 | T1: 3, 4 – 0 | T2: 3, 4 – 0 | T3: 3, 4 – 0 | T4: 3, 4 – 0 | T5: 3, 4 – 0 |
| | (5) 0.5 < x < 1.0 | T1: 3, 5 – 0 | T2: 3, 5 – 0 | T3: 3, 5 – 0 | T4: 3, 5 – 0 | T5: 3, 5 – 0 |
| | (6) 1.0 < x < 5.0 | T1: 3, 6 – 0 | T2: 3, 6 – 0 | T3: 3, 6 – 0 | T4: 3, 6 – 0 | T5: 3, 6 – 0 |
| | (7) 5.0 < x < 10.0 | T1: 3, 7 – 0 | T2: 3, 7 – 0 | T3: 3, 7 – 0 | T4: 3, 7 – 0 | T5: 3, 7 – 0 |
| (4) Nano-Manufacturing (k = 1: Nanomaterial Preparation) | (1) Sonication, Dispersion, & Mixing Sonication & Dispersion (Time: Two days) Mix with Part A and Partial removal of Solvent (Time: 10 Minutes) Sonication for Degasing (Time: 10 Minutes) | T1: 4, 1 – 2 | T2: 4, 1 – 2 | T3: 4, 1 – 2 | T4: 4, 1 – 2 | T5: 4, 1 – 2 |
| (4) Nano-Manufacturing (l = 2: Nanomaterial Mixing) | (2) Shear Mixing Cold Air Flow, Extra Solvent Evaporation, and Bubble Bursting (Time: 1 to 2 Days) Finally Mixing with Part B (Time: 10 Minutes) | T1: 4, 1 – 2 | T2: 4, 1 – 2 | T3: 4, 1 – 2 | T4: 4, 1 – 2 | T5: 4, 1 – 2 |
| (4) Nano-Manufacturing (l = 3: Nanomaterial Mixing) | (3) Polyamic Acid Mixing Polyamic & DMAC Mixing (Time: 5 minutes) Adding Surfactant (Time: 5 minutes) Sonication (Time: 2 minutes) | T1: 4, 0 – 3 | T2: 4, 0 – 3 | T3: 4, 0 – 3 | T4: 4, 0 – 3 | T5: 4, 0 – 3 |

-continued

Nanoresin Tunability Matrix (NTM)
Tunable $_{NanoResin}$: $T_{NR}$ (i: j, k - l)
(i = property): Recipe (j = parameter, k = ingredient - l = ingredient mix)

| Recipe (j, k - l) | | ← Properties (i) → | | | | |
|---|---|---|---|---|---|---|
| Parameter (j) | Ingredient (k - l) | (1) Strongest | (2) Stronger & Tough | (3) Strong & Tough | (4) Tougher & Strong | (5) Toughest |
| (4) Nano-Manufacturing (1 = 4: Nanomaterial Mixing) | (4) DMAC Mixing DMAC and Part A (Time: 15 minutes) Degassing (Time: 10 minutes) Leave Over Night Add Part B (Time: 10 minutes) Add to Part B (Time: 30 minutes) Add to Part A (Time: 10 minutes) | T1: 4, 0 – 4 | T2: 4, 0 – 4 | T3: 4, 0 – 4 | T4: 4, 0 – 4 | T5: 4, 0 – 4 |
| (5) Nano-Processing (Cure Cycle) | (1) Slow CC ("F") | T1: 5, 1 – 0 | T2: 5, 1 – 0 | T3: 5, 1 – 0 | T4: 5, 1 – 0 | T5: 5, 1 – 0 |
| | (2) Medium CC ("V") | T1: 5, 2 – 0 | T2: 5, 2 – 0 | T3: 5, 2 – 0 | T4: 5, 2 – 0 | T5: 5, 2 – 0 |
| | (3) Fast CC ("A") | T1: 5, 3 – 0 | T2: 5, 3 – 0 | T3: 5, 3 – 0 | T4: 5, 3 – 0 | T5: 5, 3 – 0 |
| (6) Nano-Processing (Equipment) | (1) Conv. Oven (for Nanoresins) | T1: 6, 1 – 0 | T2: 6, 1 – 0 | T3: 6, 1 – 0 | T4: 6, 1 – 0 | T5: 6, 1 – 0 |
| | (2) Autoclave (for Nanocomposites) | T1: 6, 2 – 0 | T2: 6, 2 – 0 | T3: 6, 2 – 0 | T4: 6, 2 – 0 | T5: 6, 2 – 0 |

1) Strongest: T1: 1, 1 – 0; T1: 2, 1 – 0; T1: 3, 1 – 0 (0.006%); T1: 4, 1 – 2; T1: 5, 2 – 0; T1: 6, 1 – 0
2) Stronger & Tough: T2: 1, 1 – 0; T2: 2, 2 – 0; T2: 3, 3 – 0 (0.05%); T2: 4, 1 – 2; T2: 5, 1 – 0; T2: 6, 1 – 0
3) Strong & Tough: T3: 1, 1 – 0; T3: 2, 3 – 0; T3: 3, 2 – 0 (0.02%); T3: 4, 1 – 2; T3: 5, 2 – 0; T3: 6, 1 – 0
4) Tougher & Strong: T4: 1, 1 – 0; T4: 2, 4 – 0; T4: 3, 6 – 0 (3.0%); T4: 4, 0 – 3; T4: 5, 3 – 0; T4: 6, 1 – 0
5) Toughest: T5: 1, 1 – 0; T5: 2, 5 – 0; T5: 3, 7 – 0 (10.0%); T5: 4, 0 – 4; T5: 5, 2 – 0; T5: 6, 1 – 0

The above components are shown in bold face in the NTM. Other components in the NTM, shown in "plain text," are for other cases to demostrate the possibilities of producing high performance Tunable Nanoresin using other materials than epoxy systems directly discussed here.

SUMMARY

To improve pristine epoxy mechanical properties and at the same time achieve tunability among those properties, five different groups of nanomaterials and various production processes were considered. The nanomaterials range from acid treated graphene sheets, acid treated single walled carbon nanotubes, single-walled carbon nanotubes, polyamic acid, and dimethylacetamide.

It was demonstrated experimentally that nanomaterials can enhance mechanical properties in form of ultimate tensile strength, strain-to-failure, fracture toughness, and damping. There are also variations within each group in terms of strength, strain-to-failure, fracture toughness, and damping as either the load fraction of the nanomaterial varies or an alternative form of cure cycle is employed.

Experimental findings demonstrated that graphene nanoresins exhibited the highest ultimate tensile strength in their group while also having the lowest fracture toughness and damping properties improvements. DMAC nanoresins exhibited the highest fracture toughness and damping improvements in their group and the lowest ultimate strength; while the remaining nanoresins showed properties which fall in between.

The tunability among these five groups of nanoresins was shown by the existence of a nanoresin having a highest ultimate strength which is referred to as the strongest (i.e., graphene nanoresins) on one extreme to the toughest nanoresins having the highest fracture toughness and damping improvements (i.e., DMAC nanoresins) on the other extreme.

Acid treated SWCNTs nanoresin is the stronger & tough nanoresin since its average ultimate strength is lower than that of the graphene nanoresins. The SWCNT nanoresin is the strong & tough nanoresin; and finally, polyamic acid nanoresin is the tougher & strong nanoresin since its average fracture toughness is lower than of DMAC nanoresins which is the toughest nanoresin.

Effects of Nanoresins on the Mechanical Properties of Composite Laminates

As described elsewhere herein, the novel tunable nanoresins present major mechanical properties improvements such as ultimate tensile strength, modulus, and strain-to-failure; flexural strength and modulus; fracture toughness; and damping for epoxy matrix systems. The epoxy matrix system has been studied and development techniques have been established to improve nanoresin tensile strength up to about 70%, strain-to-failure up to about 300%, fracture toughness up to about 600%, and damping up to about 400%.

This section addresses the effects of the inclusion of nanoresins on the mechanical properties of the composite laminates, which materials are referred to as nanocomposites. To evaluate the mechanical properties of the nanocomposites compared with the pristine-based composites, symmetrical composite laminates were manufactured. To achieve these goals two different nanoresins as well as two different reinforcing fibers were considered.

Experimentally, the selected nanoresins were those having the highest ultimate tensile strength; namely, graphene nanoresin at 0.08% by weight of graphene (i.e., strongest) and acid treated nanoresin at 0.06% by weigh of SWCNTs (i.e., stronger and tough). Unidirectional carbon fibers (Tory, T700) and E-glass plain weave fabric were used to manufacture the composite laminates employing the wet lay-up technique.

Tensile testing in the longitudinal direction, based on ASTM D 3039 (at least 5 coupons were tested) provided ultimate tensile strength, strain-to-failure, and elastic modulus of composites in the longitudinal direction for the pristine-based composite as well as nanoresin-based nanocomposite laminates.

Flexural (4-Point-Bending) tests in the longitudinal directions were performed to establish the flexural strength and modulus, employing the ASTM D 6272 Flexural test standard. Double Cantilevered Beam (DCB) tests were performed to determine the Mode I fracture toughness properties employing ASTM D 5528-01 testing standards. Finally, damping tests have been performed to establish the composites & nanocomposites damping properties.

Manufacturing Steps for Composite Laminates

A vacuum bagging method and autoclave oven with controlled temperature and pressure was used to manufacture pristine composite as well as nanocomposite laminates employing our high performance nanoresins based on the Strongest nanoresin (i.e., graphene nanoresin) as well as Stronger & Tough nanoresin (i.e., acid treated SWCNTs nanoresin). Aluminum plates with polished surfaces were employed as the bottom and the top plates to fabricate flat symmetrical composite laminates made of either unidirectional Carbon fiber tapes or E-glass plain weave fabrics.

Figure 25:
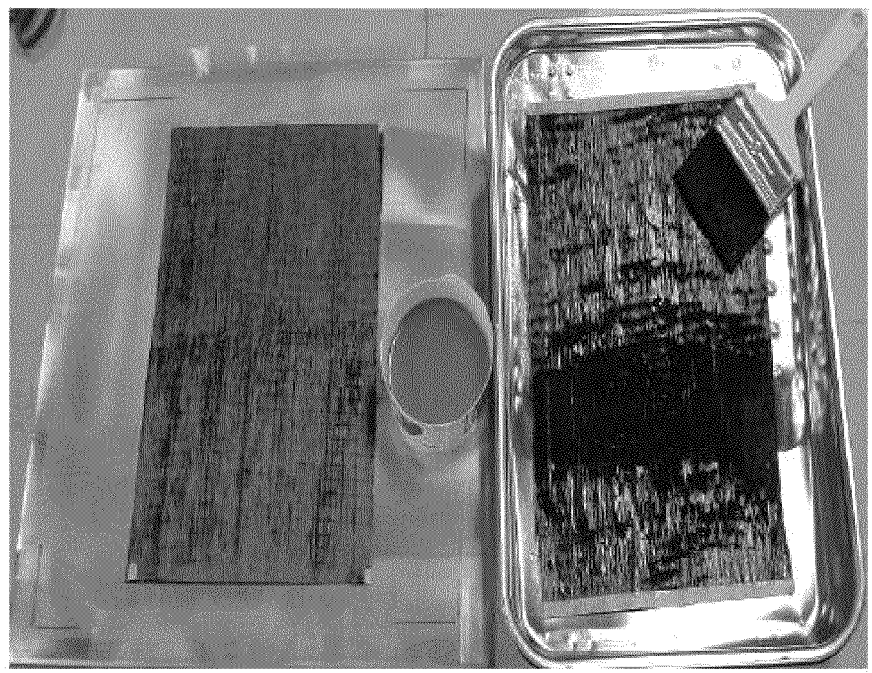
FIG. 25 illustrates bottom aluminum plate and wetting dish with a unidirectional carbon fiber tape in place.

Both aluminum plates had square shapes where the bottom plate had the overall dimensions of 17×17 inches while the top plate was smaller and had dimensions of 14×14 inches. Both aluminum plates were wrapped tightly all around entirely with Teflon sheets which were securely taped to the back surfaces of the plates to provide even more smooth surfaces. Teflon sheets achieve two goals; first, easy removal of the composite laminate from the aluminum plates and; secondly, a desired finish surface that is very smooth and wrinkle free (FIG. 25).

All samples were cut from these composite panels, having overall dimensions of 8.0 inches in width and 12.0 inches in length. The thickness of the panels was defined by the ASTM standards in the range of 0.040 inches. Plies were cut into exemplary dimensions (i.e., 8.0×12.0 inches) from a longer roll. To keep individual fibers in place, after cutting the plies, their ends were secured using regular taps. The fiber tapes were wetted out by the resins and were laid down by placing and pressing the individual wet plies on top of each other and on the aluminum plates (see FIG. 25).

The following is a non-limiting method of fabricating the inventive materials. First, the user places the first ply for "resin-wetting" in a larger dish. Next, the user may dip the brush half way within the resin pool and let it absorb the epoxy resin, without removing excess resin. The user may touch the ply surface with the brush at several places and at equal intervals from the lower end all the way to the upper end, repeating this action along the ply width.

The resins (e.g., epoxy—other resins may be used in the composites) are suitably uniformly distributed. The user may then spread the epoxy resin over the entire ply surface, with full strokes going from the lower end all the way to the upper end, applying pressure to the brush handle, suitably brushing in only one direction with complete strokes.

To minimize individual fibers from pulling out during plies-wetting, the ends of the plies were secured by tapping both ends along the width direction (FIG. 25). Before transferring the first resin-wet ply to the proper location on the bottom aluminum plate, the Teflon surface is suitably brushed with the epoxy resin material as well. The user may then lay down the first ply from the resin-wet side on the top of the bottom aluminum plate, which is also uniformly wetted with the resin material. This process ensures complete fiber wetting and full resin infiltration within the fiber bundles and tows (FIG. 25).

The user then suitably replaces the second ply inside the wetting dish and, once again, resin-wets only the top surface of the ply at several places and at equal distances from the lower end to the upper end.

The user suitably spreads the resin by applying uniform pressure to the brush handle with full stroke only in one direction from the lower end to the upper end, repeating this process and applying also the resin material to the top surface of the first ply (already laid down). The second ply is suitably transferred from the wetting-dish and laid on the top surface of the first ply, such that the resin-wet surface of the second ply goes on the top surface of the resin-wet surface of the first ply.

The second ply is suitably held at about 90 degrees (i.e., vertically in space) with respect to the first ply when only the upper ends are in contact. The second ply is suitably laid down by decreasing this space angle form 90 to 0 degrees where eventually the lower ends come in contact; this process minimizes the "air-entrapment" between the layers.

Figure 26:
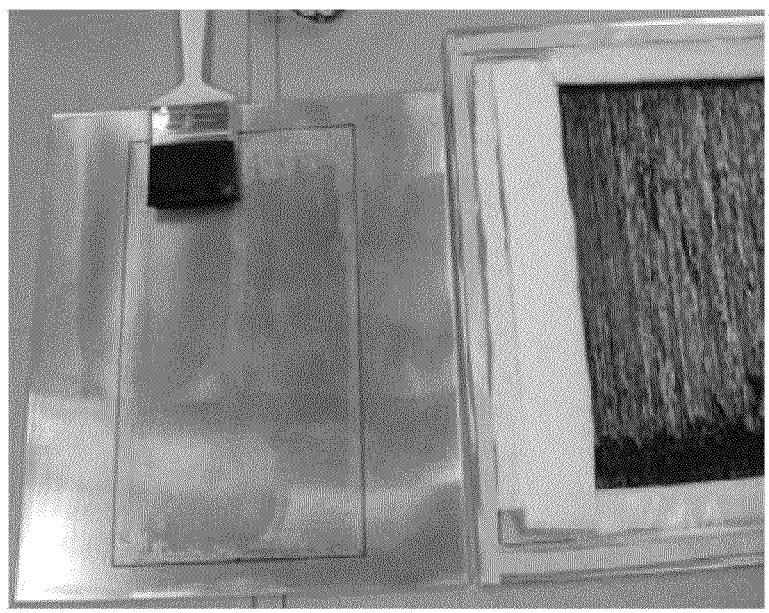
FIG. 26 illustrates a bleeder frame disposed around a uni-directional carbon/epoxy composite panel.

The top ply is suitably pressed against the bottom ply using a roller to achieve a good fiber wet-out and to remove any excess resin and entrapped air as well as provide good compaction and wrinkle-free surface. This process eliminates fiber dry spots and diminishes air pockets which are both detrimental to the performance of composites. The resin is suitably uniformly distributed on the last ply top surface and on the Teflon surface of the top aluminum plate that is placed on the top of this last ply (FIG. 26). Finally, the composite panel/laminate is framed at all four edges employing a layer of bleeder material to entrap the excess resin during the vacuum process and heating which follow later (FIG. 26).

Figure 27:
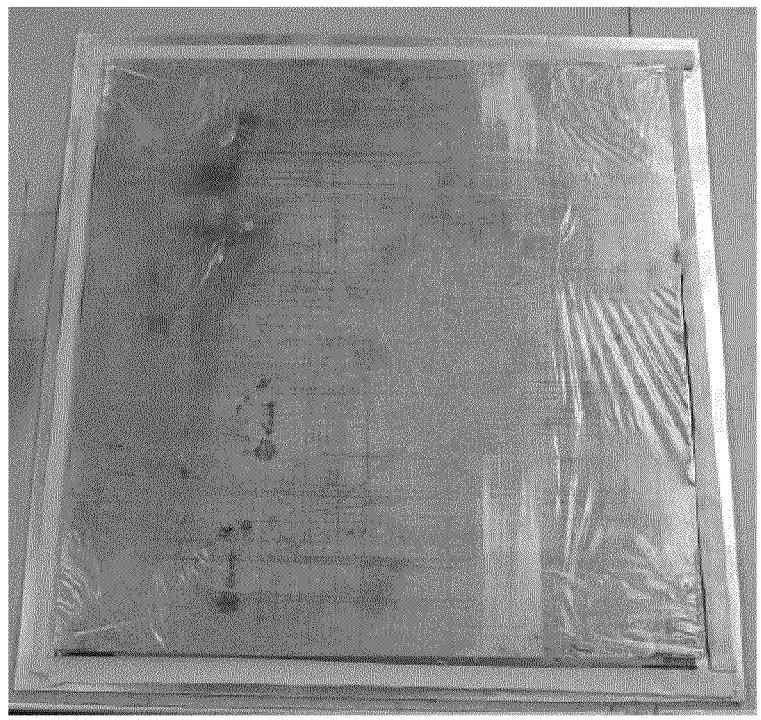
FIG. 27 illustrates a high temperature sealing tape.
Figure 28:
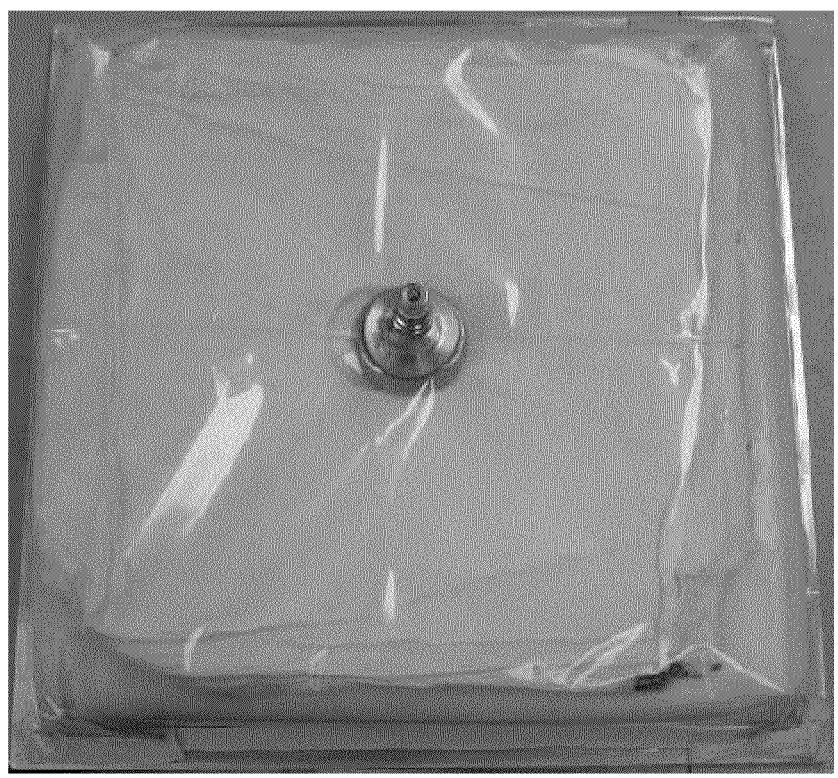
FIG. 28 illustrates a complete vacuum bag assembly.

In this exemplary embodiment, the top aluminum plate is replaced with the resin-wet section sitting on the top of the last ply within the pre-determined location as marked previously. To complete the vacuum bagging process, high temperature sealing tape (the tape disposed about the border of the composition illustrate in in FIG. 27) is placed onto the bottom plate near the four edges (FIG. 27). The bleeder material system—which consists of several layers of bleeder sheets—is disposed atop the top aluminum plate to absorb the volatiles (generated during the heating and curing) and excess resin. Next, the vacuum connection is placed over the bleeder sheets, completing the vacuum bagging process (FIG. 28). Then, the whole assembly is placed inside an autoclave where the heat and pressure are applied. In some cases, the pressure was applied only through the vacuum pump and in the range of 14 Psi for all the composite panels manufactured here. To cure the composite laminates, the corresponding cure cycle for the resin and nanoresins were applied, and instead of the convection oven autoclave was used.

Pristine Composite and Nanocomposites Tensile Testing

To investigate the effects of the novel enhanced nanoresins on the mechanical properties of composite laminates, pristine composite using pristine resin and nanocomposite laminates using the enhanced nanoresins based on improved ultimate tensile strength were manufactured.

To improve the ultimate tensile strength, strain-to-failure, and elastic modulus of the composite, the corresponding selected nanoresins with demonstrated significant improvements in ultimate tensile strength, strain-to-failure, and fracture toughness were employed. For example, the graphene nanoresin (e.g., 0.08% by weight graphene) cured employing the medium or "V" type cure cycle showed about 70% improvement in the ultimate tensile strength, 189% improvement in the strain-to-failure, slight reduction of about 10-14% in the elastic modulus, and about 88% improvement in the fracture toughness in comparison with the pristine resin.

Figure 29:
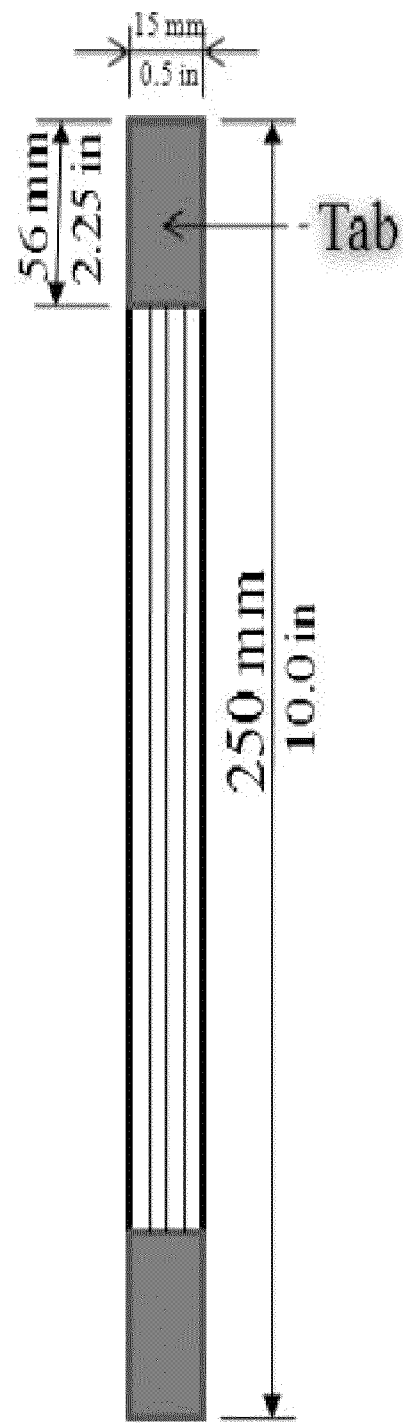
FIG. 29 illustrates uni-directional (UD) composite specimen geometry for tensile testing.

Composite panels using pristine epoxy (i.e., pristine composite) and nanoresins (i.e., nanocomposite) were manufactured for tensile loading employing ASTM D 3039 standards. FIG. 29 shows the specimen geometry as defined by the ASTM code. All specimens were cut from composite panels with overall dimensions of 203×305 mm (8.0×12.0 inches). All the specimens were about 250 mm (10.0 in) long and 15 mm (~0.5 in) wide. Aluminum tabs with overall dimensions of 56 mm (2.25 in) long, 15 mm (~0.5 in) wide, and 1.75 mm (0.0695 in) thick were bonded to the specimen's end employing high shear strength epoxy glue. Rate of loading as suggested by the ASTM standard was set at 2 mm/min (0.08 in/min) for all the specimens tested here. To ensure the accuracy of the results such as ultimate tensile strength, strain-to-failure, and elastic modulus, 5 coupons were tested for each case.

Results from tensile testing on composite laminates manufactured from two different nanoresins (i.e., graphene and acid treated SWCNT) as well as using two different reinforcements (i.e., unidirectional carbon fibers and E-glass plain weave fabric) are tabulated in Tables 11, 12, and 13. These tables demonstrate the comparison between the pristine composite with that of nanocomposite employing our enhanced nanoresin based on the Strongest tunable nanoresin (i.e., graphene nanoresin) and Stronger & Tough nanoresin (i.e., acid treated SWCNTs). Therefore, Table 11. has the comparison between the pristine composite and the nanocomposite using graphene nanoresin (i.e., 0.08% by weight graphene) and unidirectional carbon fibers as reinforcements. The results indicate that the ultimate tensile strength was improved by about 40.26%, strain-to-failure by about 31.70%, and elastic modulus by about 4.3%.

TABLE 11

Carbon fiber/graphene nanoresin composite comparisons for tensile strength, strain-to-failure, and modulus.

| Material | Ultimate Strength (MPa) | Strain-to-Failure (mm/mm) | Elastic Modulus (GPa) |
|---|---|---|---|
| Pristine Composite (UD Carbon Fiber) | 883.274 | 0.0164 | 54.65 |
| Graphene NanoComposite (0.08% Graphene) | 1238.93 (40.26%) | 0.0216 (31.70%) | 57.0 (4.30%) |

Table 12 compares pristine composite with the nanocomposite manufactured using E-glass plain weave fabric and acid treated SWCNTs as nanoresin (i.e., 0.06% by weight SWCNTs). In this nanocomposite ultimate tensile strength enhanced by about 53%, strain-to-failure improved by about 26%, and elastic modulus increased by about 33.5%.

TABLE 12

E-glass/acid treated nanoresin composite comparison for ultimate tensile strength, strain-to-failure, and modulus.

| Material | Ultimate Strength (MPa) | Strain-to-Failure (mm/mm) | Elastic Modulus (GPa) |
|---|---|---|---|
| Pristine Composite (E-Glass Fabric) | 212.5 | 0.023 | 9.94 |
| Acid Treated-NanoComposite (0.06% SWCNTs) | 324 (53%) | 0.029 (26%) | 13.27 (33.5%) |

Table 13 compares pristine composite with nanocomposite manufactured using unidirectional carbon fibers and same acid treated SWCNTs nanoresin as previous case (i.e., 0.06% by weight SWCNTs). Once again, results demonstrated that ultimate tensile strength enhanced by about 69%, strain-to-failure improved by about 3%, and elastic modulus increased by about 64%.

TABLE 13

Carbon fiber/acid treated nanoresin composite comparison for ultimate tensile strength, strain-to-failure, and modulus.

| Name | Ultimate Strength (MPa) | Strain-to-Failure (mm/mm) | Elastic Modulus (GPa) |
|---|---|---|---|
| Pristine Composite (UD Carbon Fiber) | 883.274 | 0.0164 | 54.65 |
| Acid Treated-NanoComposite (0.06% SWCNTs) | 1490.336 (69%) | 0.0169 (3%) | 89.47 (64%) |

Flexural Testing in Longitudinal Direction (4-Point Bend), ASTM D 6272-02

Figure 30:
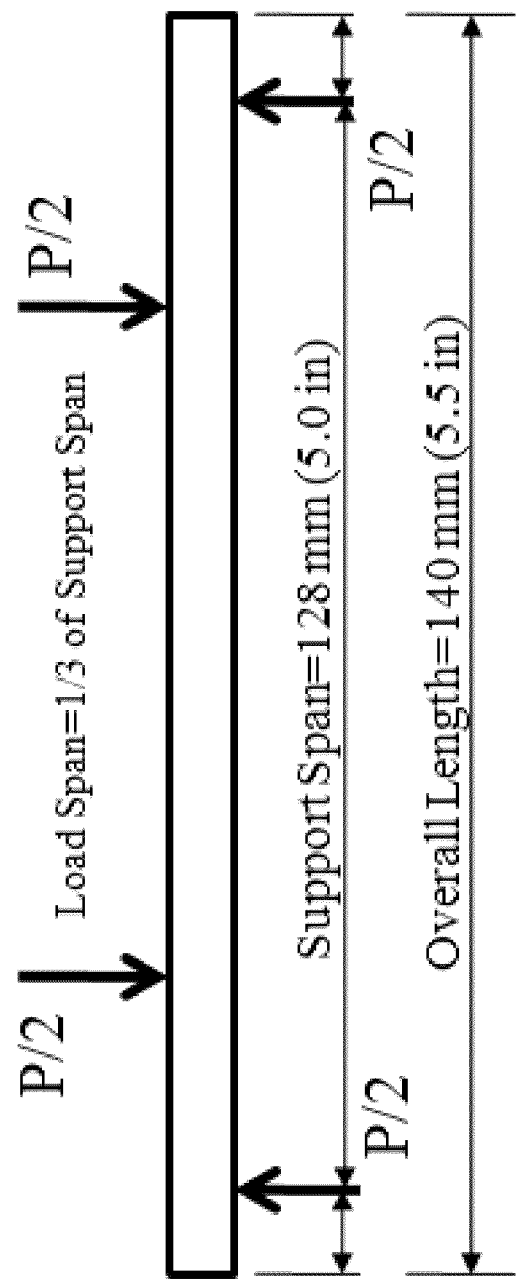
FIG. 30 illustrates four-point bending loading diagram (thickness 3.2 mm=⅛ in, width=12.7 mm=½ in)

Table 14 compares a pristine composite with nanocomposite manufactured using unidirectional carbon fibers and same acid treated SWCNTs nanoresin as previous case (i.e., 0.06% by weight SWCNTs) as well as the Toughest Nanoresin (i.e., DMAC 10% Nanoresin) for flexural test with a loading rate of 1.5 mm/min (see FIG. 30). The percentage of the improvements are given in the table. The Toughest Nanoresin improved the Flexural Strength and Modulus much more than the Stronger & Tough Nanoresin.

TABLE 14

Carbon fiber/Stronger & Tough as well as Toughest nanoresin composite comparison for flexural properties.

| Material | Flexural Strength, MPa (Enhancement %) | Flexural Modulus, GPa (Enhancement %) |
|---|---|---|
| PRISTINE Composite (UD Carbon Fiber) | 732.304 | 55 |
| Based on Stronger & Tough Acid Treated SWCNT Resin Nanocomposite | 828 (13%) | 63.74 (16%) |
| Based on Toughest DMAC 10% Nanoresin Nanocomposite | 1023.4 (40%) | 113.63 (107%) |

Mode I Opening Fracture Toughness DCB Test, ASTM D 5528-01

Figure 31:
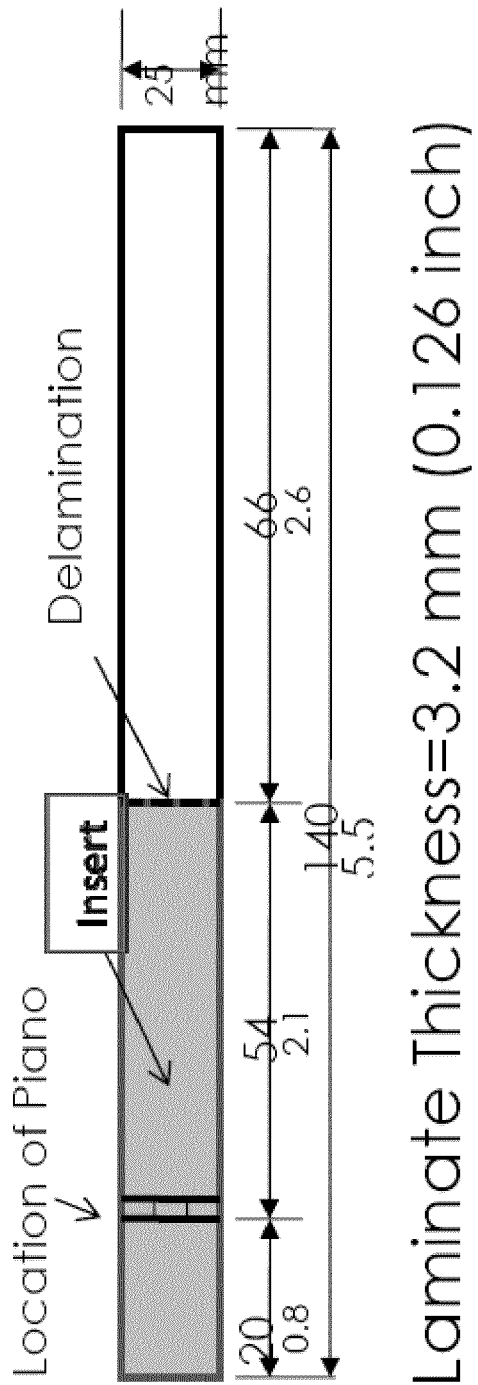
FIG. 31 illustrates DCB composite specimen geometry for Mode I fracture toughness testing.
Figure 32:
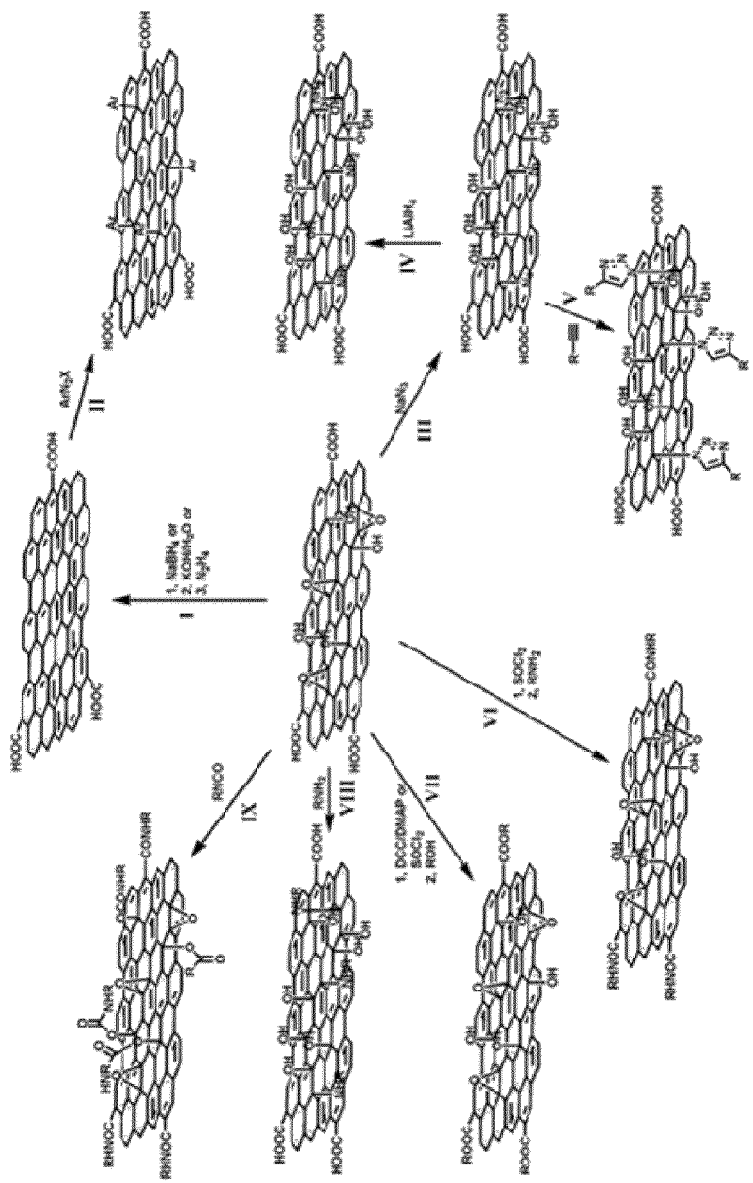
FIG. 32 illustrates a schematic showing various covalent functionalization chemistry of graphene or GO (from existing publication)

Table 15 has the comparison between the pristine composite with nanocomposite manufactured using unidirectional carbon fibers and the Toughest Nanoresin (i.e., DMAC 10% Nanoresin) for DCB test (see FIG. 31 for the specimen geometry details) with a loading rate of 2 mm/min. The percentage of the improvements are given in the table.

TABLE 15

Carbon fiber/Toughest nanoresin composite comparison for fracture toughness properties.

| Material | Loading Rate (mm/Min) | Ave Max of GIC (J/M^2) |
|---|---|---|
| PRISTINE Composite (UD Carbon Fiber) | 2.0 | 420 |
| Based on Toughest DMAC 10% Nanoresin | 2.0 | 1500 |
| Enhancement % | — | 257% |

Illustrative Embodiments

Graphene

The following are exemplary embodiments that include graphene as a reinforcement material.

Graphene oxide useful in the disclosed materials and methods can be produced by the controlled oxidation of graphite by different methods. Several approaches that have been adopted for the development of graphene include techniques such as micro mechanical cleavage, epitaxial growth and chemical processing which includes graphite oxidation, exfoliation and reduction. However, the chemical approach is widely adapted for the relatively large quantity of graphene production. Additional techniques such as solvothermal synthesis combined with pyrolysis and liquid phase exfoliation of graphite has been reported. Some researchers have reported a large scale production of efficient graphene nanosheets by electrolytic exfoliation from graphite.

Functionalized Graphene Manufacturing Technologies

Figure 33:
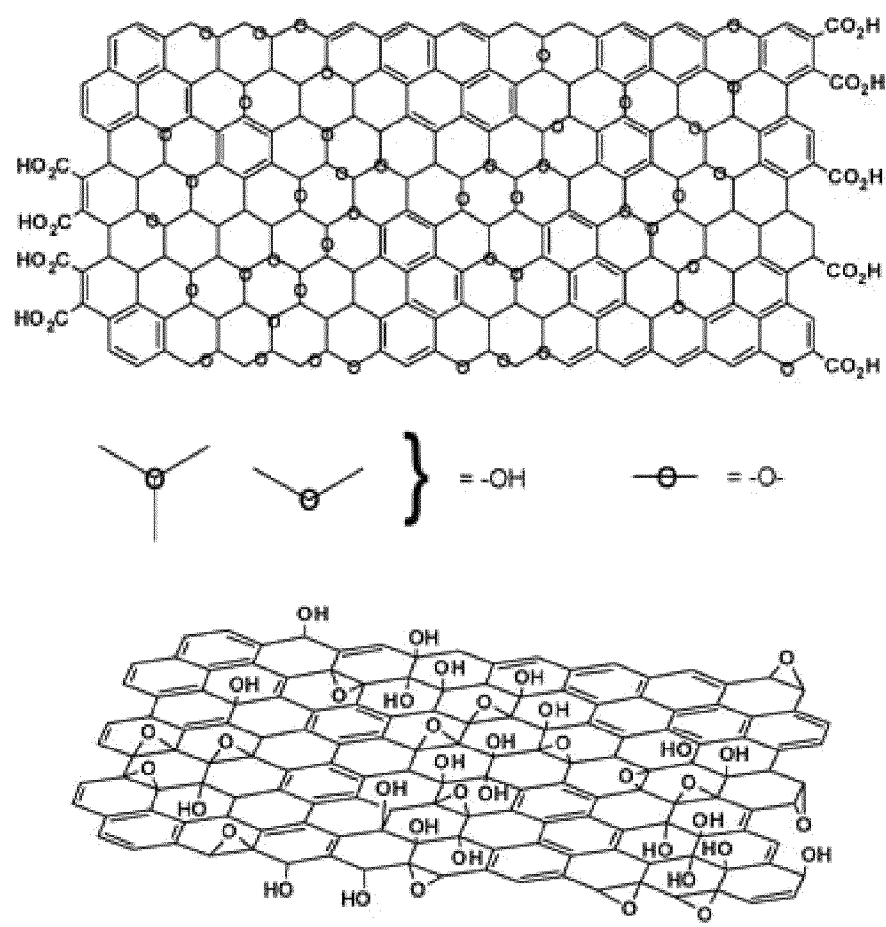
FIG. 33 illustrates a schematic structure of graphene oxide. Presence or absence of carboxylic acids on the periphery of the basal plane of the GO platelets (figure is from existing publication)

Functionalized graphene (see FIG. 33) can be effectively produced by following the chemical synthesis procedure described in the literature. Graphite powder is oxidized using strong chemical oxidizers followed by the removal of acid and other ions. Oxidized oxidized graphene is suitably exfoliated by thermal shocking at elevated temperature. Several different chemical synthesis procedures are described in the literatures but none of them describe the procedure in detail. The temperature needed for thermal shocking suitably varies from 250° C. to 1100° C.

Reduced Graphene Manufacturing Technologies

In some embodiments, functionalized graphene is treated with one or more reducing agents that eliminate the functional groups generated as a result of chemical oxidation. The reduced material so obtained can be thermally exfoliated to produce single layer graphene.

While the graphene materials used in the exemplary embodiments herein were made according to the particular illustrative protocols. The present disclosure, however, should not be understood as being limited to these particular variants of graphene. Graphene is generally known as an allotrope of carbon, having structure that is one-atom-thick planar sheets of carbon atoms (in an $sp^2$ bonding scheme) that are present in a honeycomb-like lattice. Graphene may be wrapped into fullerenes, rolled into nanotubes, or even stacked into 3D graphite structures.

Graphene may be purchased commercially. Sources of graphene materials include Graphene Industries (www.grapheneindustries.com), Graphos (www.graphos.it), Graphene Supermarket (www.graphene-supermarket.com), and other suppliers. Graphene synthesis methods will be known to those of ordinary skill in the art; exemplary synthesis methods include the Hummers method, and the methods described in U.S. Pat. No. 7,824,651, U.S. Pat. No. 7,071,258, incorporated herein by reference. Graphene may be formed via epitaxial growth on silicon carbide (e.g., Sutter, *Nature Materials*, 2009), epitaxial growth on metal substrates, graphite oxide reduction, via growth from metal-carbon melts (Amini, *J. of Appl. Phys.*, 2010), from cutting open nanotubes, and by other methods.

The following protocols were used to make the graphene used in the illustrative embodiments disclosed herein. These protocols are illustrative only and should not be understood as limiting the present disclosure to graphene of any specific configuration or graphene made in any particular way.

RNGS-I:

Graphite oxide was prepared by adopting a modified Hummers method, known in the art. Sulfuric acid (46 ml) was pre-cooled to about 0° C. in an ice bath followed by the addition of 2 g of graphite powder. The mixture was stirred with a magnetic stirrer for 30 min, followed by gradual addition of 6 g $KMnO_4$. The temperature of the reaction mixture suitably remained below about 20° C.; the temperature is suitably controlled using an ice bath. The temperature of the reaction bath was increased to 35° C. (by increasing the temperature of the liquid) and the reaction mixture was stirred for 2 hours until a gray-colored semi-solid paste was obtained.

Ultrapure water (92 ml) was added slowly to the above-described paste, and the result was stirred slowly on the magnetic stirrer. The viscous liquid was then added to 280 ml of pure water followed by vigorous stirring (using a magnetic stirrer) for about 1 h. Hydrogen peroxide was added to this solution; the color of the solution turned from grey to yellow. The functionalized graphite solution was filtered through a sintered/fritted glass funnel and was washed several times with a 10% dilute HCl solution.

The resultant composition was isolated using a high speed centrifuge. The semi-solid content was dried at 50° C. for 96 h in a constant temperature incubator and the residue was sonicated in ethanol (having twice the volume of the residue) for 48 h.

RNGS-II:

Semi-solid content obtained after centrifugation was taken in a quartz round bottom flask and left at 50° C. for 72 h in a constant temperature incubator. Argon gas was passed into the flask for 30 min and the content was thermally shocked for about 15-30 seconds at approximately 1000° C. temperature in a horizontal preheated furnace. A dry solid black powder was obtained.

NGS-III:

Two grams of graphite flakes (Asbury Carbons, 1721) of pH 4.93 were taken in a fritted funnel and added to 250 ml of distilled water. The mixture was sonicated for 2 h and filtered under vacuum using a Teflon™ coated filter paper (50 micron mesh); a high speed centrifuge is suitable for separating the solid when filtering was not feasible. The semi-solid material was dried at 50° C. for 14 days in a constant temperature incubator. Dried material was transferred to a quartz glass round bottom flask and purged with argon gas for 30 min. The content of the flask was thermally shocked for 30 sec at approximately 1000° C. (as explained above).

Materials Used

Graphite

Two different forms of graphite were provided by Asbury Carbon, USA. The product data sheet obtained from Asbury Carbon mentioned that graphite flakes (1721) were acid treated while graphite powder (3775) was manufactured adopting a proprietary technique.

Polymer

Figure 34:
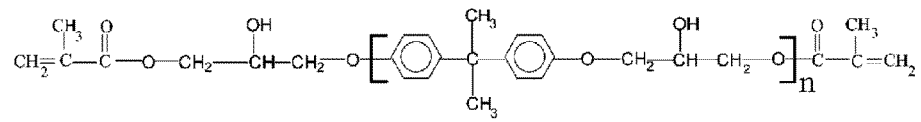
FIG. 34 illustrates the chemical structure of a vinyl ester resin.

For some non-limiting embodiments, a vinyl ester resin (FIG. 34) in styrene was purchased from Fiber Glass Hawaii LLC, Honolulu. The resin was formulated by Reichhold Inc., under the trade name HYDREX 100.

Other Chemicals

Concentrated sulfuric acid, potassium permanganate, hydrogen peroxide and hydrogen chloride were purchased from Sigma-Aldrich. These chemicals were of analytical grades and were used without further purification. Water used during the synthesis process was ultrapure with about 18μ resistivity.

Characterization Methods

This section describes the different analytical techniques used to characterize the materials.

FTIR Spectroscopic Investigations

FTIR analysis was conducted on Thermo Nicolet FT-IR spectrometer using Omnic software. The solid powder, liquid suspension of reactive nano graphene sheets or polymer were taken on a KBr pellet and analyzed directly under the spectroscope. A minimum of 60 scans were acquired at a resolution of 4 cm$^{-1}$. A background spectrum was collected prior to collecting a spectrum of the sample. The baselines of the spectrums were corrected using Omnic or Origin software.

Raman Spectroscopic Investigations

The disclosed Raman spectra were excited by an Invictus 785 nm NIR laser and measured with a fiber-coupled micro-Raman RXN system (Kaiser Optical Systems, Inc., Ann Arbor, Mich.) using a 50 μm slit. The cosmic rays were removed by the software provided by the Kaiser optical system, which measures the spectra twice and deletes random peaks due to cosmic rays. All spectra were measured under identical conditions.

All spectra shown here were smoothened and corrected for their baseline. The spectra are vertically shifted for clarity of presentation. Commercially available polished aluminum sheets with a thickness of 0.5 mm were purchased from Anomet, Inc., Ontario, Canada, and cleaned with methanol and used as substrates. A background spectrum was collected before collecting a spectrum of the sample. The baselines of the spectrums were corrected using the Origin software.

X-Ray Photoelectron Spectroscopic Investigations

The XPS analysis was performed on Kratos Axis Ultra equipment with system pressure of $10^{-8}$ torr during the analysis. The X-ray source was monochromatic Al Kα (1486.6 eV) and X-ray power was 280 watts (14 keV, 20 mA). The takeoff angle was 90° with respect to sample plane. All the peaks were referenced to C1s=285 eV peak.

Wide Angle X-Ray Diffraction Studies

The interlayer spacing in graphite and graphene samples were recorded using D8 XRD from Bruker instrument using Cu-Kα source. The adopted X-ray scanning rate was 0.1 degrees per second.

Microscopic Investigations

The FESEM analysis was performed on Hitachi S4800 and TEM analysis was performed on LEO912 Energy-Filtering Transmission Electron Microscope. The samples were thin coated with gold-palladium to prevent the charging during FESEM analyses. The AFM image was acquired on Veeco Innova equipment operating in tapping mode.

Thermogravimetric Analysis

The thermogravimetric analysis (TGA) was performed on SDT2960 equipment from TA instruments. Weights of the semi-solid samples were stabilized on the equipment's pan until constant weight was achieved. Variable heating rates were adopted for the solid samples.

Dynamic Mechanical Thermal Analysis

The samples were tested with a Perkin Elmer DMA8000 dynamic mechanical thermal analyzer. Specimens were placed in the DMTA instrument and oscillated at three different frequencies (0.01 Hz, 1.0 Hz, and 10.0 Hz) in a dual cantilever bending mode. The specimens were heated from −150° C. to 200° C. at a rate of 5° C./min. The strain amplitude was maintained at 0.01%. The rectangular sample geometry was chosen for this study.

Mechanical Performance Evaluation

Figure 35:
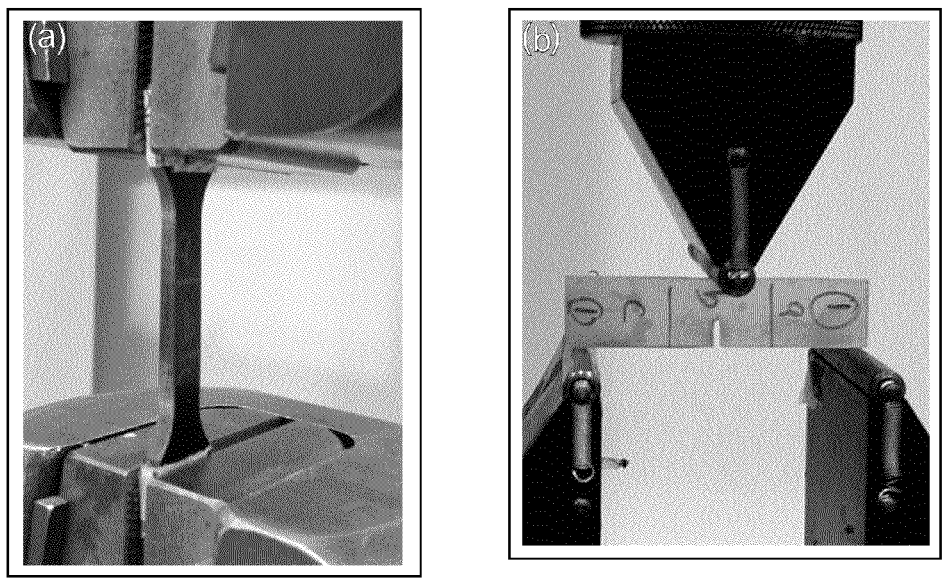
FIG. 35 illustrates mechanical testing of nanocomposites. (a) Tensile testing fixture; (b) SENB testing fixture.

The mechanical properties of the nanocomposites were determined using Instron® universal testing machine (FIG. 35). For tensile testing, the samples were cut in dog bone shape and tested according to ASTM D638. A span length of 50 mm was employed with a crosshead speed of 1 mm/min. For plane strain fracture toughness and strain energy release rate, the samples were cut in rectangular shape and tested in single edge notch bending SENB mode as per ASTM 5045.

Development and Characterization of Graphene

Functionalized Reactive Graphene Manufacturing Technique

Graphite oxide was prepared by adopting the modified Hummers method. ACS grade sulfuric acid (46 ml) was precooled to 0° C. in ice bath for 30 min followed by addition of 2 g graphite powder. The mixture was stirred for 30 min followed by gradual addition of 6 g $KMnO_4$. The temperature of the reaction mixture remained below 20° C. for 30 min. The temperature of the reaction bath was increased to 35° C. (kept constant) and reaction mixture was stirred for 2 h until grey colored semi-solid paste was obtained. The reaction mixture was brought to room temperature and left undisturbed for 48 h. Water (92 ml) was then added slowly to the above paste and the content was stirred slowly for 30 min. Viscous liquid was then added to 280 ml of pure waster followed by vigorous stirring for 1 h. The 10 ml 30% hydrogen peroxide was added to this solution that immediately turned the color of the solution from grey to yellow. Functionalized graphite solution was then filtered through a sintered/fritted glass funnel and washed three times with 10% dilute HCl (total 30 ml, ACS grade) solution.

Finally, the content was isolated using high speed centrifuge. The semi-solid content was dried at 50° C. for 72 h and sonicated in ACS grade absolute ethanol for 48 h.

Exfoliated Reactive Graphene Manufacturing Technique

The solid content obtained after centrifugation was taken in a quartz round bottom flask. Argon gas was passed in the flask for 15 min, and the content was thermally shocked for 15-30 sec at 1100° C. temperature. A dry solid black powder was obtained that can be used as nanofiller.

Functionalized Graphene Manufacturing Technique

In another experiment, two grams graphite flakes (Asbury Carbons-1721) of pH 4.93 were taken in a fritted funnel and added with 250 ml of distilled water. The mixture was sonicated for 2 h and filtered under vacuum. A high speed centrifuge was used to separate the solid during the instances when it was not feasible to filter the content. The semi-solid material was dried at 50° C. for 14 days. Dried material was transferred to a quartz glass round bottom flask and purged with argon gas for 30 min. The contents of the flask were thermally shocked for 30 sec at 1100° C.

Characterization of Graphene Using FTIR Spectroscopy

The Fourier Transformation Infra-red spectroscopy technique works on the principle that bonds and groups of bonds in a material vibrate at particular frequencies. When a molecule is exposed to infrared (IR) radiation, it absorbs the energy at frequencies that are characteristic to the molecule. The transmittance and reflectance of the IR energy is then converted into an absorption/transmittance plot as a function of frequencies. The FTIR spectrum so obtained is then analyzed and compared with the signatures of known materials from the library.

Figure 36:
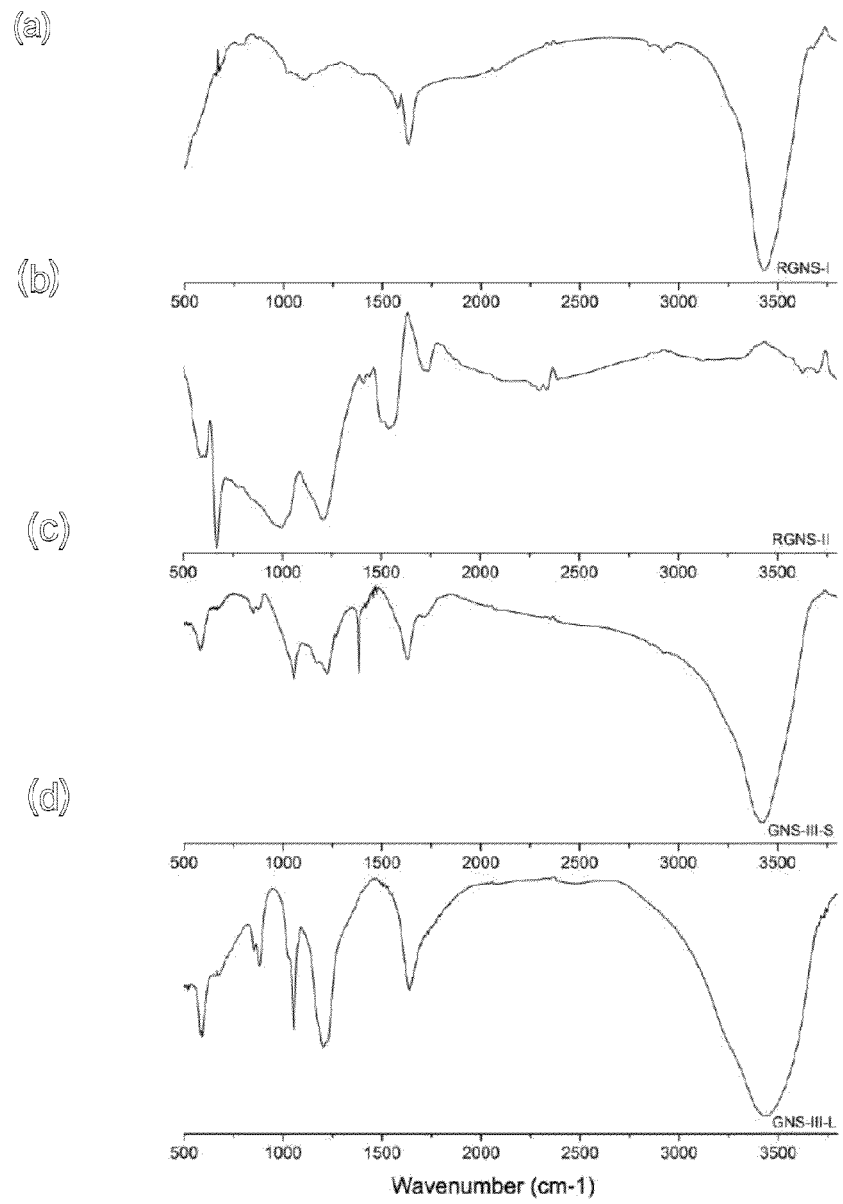
FIG. 36 illustrates a FTIR spectral analysis of RGNS-I, RGNS-II and GNS-III as solid and GNS-III sonicated in water.

FIG. 36(a-d) shows FTIR spectra acquired on RGNS-I, thermally shocked RGNS-II and thermally exfoliated GNS-IIIS (solid and dry crushed with KBr to form the pellet) & GNS-IIIL (sonicated in solvent followed by taking the material on the KBr pellet and evaporating the solvent). The acid (—COOH) functionality can be seen at 1714 $cm^{-1}$ while C=C aromatic stretching can be seen at 1515 $cm^{-1}$ and 1538 $cm^{-1}$. C—OH stretching at 1224 $cm^{-1}$ and C—O stretching at 1056 $cm^{-1}$. Vibration at 1628 $cm^{-1}$ may be due to unoxidized graphite domains.

Characterization of Graphene Using Raman Spectroscopy

Raman spectroscopy is used to study the vibrational or rotational modes in the molecule as it interacts with the monochromatic light. The light in visible, infrared, or near ultraviolet range is used in this technique where it interacts with the bonds and electron clouds of the molecule. The photons from the monochromatic light impart energy to the molecule resulting in a jump from ground state to the new temporary energy state. When the molecule relaxes, it emits the photon and returns to new energy states with a different rotational or vibrational mode. However, due to the changed energy state of the molecule the emitted photon has a different frequency that leads to a shift in the frequency of the emitted photon away from the excitation wavelength. This difference in frequency is specific for a particular vibrational or rotational state of a molecule. In Raman analysis the material is exposed to wide range of frequencies and specific Raman intensities are plotted as a function of frequency.

Figure 37:
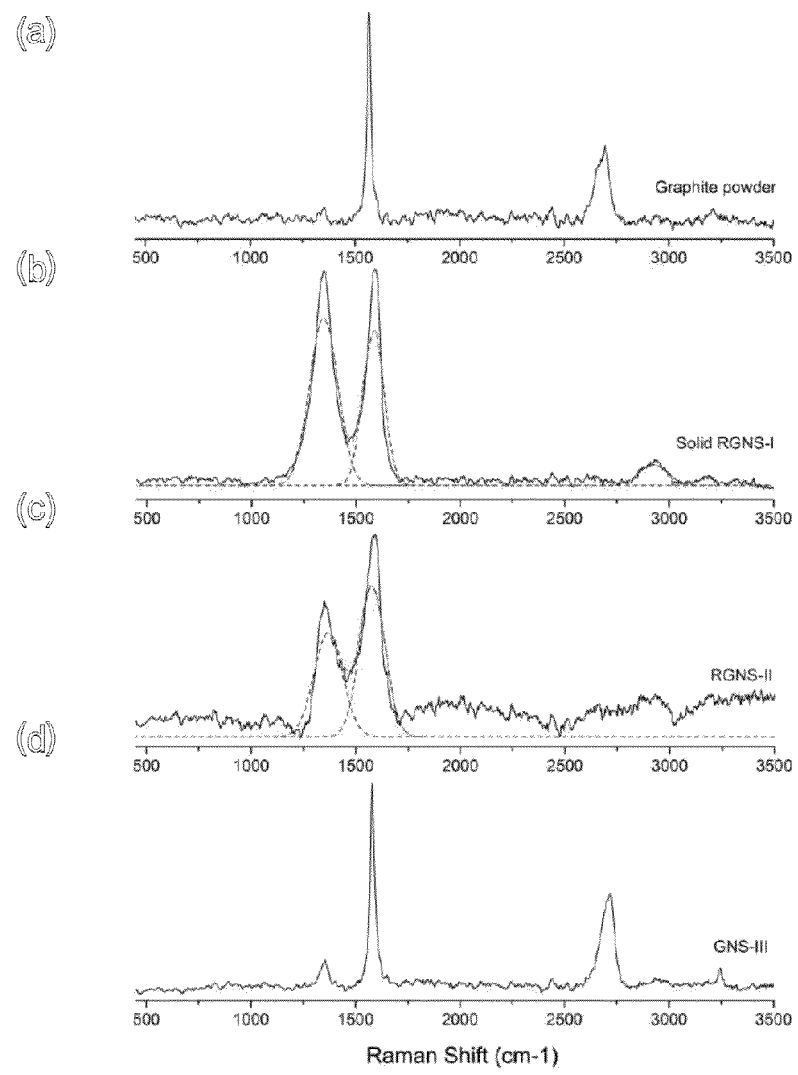
FIG. 37 illustrates a Raman spectral analysis of solid graphite powder, RGNS-I, RGNS-II and GNS-III.

FIG. 37 shows Raman analysis of solid dried RGNS-I, II & III film. The ordered graphite shows two main bands at 1575 $cm^{-1}$ corresponding to G-band from graphite lattice and a peak at 1355 $cm^{-1}$ representing D-band from the graphite edges. The Raman spectrum shown in FIG. 2a from RGNS-I shows shift in G-band to 1602 $cm^{-1}$ and D-band to 1328 $cm^{-1}$ suggesting a substitution on the surface of the material.

In the case of RGNS-II (FIG. 37b), G-band was found at 1601 $cm^{-1}$ while D-band sifted to 1336 $cm^{-1}$ indicating that substituted sheets are exfoliated that show Raman signal at higher wavelength compared to RGNS-I.

The two Raman signals obtained in GNS-III (FIG. 37c), were found at 1584 $cm^{-1}$ (G-band), a frequency closer to the graphite absorption and approximately at 1326 $cm^{-1}$, a frequency similar to graphene absorption.

Characterization of Graphene Using XPS Spectroscopy

The X-ray photoelectron spectroscopy (XPS) is a quantitative technique that measures the chemical state, empirical formula, elemental composition, and electronic state of the elements in a material. The XPS spectrum is obtained by exposing the material in vacuum with a beam of X-rays while simultaneously recording the kinetic energy and number of electrons escaping from surface of the material being analyzed. The binding energy of the element is then calculated using the Rutherford's equation. A exemplary XPS spectrum is constructed by plotting the binding energies of electrons from different elements present in the material as a function of number of electrons.

Figure 38:
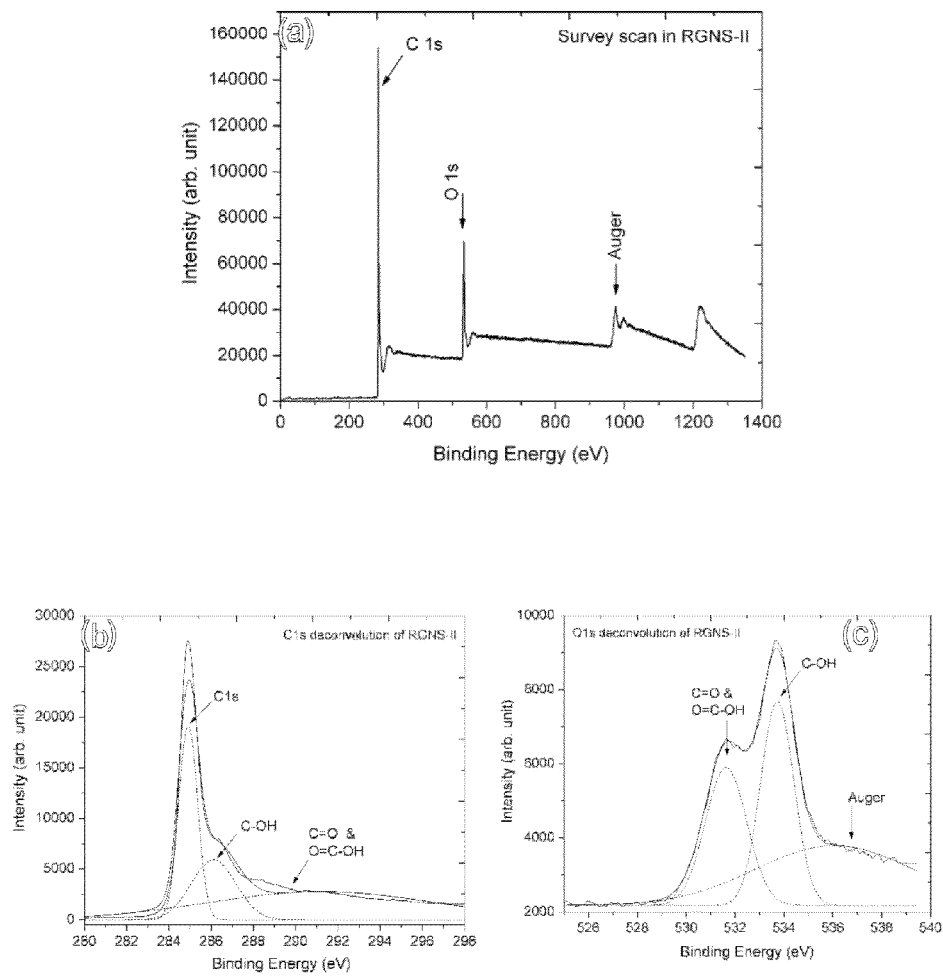
FIG. 38 illustrates a XPS analysis of RGNS-II powder.

The surface survey scan of RGNS-II shown in FIG. 38a displayed sharp peaks for C1s and O1s indicating the successful oxidation process in the material. The deconvolution of carbon peak (FIG. 38b) displayed two peaks concentrated at 284.5 eV corresponding to aromatic or conjugated carbon, 285.8 eV for C—OH bonds and a hump concentrated at 289 eV representing C=O and O—C=O bonds. The deconvolution of oxygen peak (FIG. 38c) also showed three major peaks. Peaks were found concentrating at 530.6 eV corresponding to C=O & O=C—OH bonding and 533.8 eV corresponding to C—OH bonding. A broad hump around 536 eV represents Auger peaks.

Figure 39:
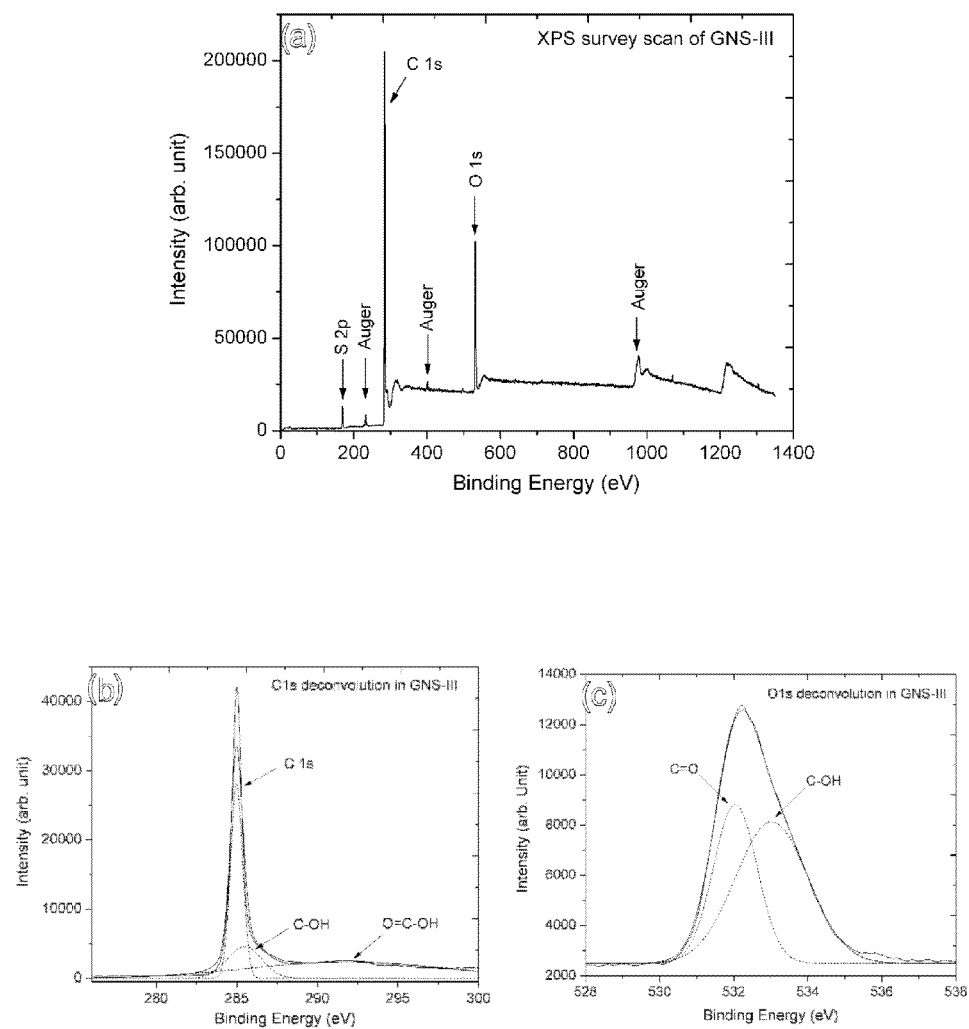
FIG. 39 illustrates a XPS analysis of GNS-III powder.

The FIG. 39a shows surface survey scan on GNS-III. Three distinct peaks from S2p, C1s and O1s can be clearly seen from the spectra. The deconvolution of these peaks suggests the mechanism of reaction occurred over the surface of the carbon. In deconvoluted C1s spectra (FIG. 39b), the peak appeared at 254.8 eV is possibly due to conjugate C=C bond while peak appearing at 286 eV could be a shift of C—OH bond. The broad hump appearing between 289 eV-292 eV is possibly due to O—C=O linking. The deconvoluted O1s spectra (FIG. 39c) displayed two peaks at approximately 532 eV due to shifted C=O and 533.8 eV due to C—OH bonding. The peak position for different elements suggests that sufficient fictionalization has taken place on the graphene surface. However, significant amount of sulfur was found of the surface of GNS-III suggesting that sulfuric acid was still present in the final GNS-III structure.

Characterization of Graphene Using XRD Technique

The X-ray powder diffraction (XRD) is an analytical technique that is used for phase identification of a crystalline material and can provide information from the unit cell. In this technique, the incident ray interacts with the sample and produces a constructive interference along with a diffracted ray on satisfying Bragg's Law ($n\lambda=2d \sin \theta$). These diffracted X-rays are then passed through the detector and counted. The sample is scanned at different angles and intensity is plotted as a function of angles 2 theta. The conversion of the diffraction peaks to d-spacings allows the identification of material as each material consists of a unique d-spacings.

Figure 40:
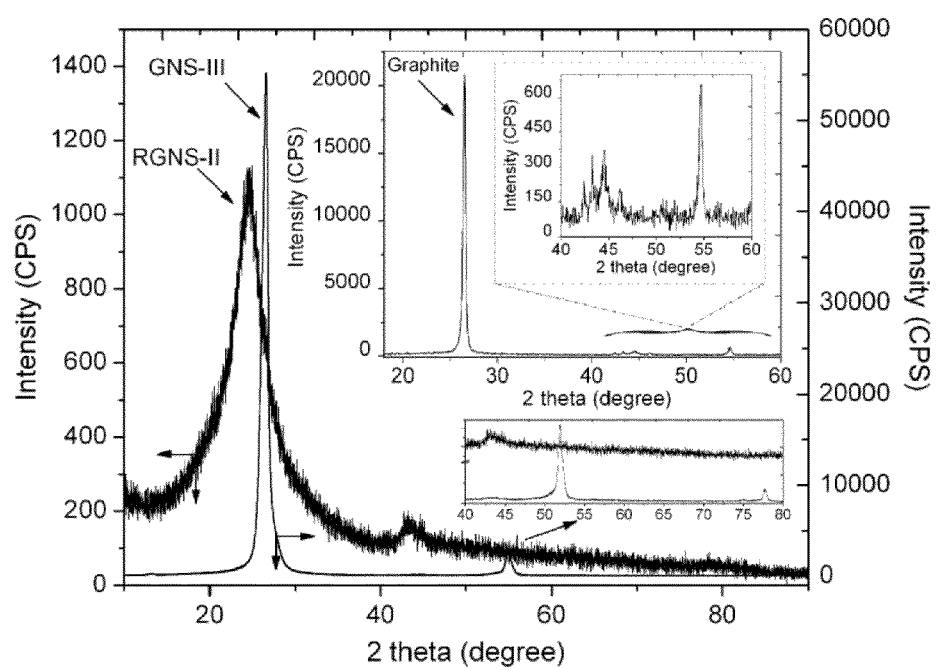
FIG. 40 illustrates XRD analysis in RGNS-II and GNS-III.

The wide angle X-ray diffraction pattern of graphite powder, RGNS-II and GNS-III are shown in FIG. 40. In case of pure graphite powder, peaks appearing at 2θ=26.50 with d-spacing 3.36 Å corresponding to (002) crystal plane while peak appearing at 2θ=42.40 with d-spacing 2.13 Å corresponds to (100) crystal plane. The peak appearing at 2θ=44.5 with d-spacing 2.03 Å appears due to (101) crystal plane and peak at 2θ=54.67 with d-spacing 1.67 Å corresponds to (004) crystal plane.

In case of RGNS-II (FIG. 40), instead of sharp peak at 2θ=26.50, a broad peak appears at 2θ=24.58 with d-spacing of 3.62 Å (002) corresponding to exfoliated graphene sheets or platelets. However, peak at 2θ=43.17 representing (100) plane showed d-spacing of 2.09 Å. A little shift in 2θ values could be due to different thickness of the powder sample under analysis.

The XRD peaks in case of GNS-III (FIG. 40) were similar to that in graphite powder with exactly similar d-spacing suggesting that GNS-III was not fully converted to graphene. The intensity of peak at 2θ=26.66 (002) was however lower compare to graphite powder.

Thermogravimetric Analysis of Graphene

The Thermogravimetric Analysis (TGA) is performed on the materials to understand their degradation/decomposition pattern as a function of time and temperature. In a exemplary thermogravimetric experiment, the material is heated in adiabatic and/or non-isothermal mode in the desired environmental conditions. The heating rate is fixed or varied as per the requirement and a plot of weight loss as a function of time or temperature is recorded. A first derivative of the weight loss curve can be used to understand the degradation phenomenon of the material under study.

Figure 41:
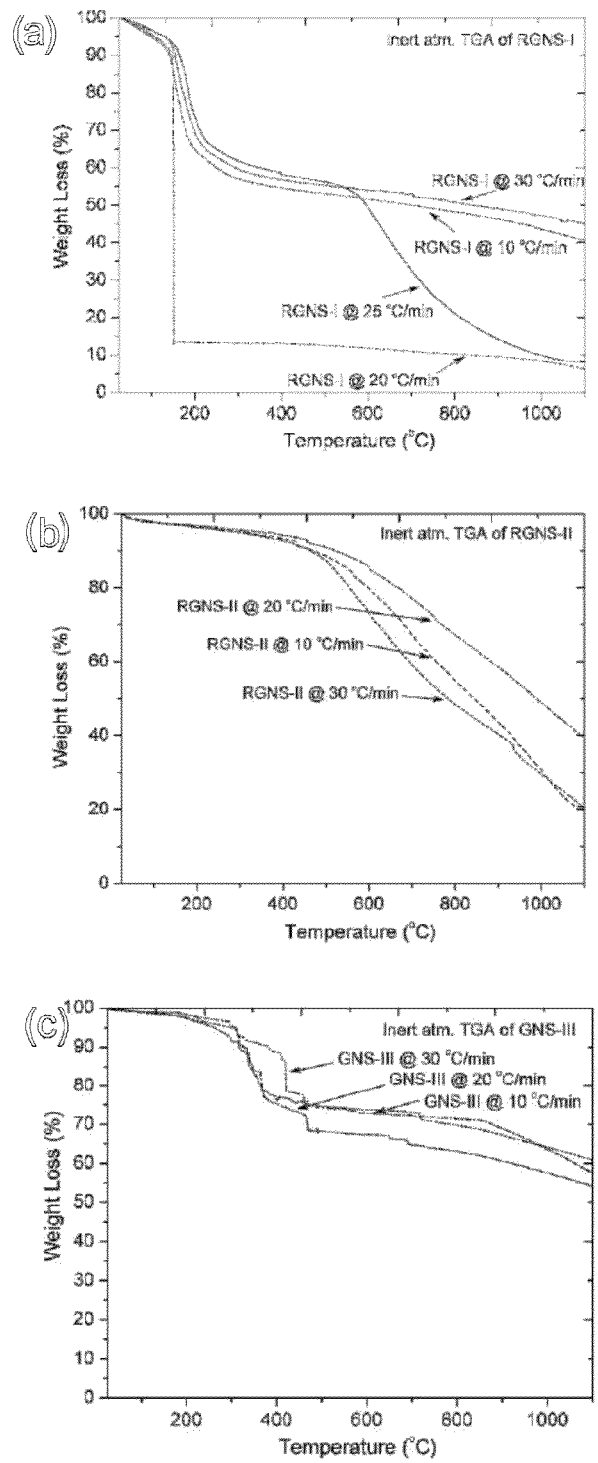
FIG. 41 illustrates results of inert atmosphere thermogravimetric analysis of RGNS-I, RGNS-II and GNS-III at three different heating rates.

The FIG. 41 shows inert atmosphere thermograms for RGNS acquired at three different heating rates. The thermal degradation pattern of RGNS-I shown in FIG. 41a suggests that approximately 10 wt % losses occurred between 144-164° C. This weight loss could be due to the associated volatile components including acids that were utilized during the functionalization. Approximately, 40 wt % of the material was lost until 250° C. temperature possibly due to the decomposition of the smaller components. Residue obtained after the complete decomposition was in the range of 40-50 wt %. The low residue content at heating rate of 25° C. is still not clear at this point and needs further investigations.

The thermal stability of RGNS-II was determined by TGA technique and shown in FIG. 41b. It was found that RGNS-II was thermally stable until 500° C. as onset of decomposition was observed at 525° C. temperature. A single step decomposition pattern was observed in this case indicating the absence of any possible volatile components. The residue obtained after 1000° C. pyrolysis was between 20-40 wt. %.

The degradation of GNS-III was not uniform as in the case of other two materials (FIG. 41c). The weight loss of 10 wt % was observed at approximately 300° C. temperature. The decomposition pattern was random until 460° C. which after stabilization leads to residue between 50-60 wt. %.

Morphological Investigations of Graphene

The modern analytical tools are required to visualize the surface morphology of nanoparticles. The microscopic techniques such as Field Emission Electron Microscopy (FESEM) and Transmission Electron Microscopy (TEM) can provide a valuable insight of the material. These techniques however, have limitation as could not resolve the morphology after certain extent. In case of FESEM technique, the structure of the material is visible up to a certain extent after which the charge starts building up on the surface due to the continuous bombardment of the electron beam. A thin layer of conductive coating is needed to remove such charge but the coating procedure often hides features on the material surface. In case of TEM technique, it is important that material shows a contrast in order to produce an image. A single layer of graphene is therefore difficult to capture on the microscope due the above mentioned problem. The following sections will describe the morphology of the developed graphene as observed under the microscopes.

Morphological Investigation of Graphene Using Electron Microscopic Technique

Figure 42:
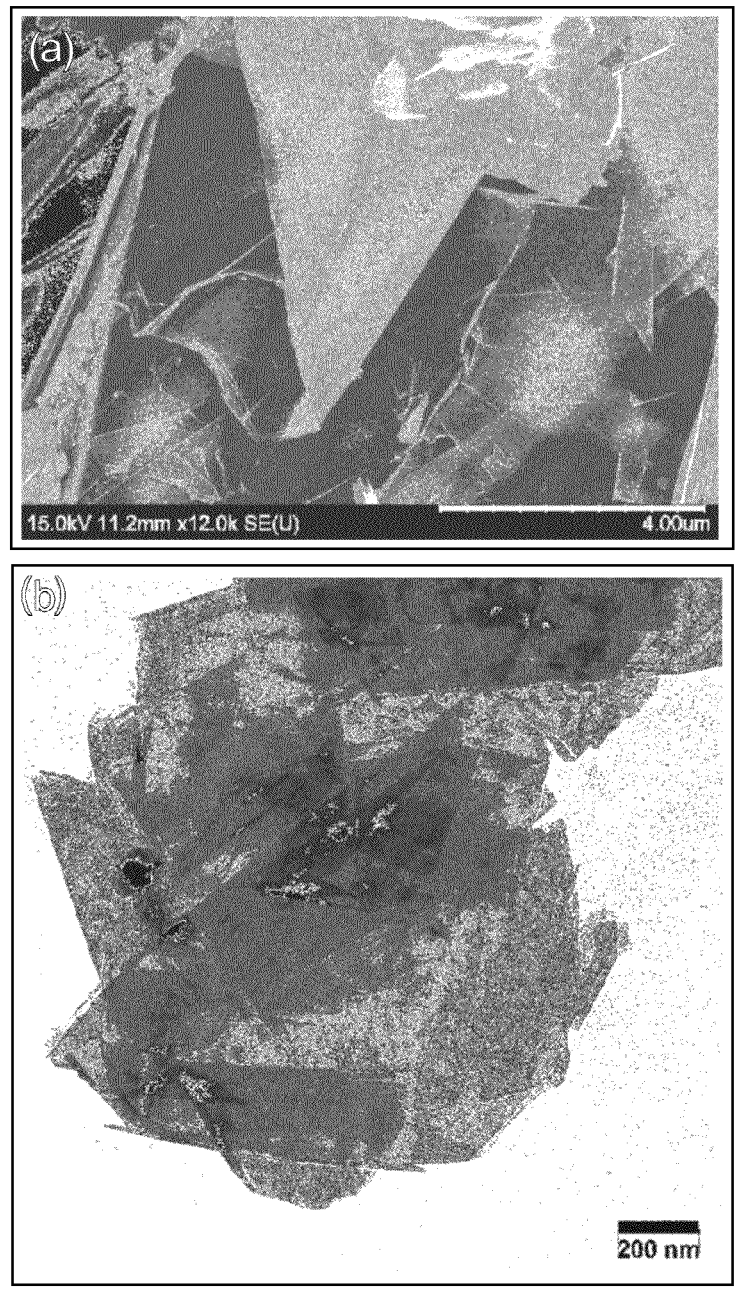
FIG. 42 illustrates morphological investigation on graphene. SEM (a) and TEM (b) image of RGNS-I showing crumbled graphene sheets.

The FIG. 42 display FESEM and TEM images of RGNS-I. It was necessary to observe the surface features of the bulk material before thermal shocking. The FESEM image (FIG. 42a) indicates that graphene platelets were larger than 10 microns. Moreover, the platelets were semi-transparent in appearance. It was hard to measure the thickness of the platelet as they were crumbled like paper. The TEM image (FIG. 42b) shows several layers of graphene platelets with little amount of amorphous carbon. These layers exfoliate during thermal shocking step and material transforms into single layer graphene.

Figure 43:
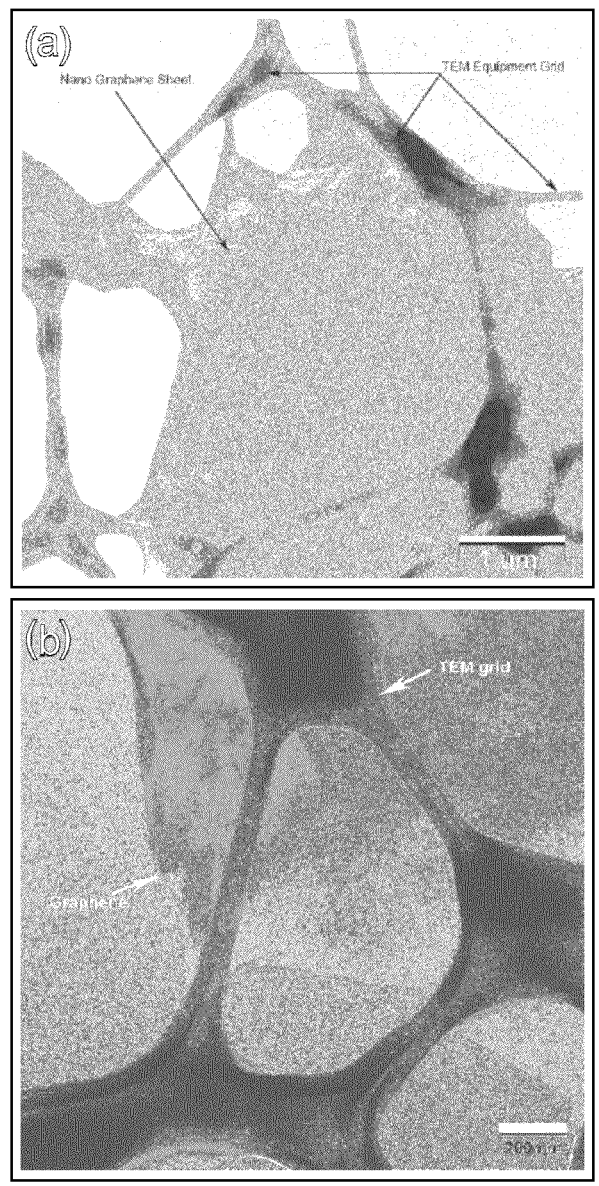
FIG. 43 illustrates morphological investigation on graphene. TEM images of RGNS-II showing single graphene sheet.

The FIG. 43 shows TEM images acquired on the fully exfoliated RGNS-II. Several stages of the graphene exfoliation can be demonstrated from the TEM study. A single sheet of graphene can be seen clearly on the equipment's grid. The estimated thickness of the reactive nano graphene sheet was approximately 4 to 7 nm suggesting that graphene sheets observed under the microscope were actually made of at least 3 to 10 layers.

Figure 44:
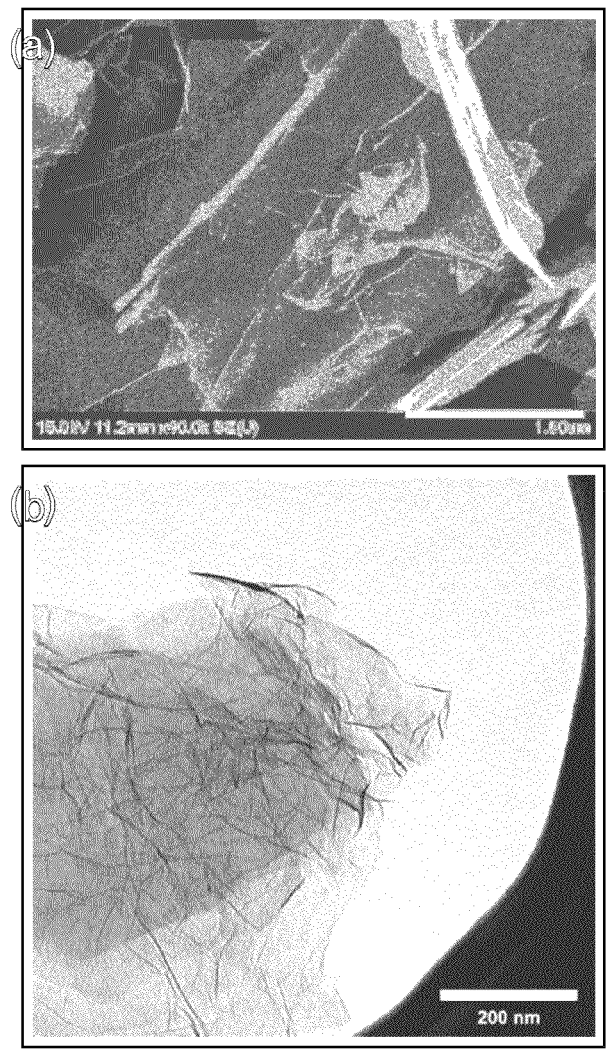
FIG. 44 illustrates morphological investigation on graphene. SEM (a); TEM (b) images of GNS-III showing collection of graphene sheets.

The FIG. 44 shows FESEM and TEM images of GNS-III. The low resolution FESEM image (FIG. 44a) indicated that graphene platelets are arranged in highly ordered stacks. Moreover, the size of the platelets appeared larger then RGNS-II. In higher resolution TEM image (FIG. 44b) these layers appeared as stacked graphite flakes.

Appearance of Graphene through Optical Images

Figure 45:
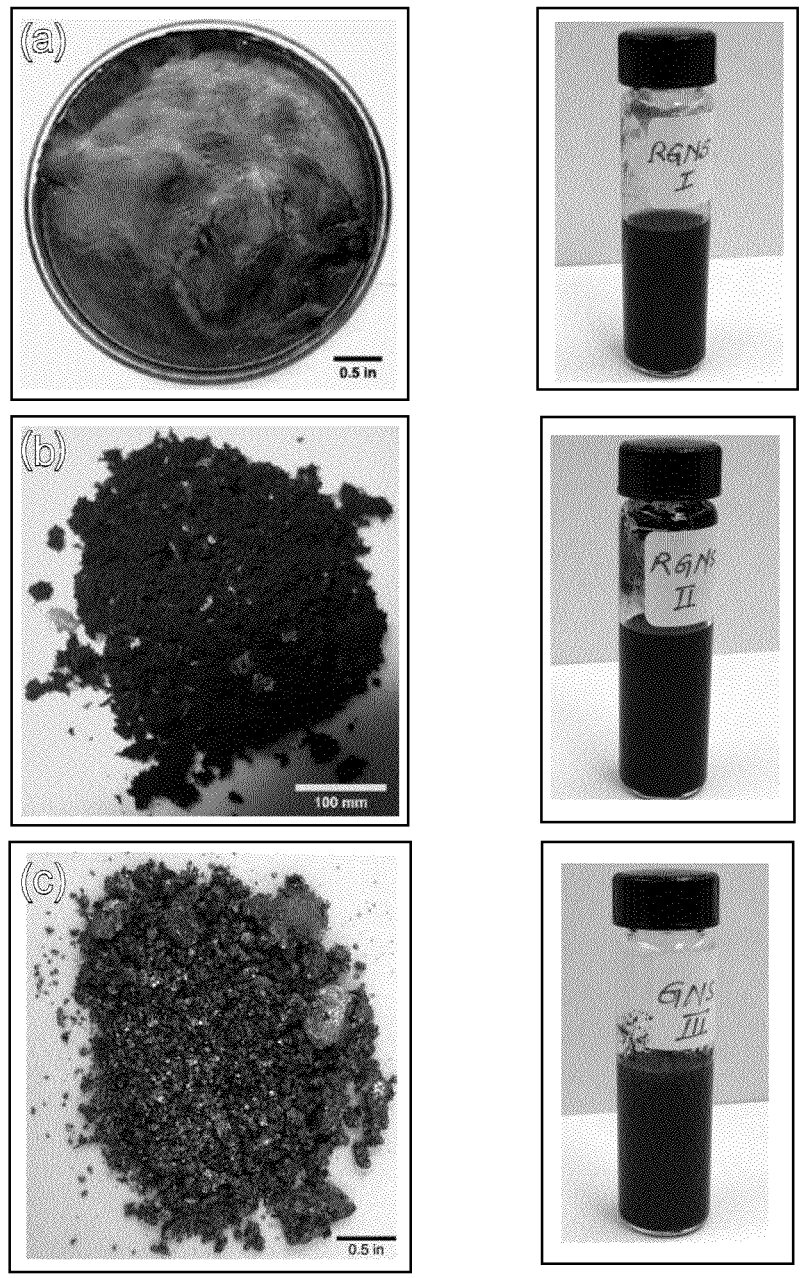
FIG. 45 illustrates synthesized graphenes and graphene suspended in ethanol. (a), Gel stage of RGNS-I (b) solidified RGNS-II after thermal shock and (c) solidified GNS-III after thermal shock.

The FIG. 45 displays photographs of RGNS-I, RGNS-II and GNS-III as appear in optical light. The RGNS-I sample (FIG. 45a) remains in gel stage until dried for long time in ambient conditions or at elevated temperature that evaporates the solvent and entrapped moisture. The RGNS-I can be suspended homogenously in ethanol when sonicated for 24 hr. This sample shows a homogenous suspension for an indefinite time. The RGNS-II sample (FIG. 45b) is obtained after thermal shocking and appear pitch black in color. The sample can be suspended homogenously in ethanol when sonicated for 24 hr. However, the RGNS-II settles at the bottom of the vessel if left undisturbed for another 24 hr. The GNS-III sample (FIG. 45c) has granulated feature with grey color appearance. This sample is hard to suspend in ethanol and shows non uniform distribution in liquid media.

Development of Nanocomposites

Introduction

The nanoparticles have high surface to volume ratio that maximizes the interfacial contact between the nanoparticles and polymer matrix. Due to the increased surface area at the interface, there is a good adhesion between the matrix and the nano-size reinforcements. In such cases, the stress transfers efficiently from the matrix to the reinforcements. Use of nano materials as a reinforcement therefore improves the strength and toughness of the ultimate material by elongating the crack propagation length at the interface.

Nanocomposite Preparation

The nanoparticles (modifiers) were dispersed in the polymeric matrix with the help of solvents that dissolves the polyvinylester. It was necessary to verify the solubility of the VE in the desired solvent as the solvent acts as a vehicular medium for the uniform/homogenous distribution of the nanoparticles. The exfoliated graphene powder was therefore sonicated in 5 ml of either analytical grade (≥99% pure) DMAC or THF solvents for 72 h duration. The colloidal solution so obtained was then added to the polymer. This section details the methods adopted for the preparation for various nanocomposites.

Vinylester and Dimethylacetamide (VEDMAC) Composite

A 5 ml quantity of analytical grade dimethylacetamide is added to 180 gm of vinylester and mixed well with the help of a homogenizer for at least 15 minutes followed by degassing in vacuum for 5 minutes. Finally, 1.5 ml of industrial grade methylethylketone peroxide (MEK) is gently mixed with the above mixture of vinyl ester and dimethylacetamide and poured in the polypropylene molds. The cured plates were taken out of the molds after 24 h and pressed between two aluminum plates for another 48 h.

Vinylester and Dimethylacetamide (VEGRDMAC-Hybridization) Nanocomposites

The graphene was sonicated in 5 ml of analytical grade DMAC for 16 h. The homogeneous solution of graphemene (0.002% to 0.03% by weight of the nanoresin) in DMAC (0.5% to 2.5% by weight of the nanoresin) was then it is added to 180 gm of vinylester followed by a vigorous mixing for 15 minutes with the help of homogenizer. Finally, 1.5 ml of industrial grade MEK is gently mixed with the above mixture and poured in the polypropylene molds. The cured plates were taken out of the molds after 24 h and pressed between two aluminum plates for another 48 h.

Preparation of Vinyester Graphene (VEGRTHF) Nanocomposites

The graphene (0.01% to 0.05% by weight of the nanoresin) was sonicated in 5 ml of tetrahydrofuran, THF, (0.5% to 2.5% by weight of the nanoresin) for 16 hr. The homogeneous solution of graphene in THF was then it is added to 180 gm of vinylester followed by a vigorous mixing for 15 minutes with the help of homogenizer. Finally, 1.5 ml of MEK is gently mixed with the above mixture and poured in the polypropylene molds. The cured plates were taken out of the molds after 24 hr and pressed between two aluminum plates for another 48 hr.

Characterization of Nanocomposites

The hardening process in vinylester resin was monitored using spectroscopic techniques. The composites and nanocomposites were studied using FTIR and Raman spectroscopic techniques. The material was sampled at various stages of the curing process to study the changes occurring in the resin system. The distribution of the graphene in resin was studied using FESEM and TEM techniques.

Characterization of Polymer Nanocomposites Using FTIR Spectroscopy

Figure 46:
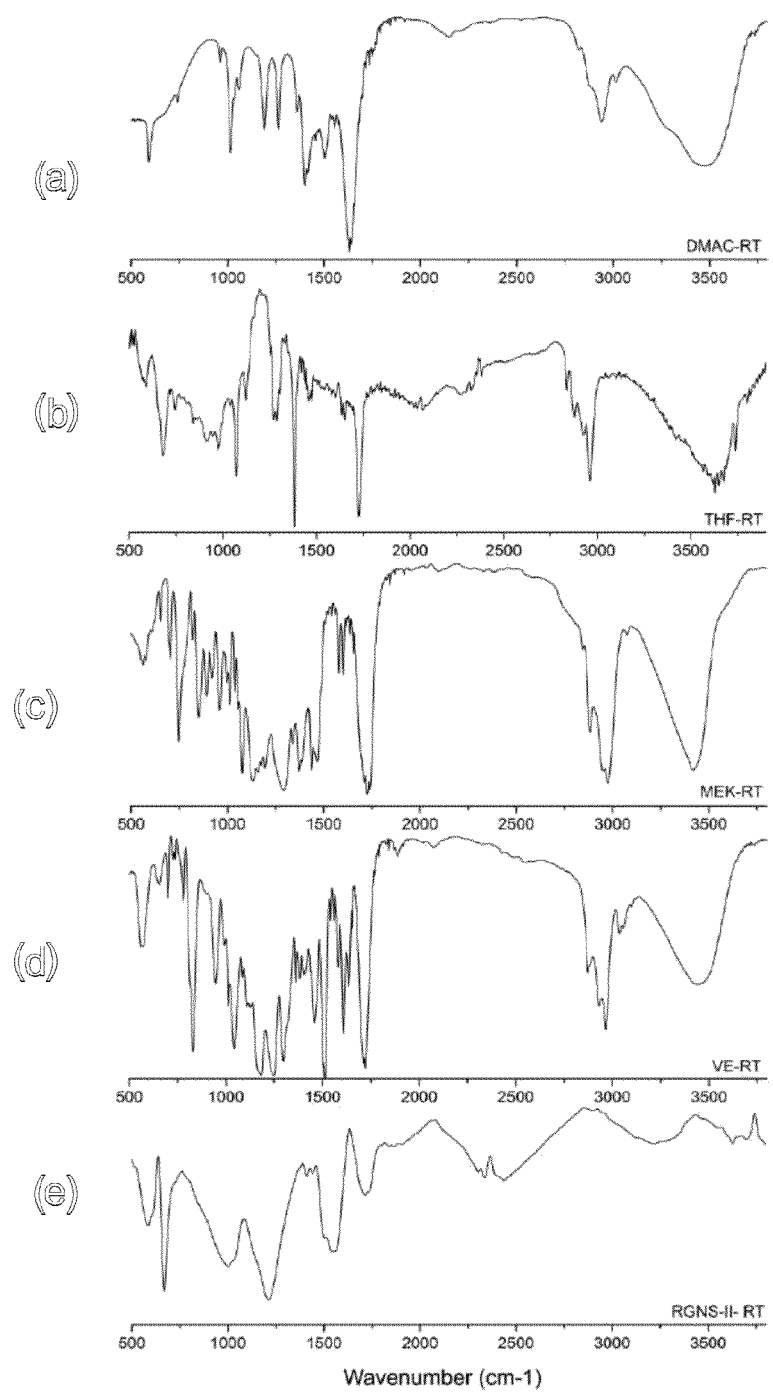
FIG. 46 illustrates transmittance FTIR spectral analysis of basic ingredients used in nanocomposite preparation.

FIG. 46 shows FTIR spectra of various ingredients used in the nanocomposite preparation. However, it was difficult to identify a particular material or group in the final nanocomposite as the spectral band from different components overlapped.

Figure 47:
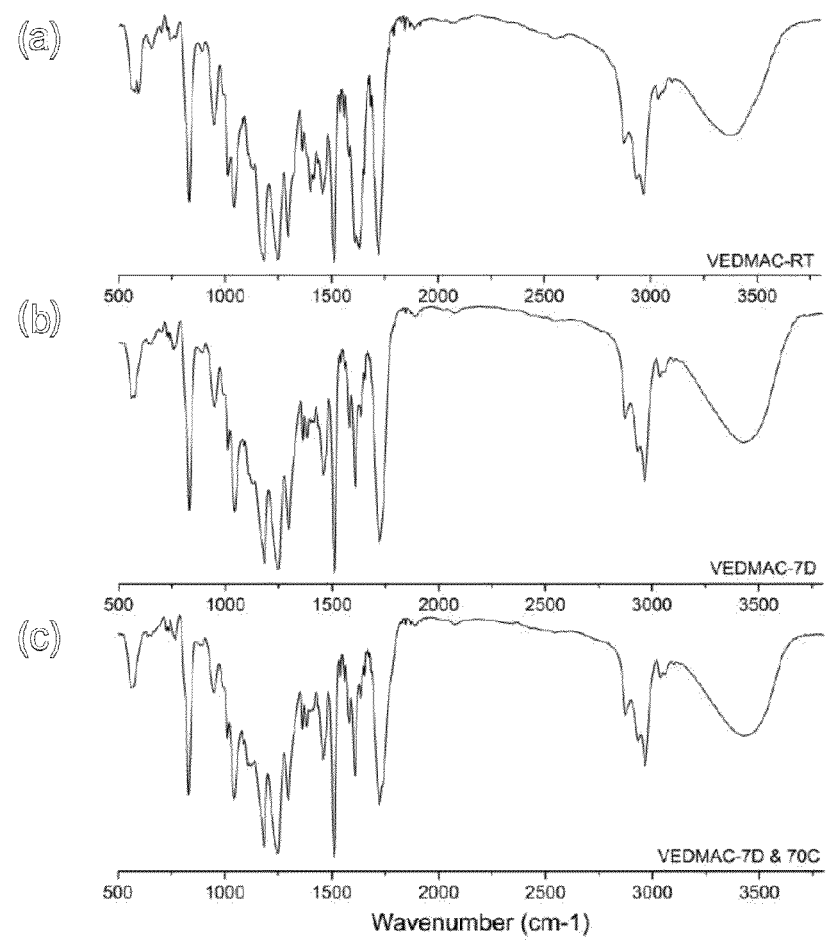
FIG. 47 illustrates transmittance FTIR spectral analysis of pure vinylester resin containing DMAC solvent.
Figure 48:
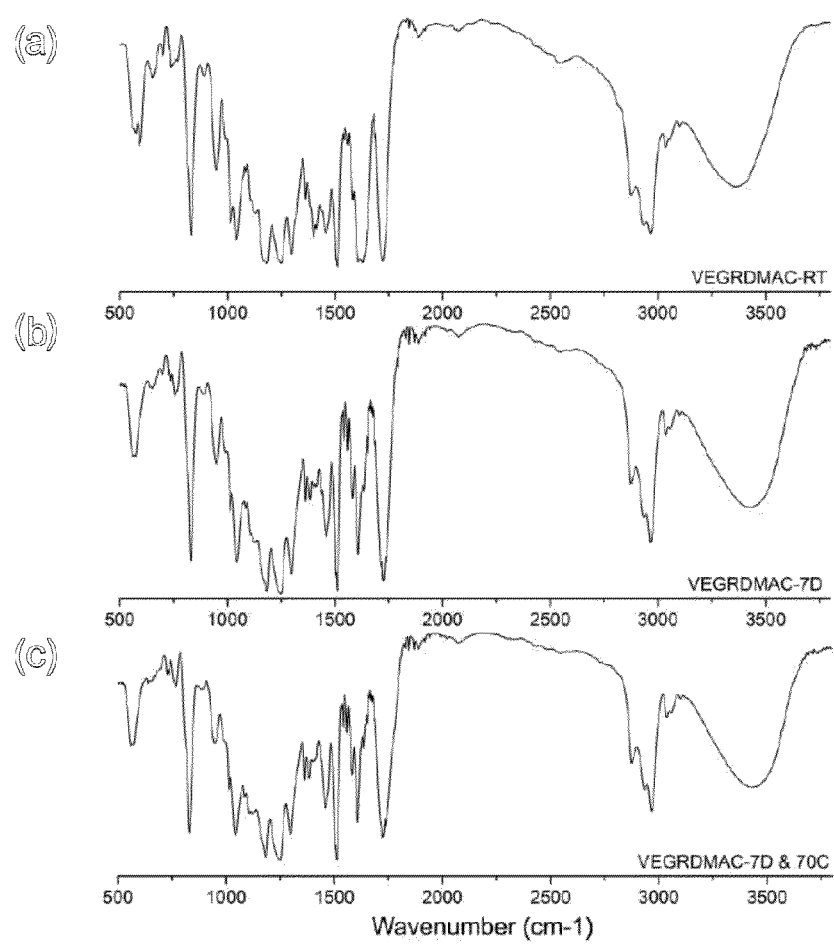
FIG. 48 illustrates transmittance FTIR spectral analysis of vinylester resin containing graphene and DMAC solvent.
Figure 49:
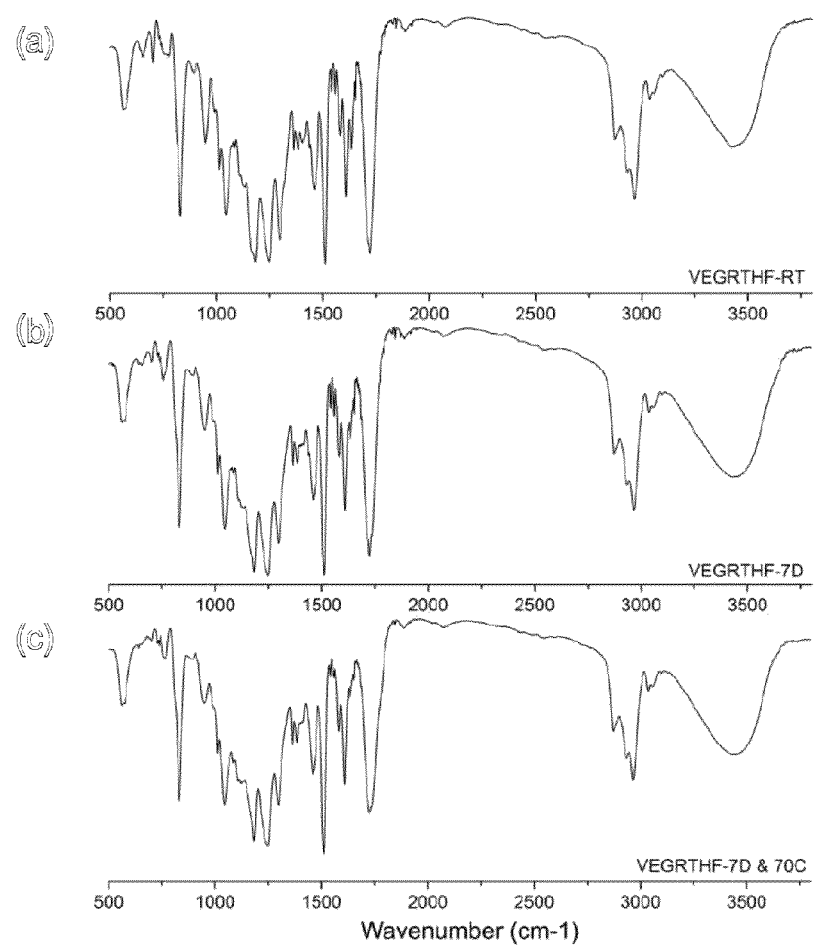
FIG. 49 illustrates transmittance FTIR spectral analysis of vinylester resin containing graphene and THF solvent.

The FTIR spectra from different nanocomposites are shown in FIG. 47-49. In the case of pristine vinyl ester composite and nanocomposites, the peak appearing at 1624 $cm^{-1}$ clearly suggested the presence of styrene double bond. The peaks appearing at 575, 830 and 891 $cm^{-1}$ represents C—H out of plane bending vibrations. The peaks appearing at 1115, 1249 and 1295 $cm^{-1}$ are due to C—O stretching. The peaks appearing at 1401 and 1457 $cm^{-1}$ are due to symmetric and asymmetric bending vibrations of methyl group. The peaks appearing at 1511, 1582 and 1624 $cm^{-1}$ are due to ring stretching vibrations of aromatic nuclei. The peak appearing at 1721 $cm^{-1}$ is due to ester carbonyl stretching. The three peaks appearing at 2872 and 2933 $cm^{-1}$ are due to symmetric and asymmetric —CH stretching while peak appearing at 3036 $cm^{-1}$ is from —CH of aromatic ring. A big hump appearing at 3400 $cm^{-1}$ is due to hydrogen bonded —OH stretching.

We have also compared the FTIR spectra from different time and temperatures. The spectra were recorded on the gel resin compositions at room temperature condition, and after curing the resin compositions for 7 days. The spectra were also recorded on the compositions that were post cured at 70° C. after 7 days of hardening. It was interesting to note that spectral assignments were not affected by the presence of solvents in the nanocomposites compositions. This is possibly due to the overlapping of the spectral bands from the two solvents with that of the polymer as mentioned earlier.

The spectra from different time and temperatures however, do not show much difference. This could be due to the overlapping of spectral assignments from different chemical ingredients. However, the two important peaks appearing at approximately 1600 $cm^{-1}$ due to aromatic ring stretching and at 1730 $cm^{-1}$ due to carbonyl ester stretching changed it appearance with the increase in time and temperature. The splitting of peak at approximately 1600 $cm^{-1}$ is possibly due the benzene ring stretching that appears strongly as the styrene evaporates with the time and temperature. Additional benzene ring stretching appearing at approximately 1600 $cm^{-1}$ could be due to the presence of graphene in the nanocomposites as no such peak splitting was observed in the case of composites containing DMAC as a solvent. These peaks were initially overlapped due to the styrene stretching at 1624 $cm^{-1}$. Similarly, the components form stronger ester linkages as the styrene evaporates and the stretching can be clearly seen as splitting of band appearing at 1746 $cm^{-1}$.

Characterization of Polymer Nanocomposites Using Raman Spectroscopy

Figure 50:
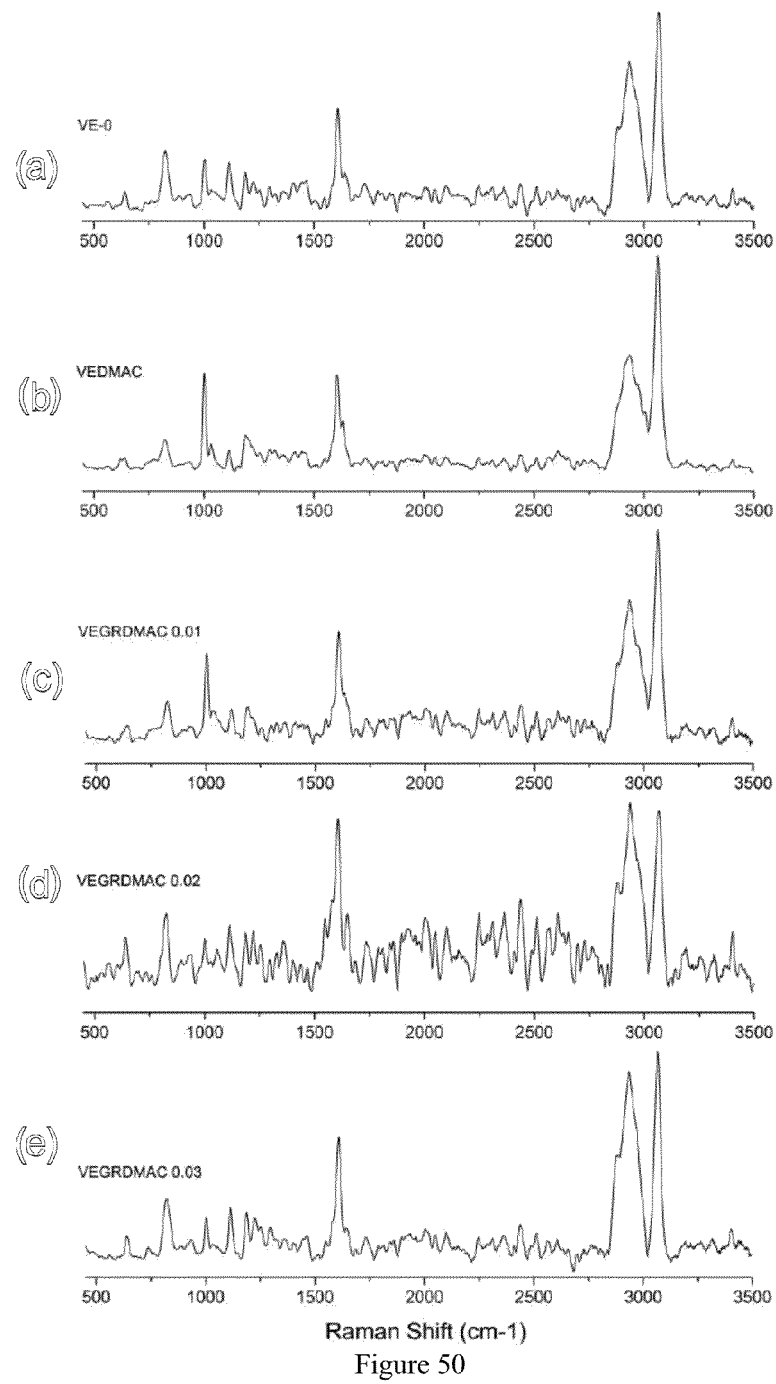
FIG. 50 illustrates Raman spectral analysis of vinylester nanocomposites containing DMAC solvent and graphene.
Figure 51:
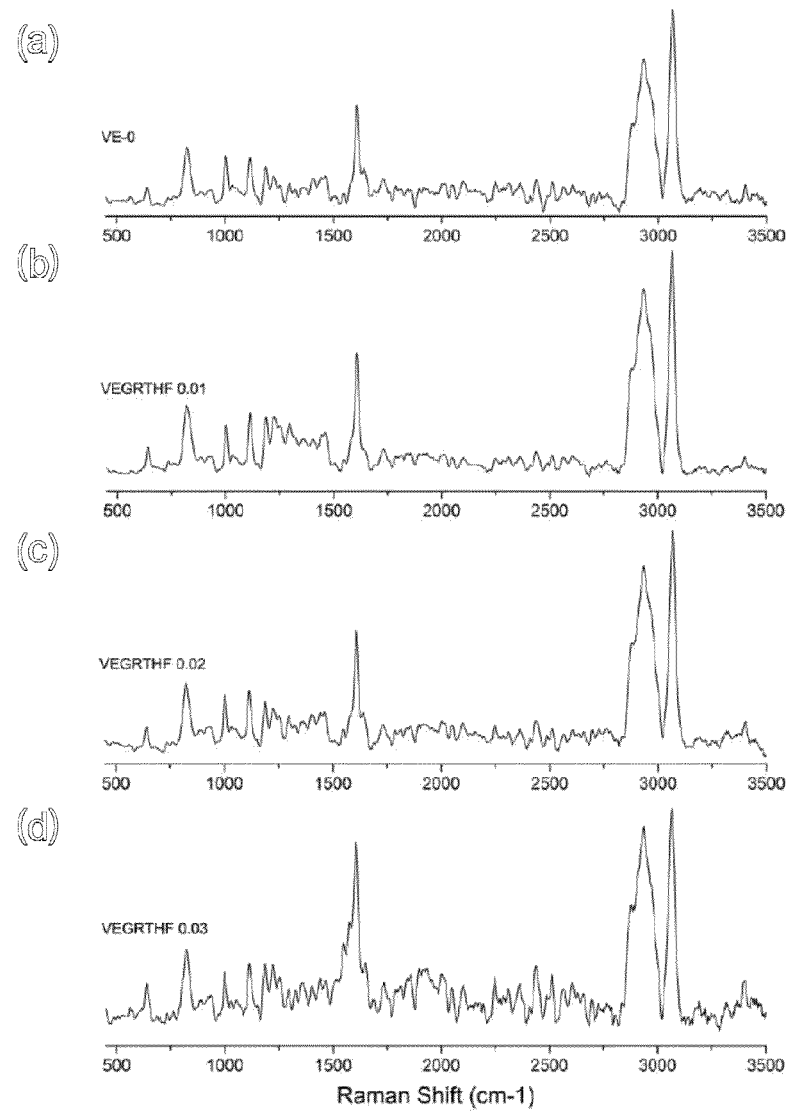
FIG. 51 illustrates Raman spectral analysis of vinylester nanocomposites containing THF solvent and graphene.

The graphene (RGNS-II) shows clear peaks in the Raman spectrum. Therefore, in order to visualize the presence of graphene in the nanocomposites, the Raman spectrum (FIGS. 50, 51) were acquired on the nanocomposites with varying concentrations of graphene and compared with those obtained on pristine composite. The spectra were acquired on the composites and nanocomposites cured at room temperature. On close observation of spectra from two different families of nanocomposites it was discovered that peaks from graphene were not present. The absence of G and D band peaks (from graphene) in the nanocomposites could be attributed to the small size of the graphene nano-sheets. The nanosheets are uniformly distributed (as suggested by the transmission electron microscopic analysis explained in preceding sections) and possibly buried in the bulk of the sample. These nano-sheets were not available in the area of Raman scan.

Morphological Investigation of Polymer Graphene Nanocomposites Using Electron Microscopic Techniques The presence of solvent and incorporation of graphene nano-sheets may alter the morphological appearance of a polymeric composite. The dispersion of foreign element in the continuous polymeric matrix may affect the overall packing arrangement of the polymeric chain leading to the pockets inherited with the possible defects or imperfections. The overall properties of the composite are adversely affected in cases those leads to the agglomeration of the nanomaterials in the polymeric matrix. The distribution of the graphene in the bulk of the nanocomposites was checked.

The top surface of the nanocomposite samples were analyzed using FESEM technique. The surface topography using FESEM method however did not provide the insight of the material. The nanocomposite samples were then fractured in liquid nitrogen and the cross section was then analyzed using the FESEM and TEM techniques.

Figure 52:
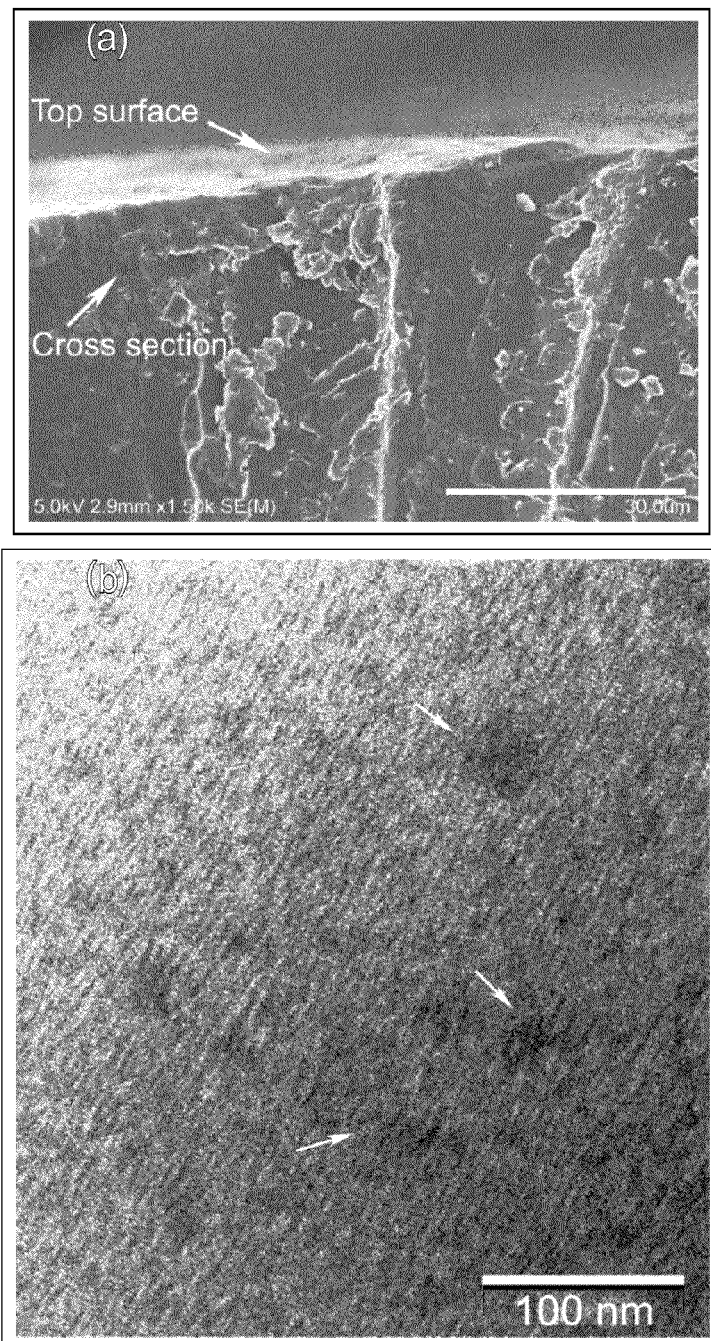
FIG. 52 illustrates a morphological investigation on VEG-RDMAC0.02. (a) SEM; (b) TEM images showing RGNS-II dispersion in VE.

The FIG. 52a shows cross section FESEM of VEGRD-MAC0.02 nanocomposite. The dense top surface can be seen in the micrograph along with the densely packed cross section. There was no sign of cavitations, pinhole or any other type of defect in the area of the scan suggesting that the material was fully cured. Moreover, the presence of minute amount of DMAC solvent limits scanning resolution to capture the presence of graphene. The TEM technique (FIG. 52b) was used to check the dispersion of graphene in the bulk of the material. The single layer of graphene is impossible to detect in the polymer composite due to the absence of contrast between the two hydrocarbons. However, there were few regimes that displayed the presence of graphene between the layers of nanocomposite.

Figure 53:
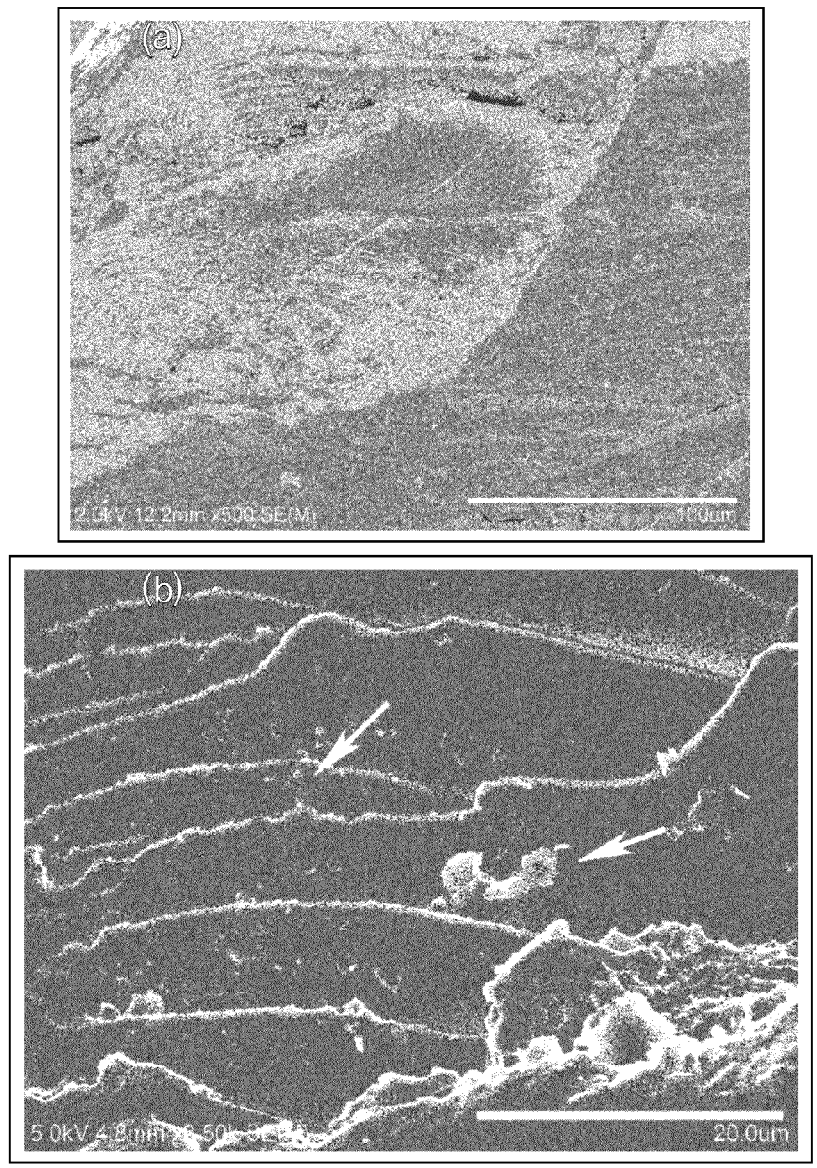
FIG. 53 illustrates a morphological investigation on VEG-RTHF0.02. (a, b) FESEM images showing RGNS-II dispersion in VE.

The FIG. 53 shows cross section FESEM images of VEG-RTHF0.02 nanocomposite. In this case THF was used as a solvent for the dispersion of the graphene. The uniqueness of this solvent is that it homogenously disperses the graphene in the polymeric matrix and evaporates at room temperature without leaving any residue. It helps in eliminating the affect of the solvent and to visualize the affect of graphene nanosheets in finally cured nanocomposite.

The VEGRTHF0.02 nanocomposite showed granulated textured morphology (FIG. 53a) that was different from the former case where DMAC was used a vehicular media for the dispersion of graphene. In this case FESEM technique was able to capture the presence of graphene between the layers of the polymer. The agglomerated graphene regimes can be clearly seen in the FIG. 53b. It is worth mentioning that regions showing the presence of graphene were not frequently noticed suggesting that the distribution of nanosheets was relatively homogenous except in few sites where the agglomeration was observed.

Mechanical Analysis of Nanocomposites

Introduction

Nanoparticles possess high surface area that can reactive with the active functionality to provide additional strength to the materials network. The graphene nano-sheets believed to have highest aspect ratio among the nanomaterials known so far. However, the true potential of graphene nano-sheets in polymer nanocomposites could only be achieved if they are properly functionalized and uniformly dispersed in the matrix. Moreover, the appreciable properties can be obtained if the functionalities generated over graphene could be reacted with the functional group in the polymer matrix. The following section details the variation in mechanical properties as a result of the modification in polymeric matrix.

Dynamic Mechanical Analysis

The Dynamic Mechanical Analysis (DMA) is an important technique that is used to study and characterize materials. This technique is useful in analyzing the visco-elastic behavior of polymeric materials. In a exemplary DMA experiment, a sinusoidal stress is applied on the material and the generated strain is measured that allows determining the complex modulus. The stress frequency and sample temperature is varied that leads to the variations in the complex modulus. Such experiments help in determining the glass transition temperature of the material, as well in understanding the transitions corresponding to the associated molecular motions.

Figure 54:
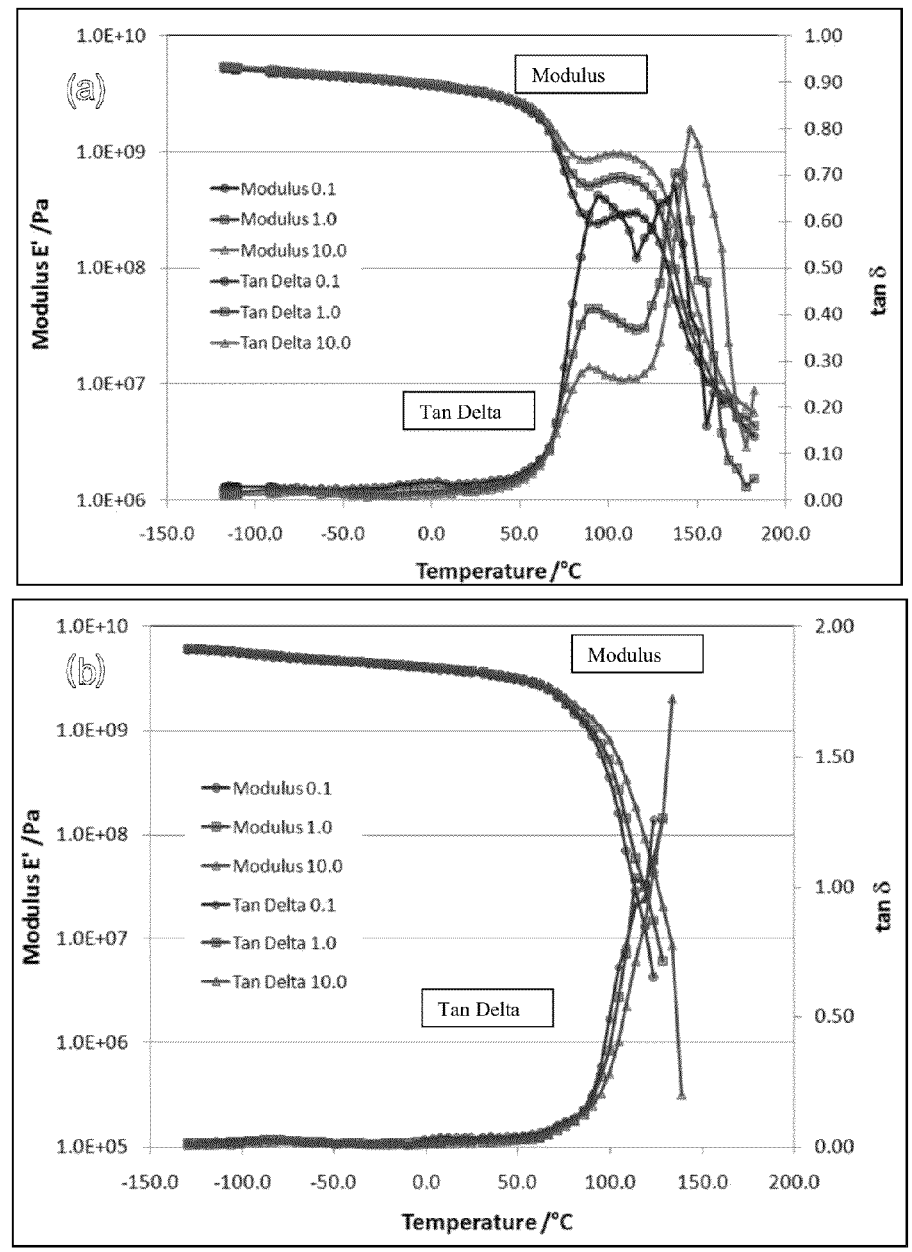
FIG. 54 illustrates dynamic mechanical thermal analysis of (a) pristine VE; and (b) VEDMAC composite.
Figure 55:
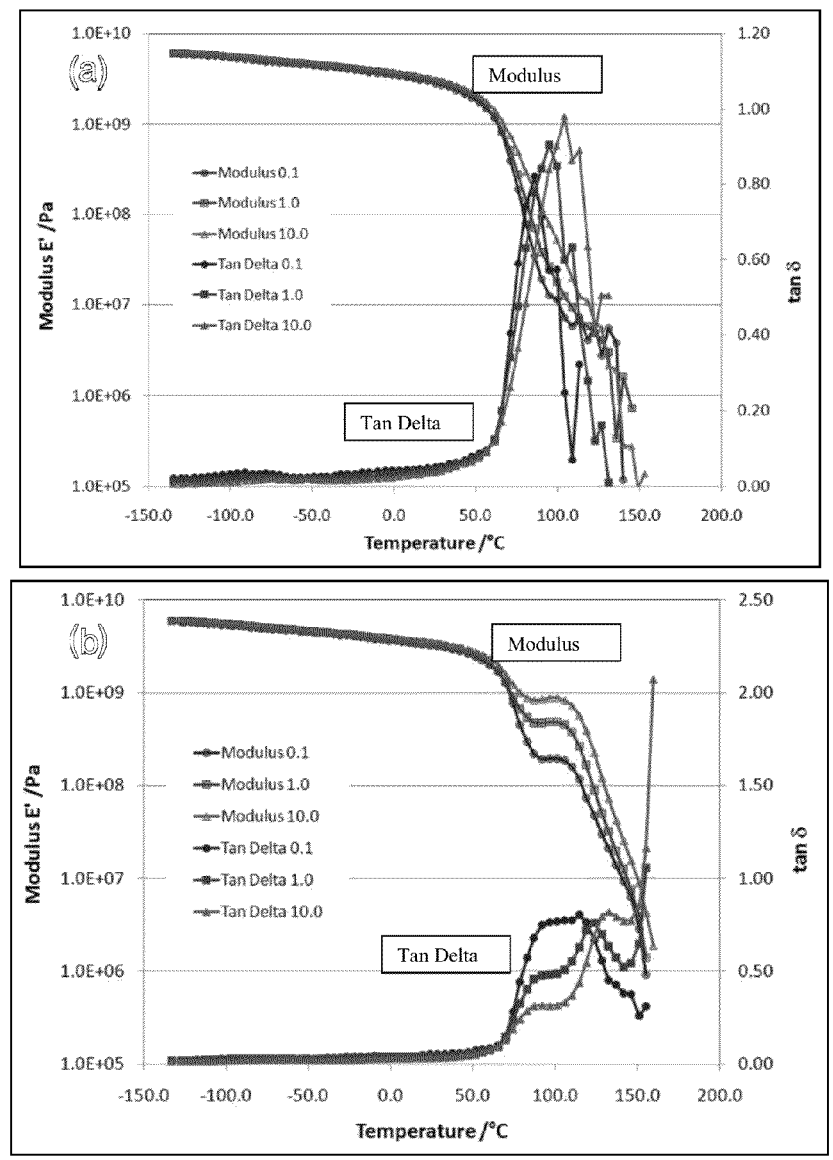
FIG. 55 illustrates dynamic mechanical thermal analysis of (a) VEGRDMAC0.02; and (b) VEGRTHF0.02 nanocomposite.

The DMA technique has been well documented for the determination of glass transition temperature (Tg) of the polymers. The Tg is determined at the point of sharp declination in the elastic modulus of polymer. Although, the Tg is commonly defined as the point of maximum damping ratio i.e. E"/E' or tan δ but several researchers found that Tg can be more accurately determined from the onset of the change in slope of E' curve. The storage modulus (E') and tan δ curves for different composite and nanocomposites are shown in FIGS. 54-55 and the corresponding Tg values are shown in the following table (Table 16):

| | | Tg from onset of the slope change in E' (° C.) | | |
|---|---|---|---|---|
| | | @ 0.1 Hz | @ 1.0 Hz | @ 10.0 Hz |
| VE0 | First scan | 52.5 | 46.0 | 46.5 |
| | Second scan | 76.8 | 80.3 | 83.0 |
| VEDMAC | First scan | 50.7 | 47.0 | 51.7 |
| | Second scan | 78.1 | 81.7 | 83.9 |
| VEGRDMAC | First scan | 40.9 | 40.4 | 42.1 |
| | Second scan | 55.0 | 56.9 | 64.6 |
| VEGRTHF | First scan | 58.1 | 54.6 | 54.9 |
| | Second scan | 74.6 | 84.1 | 93.5 |

Tg values reported in the table are displayed for two different scans on the same sample. The samples were initially scanned from −150° C. until 200° C. and the same samples was analyzed again from −150° C. until 200° C. following exactly the same experimental conditions as in first scan. The results from second scan could be considered from the post cured samples.

The FIG. 54a shows storage modulus (E') and tan δ curves as a function of temperature, obtained on pristine VE resin composite. The experiment was conduct at three different frequencies i.e. 0.1 Hz, 1.0 Hz and 10.0 Hz. The curve clearly displays two different relaxation processes. The α-relaxation process appearing in the vicinity of 45° C. is associated with the Tg of the material. This relaxation occurs due to a small deflection in polymer backbone as material passes from one phase to another phase as a result of change in time and temperature. The β-relaxation process appearing at around 125° C. temperature is due to the large scale molecular motions. Such motion could be attributed to the movements in the regimes that are either associated with the monomeric units or to the presence of insufficiently crosslinked entities.

FIG. 54b shows storage modulus (E') and tan δ curves as a function of temperature, obtained on VE resin containing DMAC. It was interesting to note that this composite displayed single peak in tan δ curve corresponding to α-relaxation process associated with the Tg of the material. The Tg value calculated from E' curve was found to be 47° C. at 1.0 Hz frequency suggesting that large scale movements were suppressed in the polymer due to the presence of solvent.

FIG. 55a shows storage modulus (E') and tan δ curves as a function of temperature, obtained from VEGRDMAC0.02 nanocomposites. Similar to the case of VEDMAC composite, this nanocomposite displayed single α-relaxation process. The Tg value in this case was at approximately 40° C., a value lower then VEDMAC composite. The Tg was measured from E', i.e., Storage Modulus, by the DMTA Equipment from Perkin Elmer and the results are presented in Table 16 above.

The FIG. 55b shows storage modulus (E') and tan δ curves as a function of temperature, obtained from VEGRTHF0.02 nanocomposites. Contrary to the above case, this nanocomposite displayed two relaxation processes. The α-relaxation process associated with the Tg was seen at approximately 55° C. while the β-relaxation process appeared at approximately 125° C. The secondary relaxation process can be attributed to the long range movements from polymeric domains that are associated with the graphene. The secondary relaxation process was possible in this case due to the absence of solvent in the composition.

It is interesting to compare the Tg values from different compositions shown in Table 6.1. The scan was conducted twice on the same sample to check the effect of post curing on the composites and nanocomposites. In first scan, the samples were heated from −150° C. until 200° C. at the heating rate of 5° C./min. The samples were brought to the ambient conditions and re-scanned (second scan) from −150° C. until 200° C. at the heating rate of 5° C./min. The samples remained clamped during the entire experiment.

The Tg values are generally reported from 1.0 Hz frequency. It appears from the Table 6.1 that during first scan Tg values have increased when pristine VE resin was modified. The maximum Tg was reported for VEGRTHF nanocomposite. Similarly, in case of second scan, the maximum Tg was recorded for VEGRTHF nanocomposite. These results suggest that presence of graphene enhances the crosslinking density (i.e. rigidity) in the polymeric network.

Tensile Testing of Nanocomposites

Figure 56:
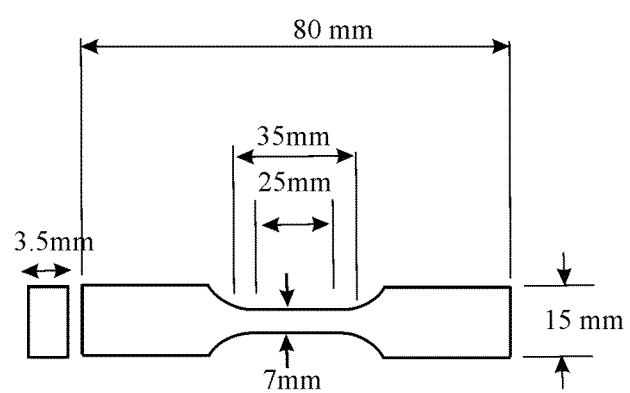
FIG. 56 illustrates the dimensions of a tensile specimen used for the mechanical property evaluation.
Figure 57:
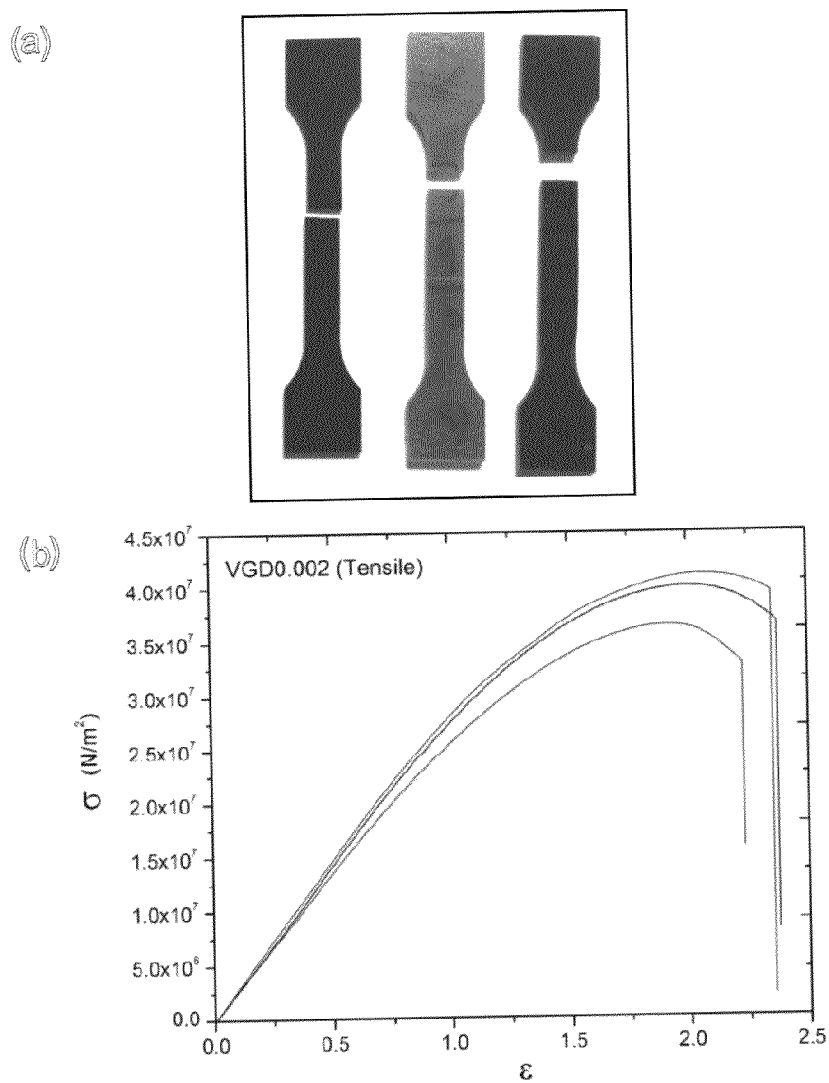
FIG. 57 illustrates (a) a sample obtained after tensile tests and (b) exemplary stress vs. strain plot for composite and nanocomposites.

The ASTM D 638 is used to determine the tensile properties of the vinyl ester nano composites. The test specimens were prepared in the dumb bell shape. Dimensions of the test samples are given in the following FIG. 56. The exemplary shape of the broken samples and plots obtained after the analysis are shown in FIG. 57.

To calculate the value of tensile strength, maximum load is divided by the cross sectional area in the gauge length such that:

$$\text{Tensile Strength} = \frac{P_{max}}{\text{Gage length cross section area}}$$

To calculate the tensile modulus, stress corresponding to any segment is divided by the corresponding difference in strain such that:

$$\text{Tensile Modulus} = \frac{\text{Stress}}{\text{Strain}}$$

Figure 58:
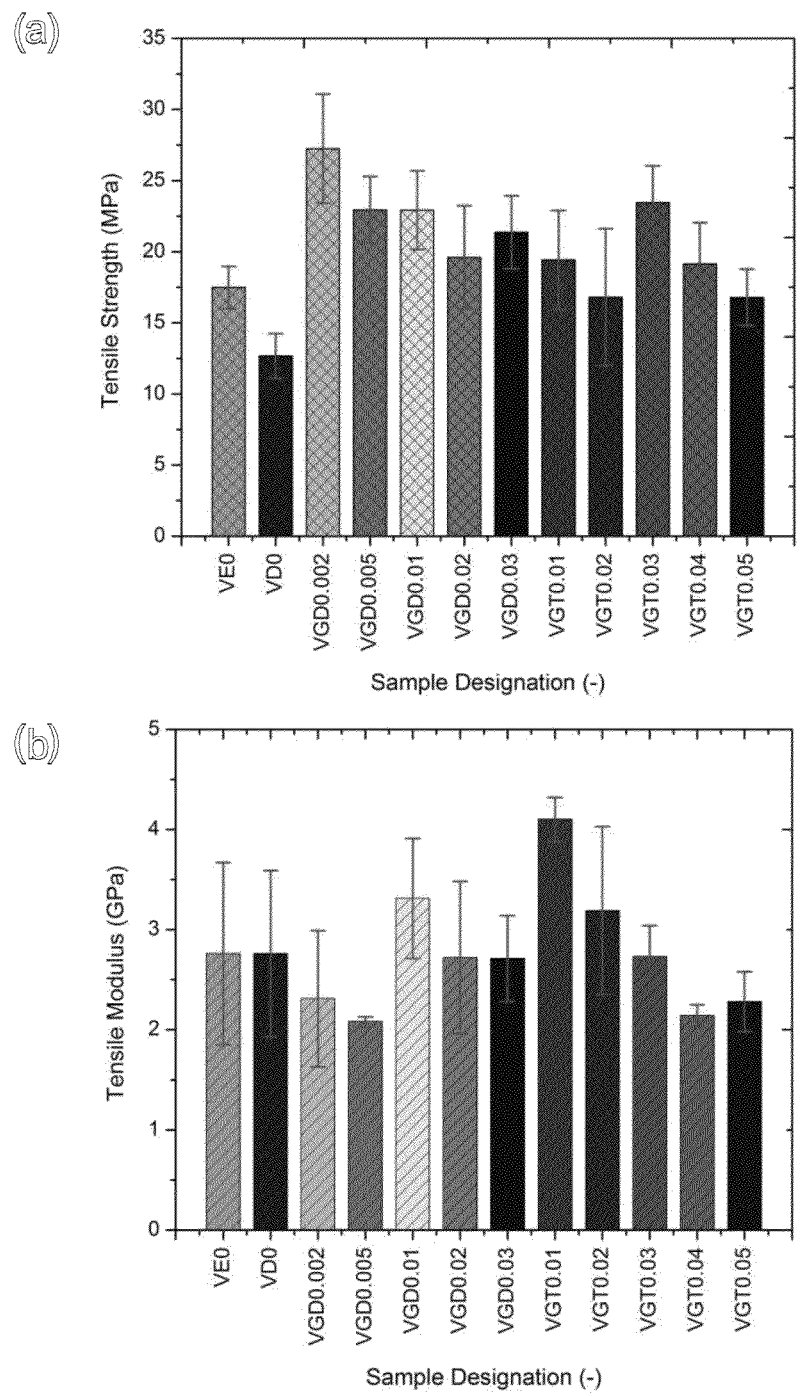
FIG. 58 illustrates the mechanical properties of pristine resin and nanocomposites. (a) tensile strength; and (b) tensile modulus (plots shown with standard deviation bars)

The ultimate tensile strength (UTS) of the composites and nanocomposites containing solvent and variable amount of graphene is shown in FIG. 58a. At least 6 to 9 samples of each composition were tested and the results are presented with the standard deviation bar. It has been reported that incorporation of graphene in the polymer matrix such as epoxy improves the strength of the nanocomposites. However, mixed results have been obtained in our vinyl ester resin nanocomposites. The UTS value of VEGRTHF nanocomposite maximizes when graphene is 0.03 wt % while in case of VEGRDMAC the highest value was found for 0.002 wt % graphene content. It is interesting to note that UTS for composite containing 0.5 wt % DMAC solvent is lower compared to the pristine composite.

The FIG. 58b shows the tensile modulus (TM) for the composites and nanocomposites containing solvent and variable amount of graphene. The TM showed a parabolic increment in case of VEGRTHF nanocomposite as maximum value was achieved for 0.01 wt. % graphene loading. Similarly, in case of VEGRDMAC nanocomposite the increment was highest at 0.01 wt. % graphene loading. The TM value for pristine VE resin composite and VE DMAC was identical suggesting that solvent doesn't affect the TM of vinyl ester composites.

Single Edge Notched Beam Testing of Nanocomposites

Figure 59:
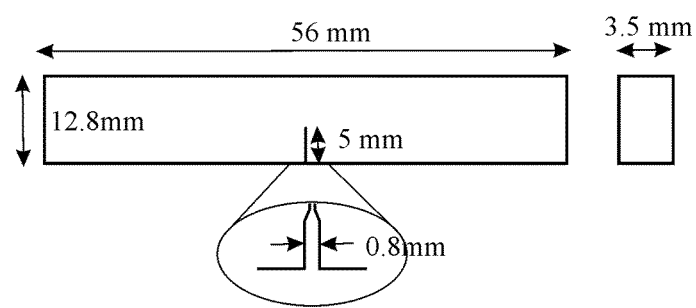
FIG. 59 illustrates the dimensions of the SENB specimen used for the mechanical property evaluation.

The ASTM D5045 is used to find the toughness of the vinyl ester nanocomposites in terms of critical stress intensity factor $K_{IC}$ and critical strain energy release rate $G_{IC}$ at fracture initiation. Three point bend specimens were prepared having w/b ratio other then 2 and also fulfilling the criteria of 2<W/b<4 where 'W' is width and 'b' is a thickness. The parameter of 0.44<a/W<0.55 is also considered while sample preparation; where 'a' is the crack length. The dimensions used for the sample preparation of test specimens for the three point bending method are shown in the following FIG. 59.

In order to calculate $K_Q$ in units of MPa·m$^{(1/2)}$, the general formula used for bend specimens with S/W=4 is $K_Q=(P_Q/bW^{0.5})f(x)$. Where 0<x<1, $P_Q$ is load, 'b' is specimen's thickness, 'W' is width of the specimen and 'a' is crack length. The value of 'x' is given as a/W while f(x) value is obtained from the table given in ASTM 5045.

Figure 60:
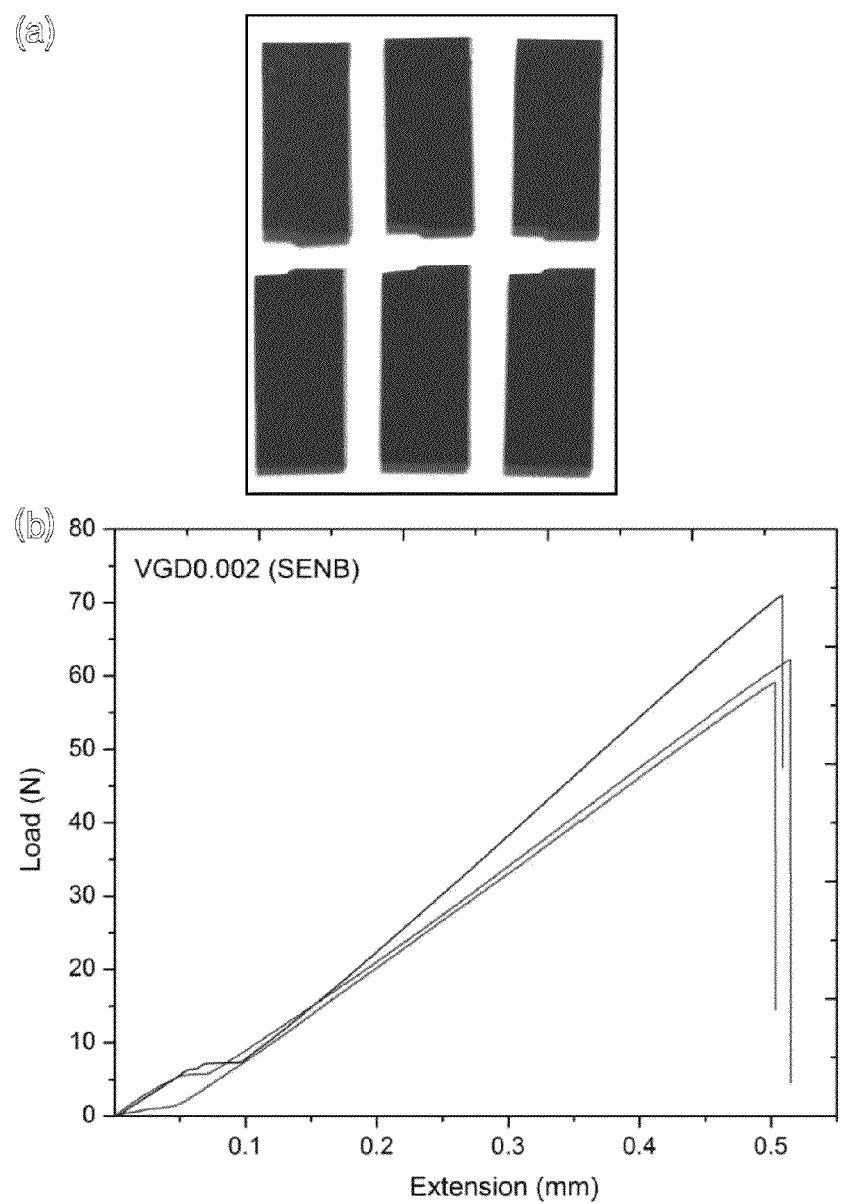
FIG. 60 illustrates (a) a sample obtained after SENB tests and (b) exemplary load vs extension plot for composite and nanocomposites.

To calculate the valve of $G_Q$, in units of KJ/m$^2$ for bend specimens from the corrected energy 'U', the equation used is given as $G_Q=U/(bW_\phi)$, where 'b' is the thickness of the specimen, W is the width of the specimen and ϕ is energy calibration factor. The value of ϕ is obtained from the table given in the ASTM D 5045. The exemplary shape of the broken samples and plots obtained after the analysis are shown in FIG. 60.

Figure 61:
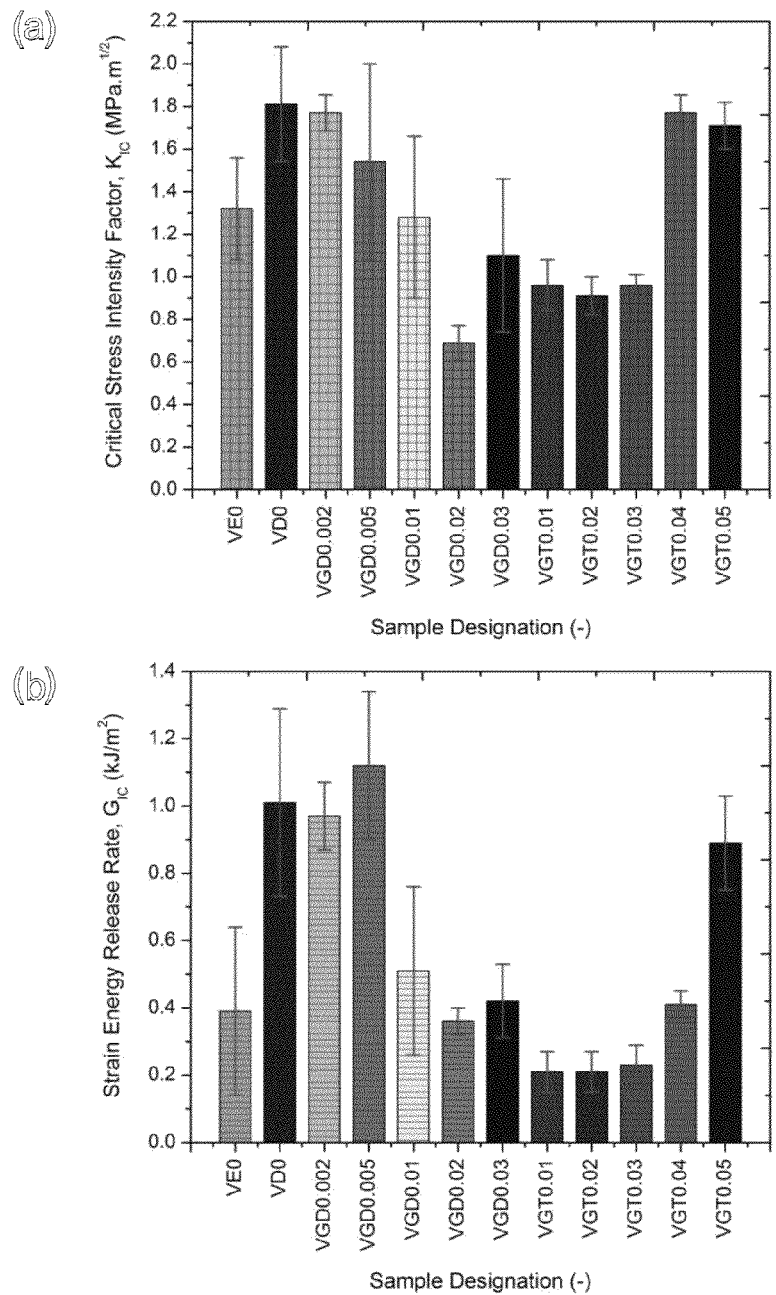
FIG. 61 illustrates mechanical properties of pristine resin and nanocomposites. (a) $K_{IC}$; and (b) $G_{IC}$ values calculated from SENB testing (plots shown with standard deviation bars).

The FIG. 61a displays critical stress intensity factor ($K_{IC}$) for composites and nanocomposites with different graphene loadings. The $K_{IC}$ values in case of VEGRTHF nanocomposite displayed a parabolic trend in improvement and maximum value was found for the case graphene 0.03 wt %, while in case of VEGRDMAC, the parabolic increment trend was opposite as the maximum value was found for 0.002 wt %. The $K_{IC}$ value for VEGRDMAC nanocomposite was higher than pristine VE composite except for the case of VEGRDMAC0.002.

The calculated strain energy release rate ($G_{IC}$) for composites and nanocomposites with different graphene loadings is shown in FIG. 61b. It can be seen that $G_{IC}$ value increases with the increase in graphene concentration for the case of VEGRTHF nanocomposites while the $G_{IC}$ decreased with the increase in graphene concentration in case of VEGRDMAC nanocomposites. In-fact, the VEGRDMAC nanocomposites with lower graphene content displayed higher value of $G_{IC}$.

Figure 62:
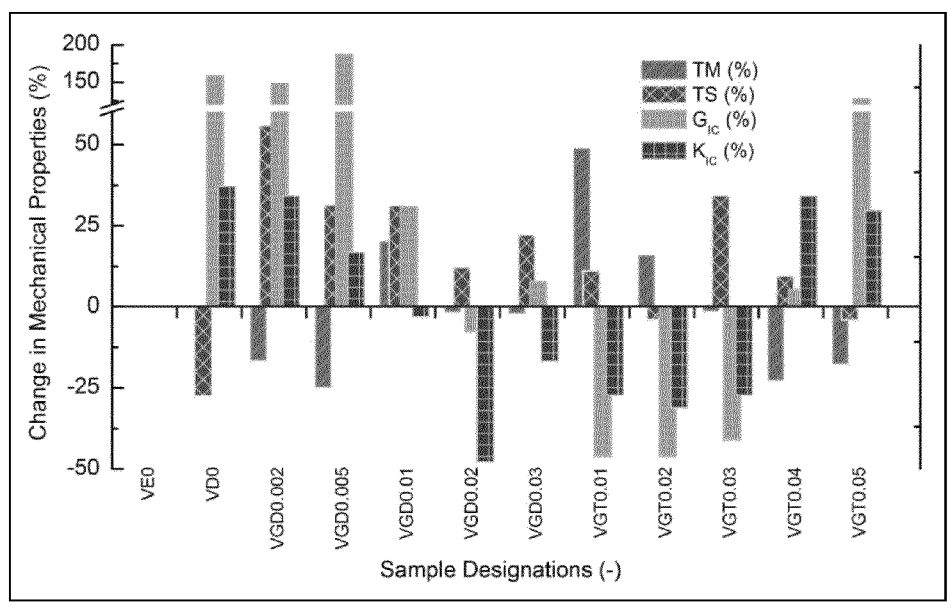
FIG. 62 illustrates variation in the mechanical properties of nanocomposites as compared to pristine composite.

The variation in mechanical properties as function of different modifiers is summarized in FIG. 62. Note that primary Y-axis has been broken to display the lower value achieved in different composites and nanocomposites. It can be seen that modification has significantly affected the properties of vinyl ester resin. A significant level of improvement has been achieved in case of VEGRDMAC0.002 nanocomposite where the tensile strength improved to approximately 60% while fracture toughness increased to approximately 30%. A high increment (150%) in $G_{IC}$ was achieved for the case of VEGRDMAC0.002. The mixed changes in mechanical properties were observed in case of VEGRTHF nanocomposites. The percentage changes occurring in different nanocomposites are also shown in Appendix-B.

Failure Analysis of Nanocomposites

Figure 63:
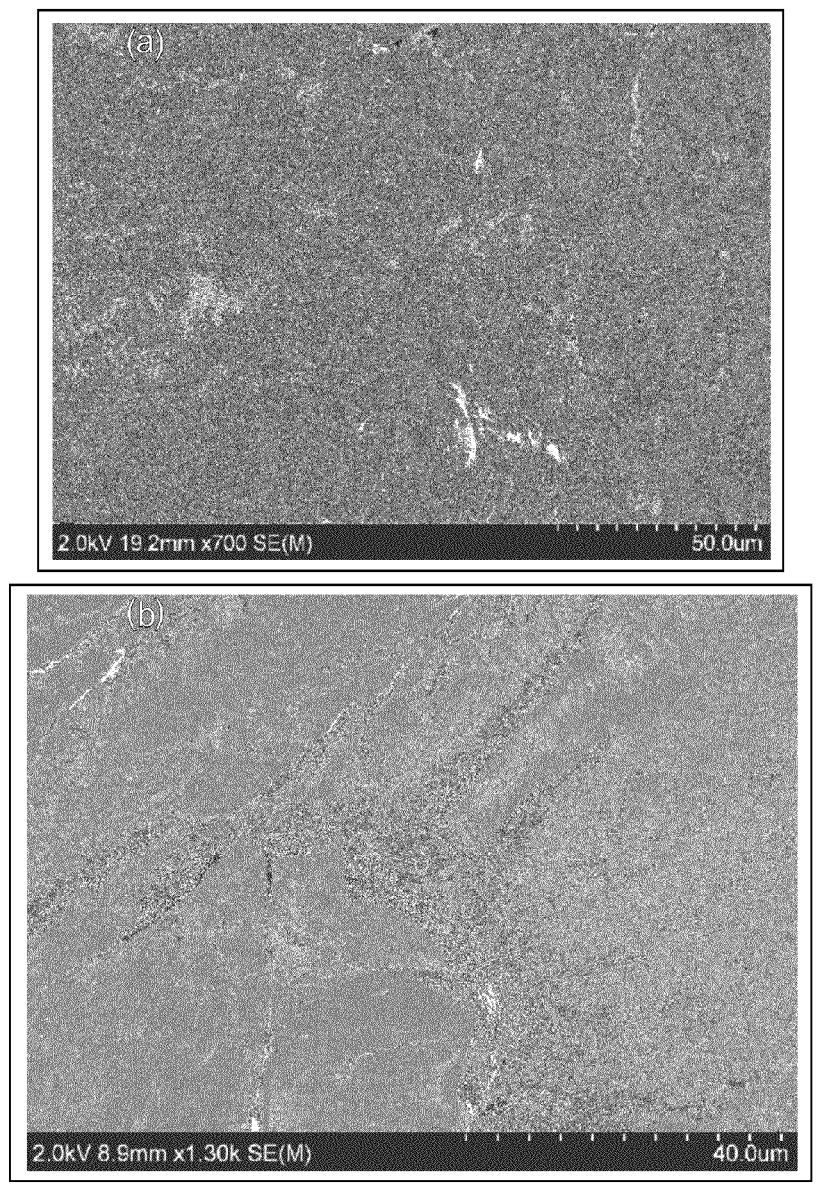
FIG. 63 illustrates FESEM images to study the failure modes (a) failure in SENB; and (b) failure in tensile testing of pristine VE resin.

The fracture surface of the failed fracture and tensile test specimens were examined under the FESEM to study the failure mode and mechanism in the composites and nanocomposites. The FESEM micrographs of the pristine VE specimens that failed during SENB and tensile tests are shown in FIG. 63. It appears from the micrograph that in SENB test (FIG. 63a), specimen failed in a ductile manner. A significant stretching of the polymer is clearly visible that supports the above mentioned premise. During tensile testing (FIG. 63b)

the sample appears to fail in mixed mode. Most part of the sample displayed the chain elongation morphology. However, a brittle fracture was also observed.

Figure 64:
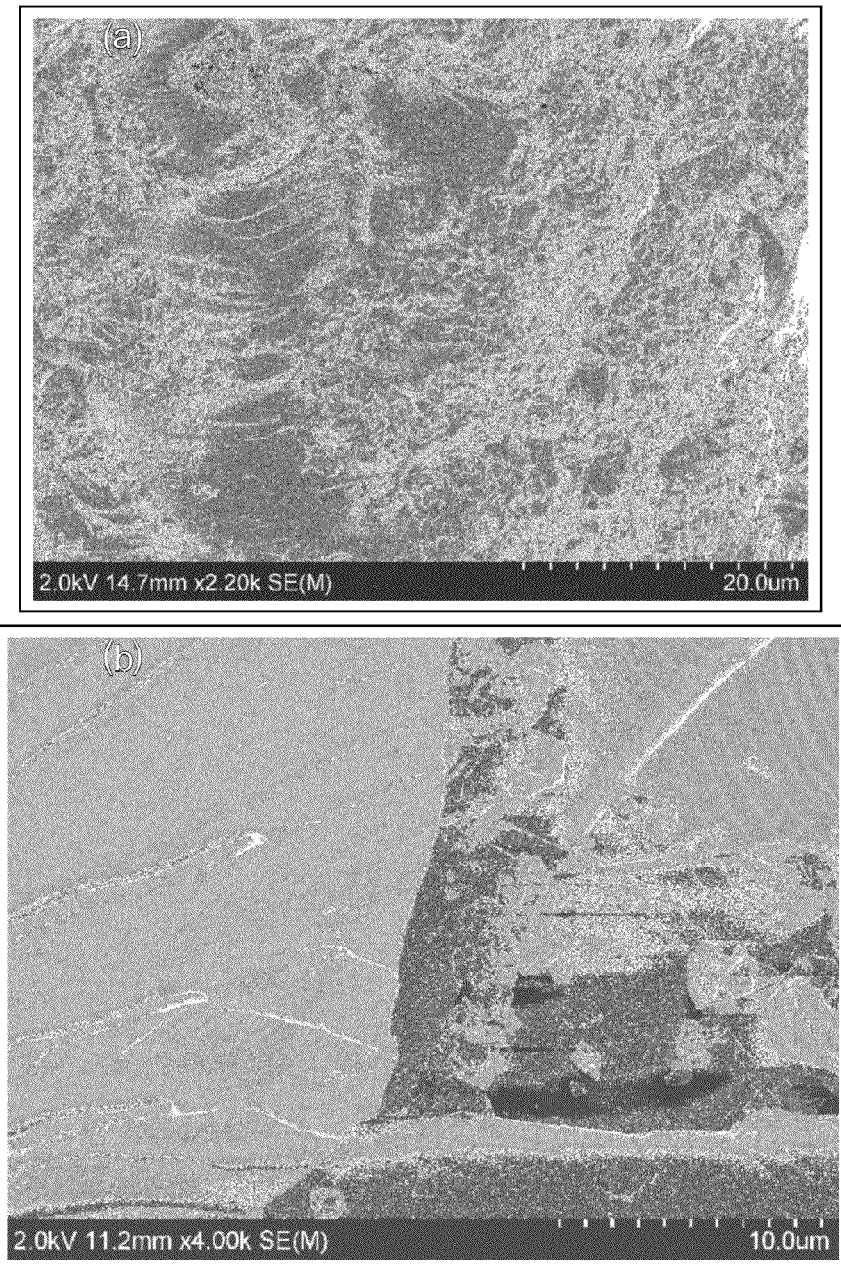
FIG. 64 illustrates FESEM images to study the failure modes (a) failure in SENB; and (b) failure in tensile testing of VEDMAC.

The FESEM micrographs of the VEDMAC specimens that failed during SENB and tensile tests are shown in FIG. 64. These specimens contained a little amount of solvent that may help during the chain elongation process. As expected, these specimens appear to fail in ductile mode during SENB and tensile testing.

Figure 65:
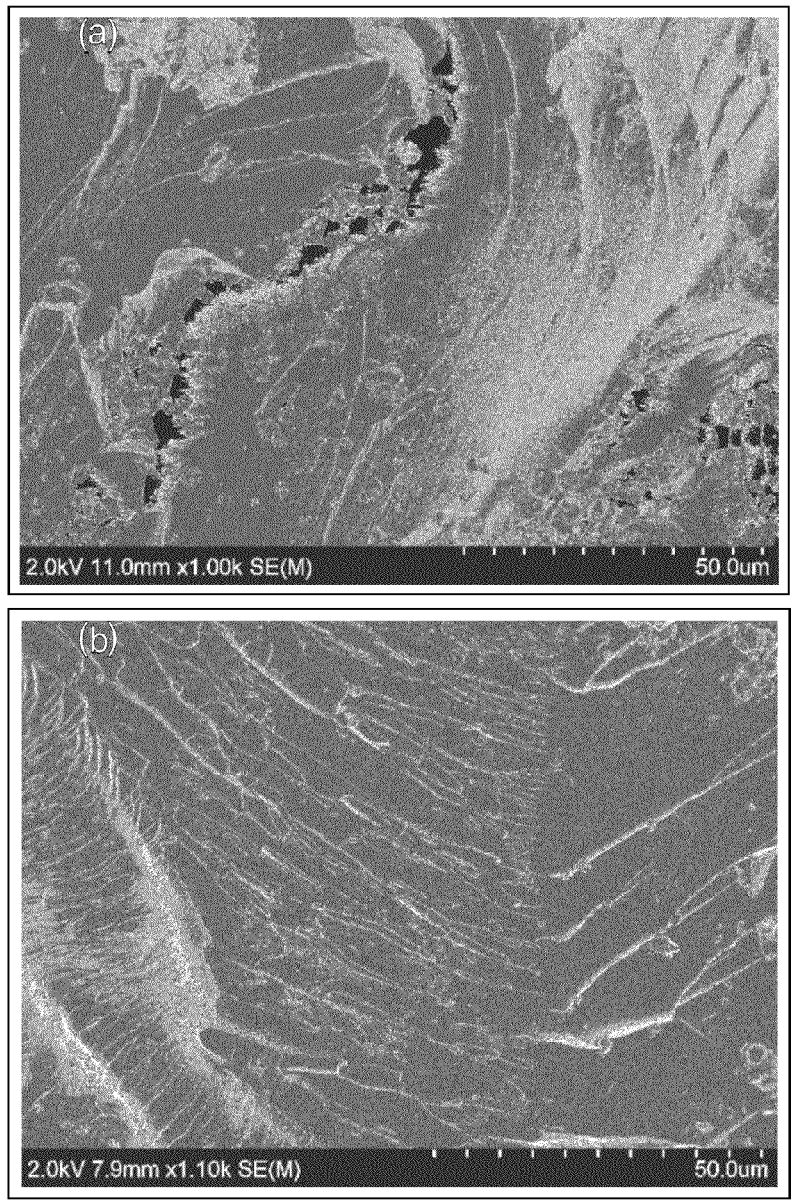
FIG. 65 illustrates FESEM images to study the failure modes (a) failure in SENB; and (b) failure in tensile testing of VEGRDMAC0.02.

The FESEM micrographs of the VEGRDMAC specimens that failed during SENB and tensile tests are shown in FIG. 65. The failure mode during SENB testing was ductile in nature as polymer surface appeared elongated. Similar to the above case, in tensile testing the sample failed in ductile mode as most part of the sample displayed elongated chains morphology.

Figure 66:
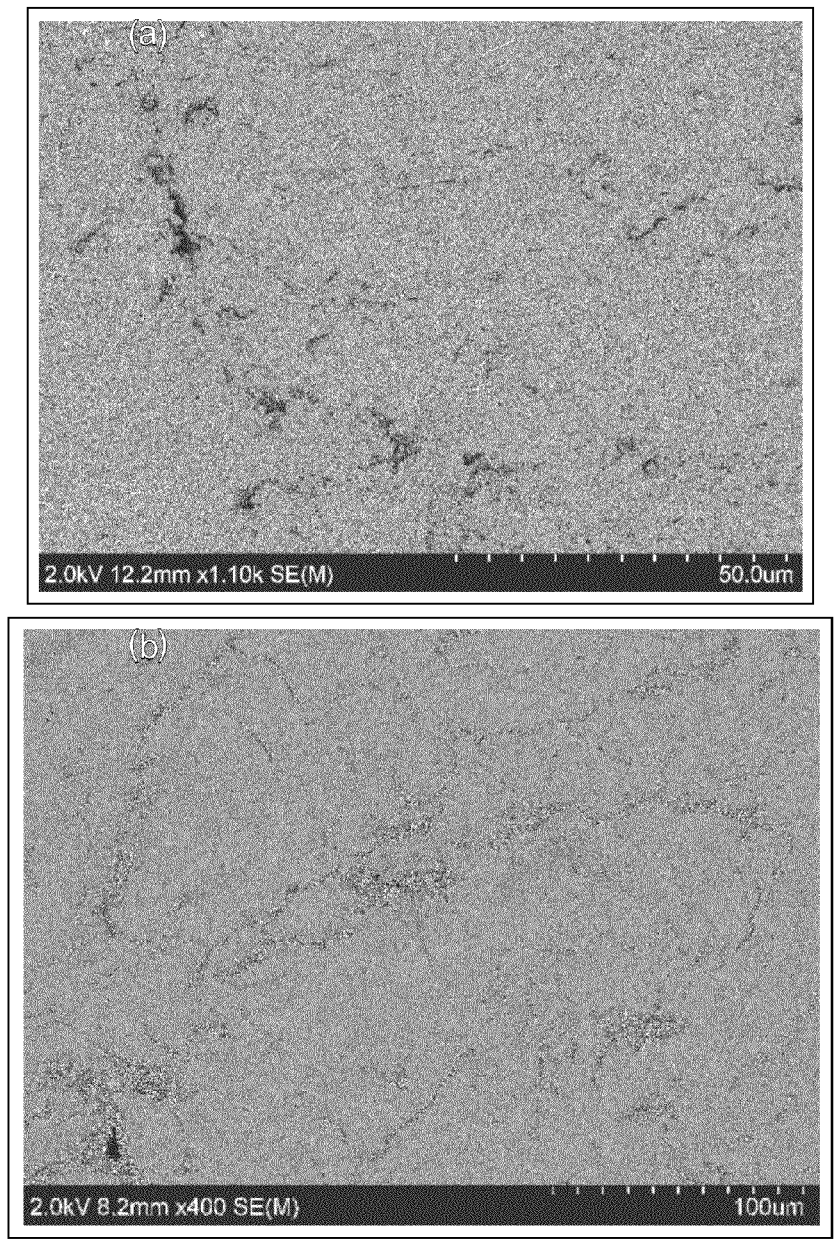
FIG. 66 illustrates FESEM images to study the failure modes (a) failure in SENB; and (b) failure in tensile testing of VEGRTHF0.02.

The FESEM micrographs of the VEGRTHF specimens that failed during SENB and tensile tests are shown in FIG. 66. The failure mode during SENB testing was brittle in nature as polymer surface suffered fast crack propagation. Similar to the above case, in tensile testing the sample failed in brittle manner. The crack initiated and propagated with the increase in load and extension leading to the fracture.

Figure 67:
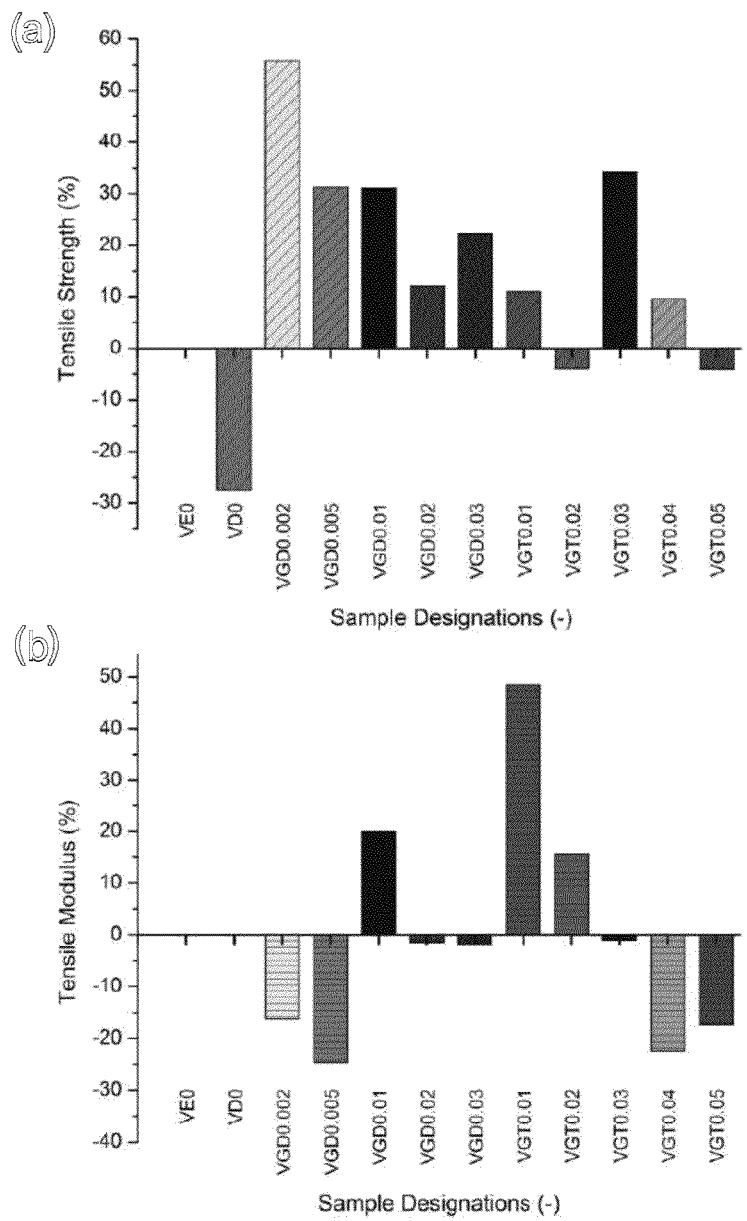
FIG. 67: Mechanical properties comparison between pristine resin and nanocomposites. (a) tensile strength; and (b) tensile modulus.
Figure 68:
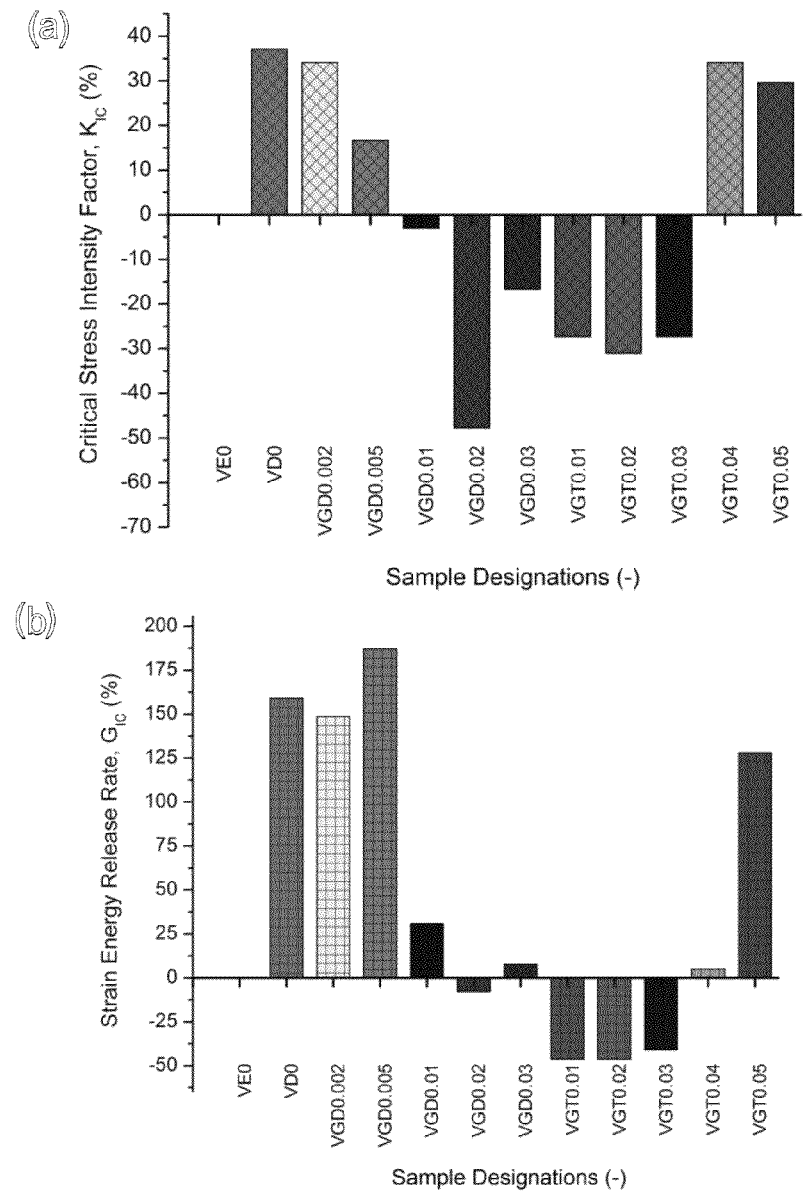
FIG. 68 illustrates mechanical properties comparison between pristine resin and nanocomposites. (a) $K_{IC}$; and (b) $G_{IC}$ values calculated from SENB testing.

FIG. 67 illustrates a mechanical properties comparison between pristine resin and nanocomposites. (a) tensile strength; and (b) tensile modulus. FIG. 68 illustrates a mechanical properties comparison between pristine resin and nanocomposites. (a) MC; and (b) GIC values calculated from SENB testing.

Incorporation of graphene nano-sheets can significantly modify the properties of polymeric resin. The dispersion of graphene and its interfacial interactions with the surrounding polymeric matrix played a critical role in controlling the ultimate properties of the resulting nanocomposites. Moreover, the selection of solvent was crucial in achieving the desired physico-chemical attributes.

The graphene nano-sheets were synthesized using three different techniques and characterized using different analytical techniques. The FTIR, Raman, XPS and XRD spectroscopic studies confirmed the successful synthesis of graphene sheets. Moreover, the high resolution electron microscopic studies showed the formation of graphene sheets. It was discovered that graphene, RGNS-II, was highly functionalized and exfoliated. The RGNS-II was therefore chosen for the preparation of the polymer nanocomposites. The graphene forms a stable suspension in aprotic solvents such as DMAC and therefore used as a vehicular media for the homogenous dispersion of graphene in the polymer. In order to eliminate the effect of DMAC solvent and to visualize the effect of graphene in the polymer matrix, THF was also chosen as a vehicular media for the uniform distribution of graphene in the polymer. The THF solvent possess room temperature volatility and therefore evaporates without leaving the residue.

The graphene was homogeneously distributed in vinyl ester resin with the help of two different solvents (i.e. DMAC and THF). The nanocomposites were characterized using different analytical techniques and the effect of solvent on the development of nanocomposites was studied. Although, no clear peaks were observed during the spectroscopic studies, yet there were few indications that graphene was present in the nanocomposites. The high resolution electron microscopic studies confirmed the presence of graphene in the nanocomposites.

The viscoelastic properties of pristine composite, composite containing DMAC solvent and nanocomposites containing variable amount of graphene were investigated using dynamic mechanical analysis. It was found that presence of solvent and graphene affected the glass transition temperature of the nanocomposites. The presence of graphene in absence of solvent raised the glass transition temperature of the nanocomposites.

The composites and nanocomposites were tested in tensile and SENB mode. It was discovered that in case of nanocomposites prepared with the help of THF, tensile strength increased to approximately 40% on reducing the amount of graphene until 0.03 wt. %. However, the tensile strength decreased on further reduction of graphene concentration. In case of nanocomposites prepared with the help of DMAC, the strength increased to approximately 60% with the decrease in graphene concentration. Moreover, in case of THF assisted nanocomposites, the tensile modulus increased to approximately 50% at relatively higher graphene concentration. Similarly, in DMAC assisted nanocomposites, the tensile modulus decreased for all the cases except for VGD0.01.

In SENB testing mode, the THF assisted nanocomposites showed increase of approximately 35% in $K_{IC}$ value at higher graphene concentration while in case of DMAC assisted nanocomposites, the $K_{IC}$ value increased (with maximum of approximately 40%) with the decrease in graphene concentration. In THF assisted nanocomposites, the $G_{IC}$ value decreased at higher graphene concentration while in DMAC assisted nanocomposites, the $G_{IC}$ value increased to approximately 180% at relatively lower graphene concentration. An advantageous value of graphene concentration was 0.03 wt % that gave the synergism in the polymer properties.

The mode and mechanism of specimens failed during tensile and SENB tests were examined using high resolution electron microscopic technique. It was found that on addition of DMAC solvent, the polymer and its nanocomposites failed in ductile manner. However, in THF assisted nanocomposites, they failed in brittle fracture mode. It was therefore concluded that solvent interferes in the bonding process between graphene and polymer chains. In few cases solvent may acts as coupling agent between the graphene and active polymer sites.

The studies conducted on the graphene vinyl ester nanocomposites suggested that functionalized graphene nano-sheets can be effectively used to prepare polymeric nanocomposites with tunable properties. The viscoelastic studies have suggested that post curing of such nanocomposites is essential for the improvement in mechanical properties. In general, the homogeneous dispersion of graphene with high aspect ratio can be utilized as active filler in polymers to make stronger and light weight nanocomposites that can be utilized in several areas such as adhesives for wind turbine blades, boats and infra-structures.

The high quality graphene sheets can be delivered as self supporting dry material compared to the commercially available graphene sheets in solution. The development of vinyl ester based nanoresin with improved tensile and mechanical properties in cases where DMAC and graphene was used in the formulation.

In a first embodiment, the present application provides compositions. These compositions suitably include a resin and graphene bodies dispersed within the resin, the graphene bodies present in the range of from about 0.001 to about 1.0 wt %. The graphene is suitably present at 0.001 to 0.01 wt %, and can be present at between about 0.001 to about 0.005% based on the total weight of the composition. Suitable graphene materials and related methods for manufacturing such materials are described in U.S. Application No. 61/323,999 (filed Apr. 14, 2010), the entirety of which is incorporated herein by reference.

A variety of resins may be used in the claimed compositions. Polyesters (e.g., vinyl polyesters) are considered especially suitable. The resin may be a thermoplastic resin, a thermosettable resin, a radiation-curable resin, a polymerizable resin, dendrimers, a crosslinkable resin, any hybrids, mixtures, and copolymers thereof.

Suitable thermoplastic resins include acrylonitrile butadiene styrene, acrylic, celluloid, cellulose acetate, cyclic olefin copolymer, ethylene-vinyl acetate, ethylene vinyl alcohol, fluoroplastics, polyacrylates, polyacrylonitrile, polyamide, polyamide-imide, polyaryletherketone, polybutadiene, polybutylene terephthalate, polycarbonate, polyketone, polyetherketone, polyetherterephthalate, polyester, polyetheretherketone, polyetherketoneketone, polyetherimide, polyethersulfone, polyimide, polyphenylene oxide, polyphenylene sulfide, polystyrene, polyurethane, polyvinyl acetate, styrene-acrylonitrile, polyvinyl chloride, polyvinylidene chloride, combinations thereof, and the like.

A range of thermosets are also suitable for the claimed invention. Thermosets may be vulcanized rubber, phenol-formaldehyde, urea-formaldehyde, melamine resin, polyimide, cynate esters, cynoacrylate, polyacrylate, polyesters, vinylesters, polysiloxane, and the like. Radiation-curable resins may be polyamide, epoxy, polyester, vinyl ester, polyacrylates, polycarbonates, polysiloxane, and the like.

The polymerizable resin may include one or more of the following: acrylonitrile butadiene styrene, acrylic, celluloid, cellulose acetate, cyclic olefin copolymer, ethylene-vinyl acetate, ethylene vinyl alcohol, epoxy, fluoroplastics, polyacrylates, polyacrylonitrile, polyamide, polyamide-imide, polyaryletherketone, polybutadiene, polybutylene terephthalate, polycarbonate, polyketone, polyester, polyetheretherketone, polyetherketoneketone, polyetherimide, polyethersulfone, polyimide, polyphenylene oxide, polystyrene, polyurethane, polyvinyl acetate, styrene-acrylonitrile, polyvinyl chloride, polyvinylidene chloride, vulcanized rubber, vinylester, phenol-formaldehyde, urea-formaldehyde, melamine resin, polyimide, cynate esters, cynoacrylate, polyacrylate, polysiloxane, and the like.

Cross-linkable resins are also suitable. These resins may include acrylonitrile butadiene styrene, acrylic, celluloid, cellulose acetate, cyclic olefin copolymer, ethylene-vinyl acetate, ethylene vinyl alcohol, epoxy, fluoroplastics, polyacrylates, polyacrylonitrile, polyamide, polyamide-imide, polyaryletherketone, polybutadiene, polybutylene terephthalate, polycarbonate, polyketone, polyester, polyetheretherketone, polyetherketoneketone, polyetherimide, polyethersulfone, polyimide, polyphenylene oxide, polystyrene, polyurethane, polyvinyl acetate, styrene-acrylonitrile, polyvinyl chloride, polyvinylidene chloride, vulcanized rubber, vinylester, phenol-formaldehyde, urea-formaldehyde, melamine resin, polyimide, cynate esters, cynoacrylate, polyacrylate, polysiloxane, and the like. Copolymers and mixtures of any of these polymers may be used in the claimed invention.

The following are considered particularly suitable: Polyamide, polyimide, polyethylene, polypropylene, polystyrene, polyetheretherketone, polyvinylacetate, polycarbonate, polyester, vinylester, epoxy, phenolic, polyacrylate, polysiloxane. While certain testing was performed on a composition that included a vinylester-polyester resin, the invention is not in any way limited to that single type of resin. The resin may be in cured or uncured form, and may even be present in partially-cured form in some embodiments.

The graphene bodies may suitably be present at from about 0.002 to about 0.05 wt % of the composition, or even at from about 0.02 to about 0.03 wt % of the composition. A graphene body may be present in platelet form, and may include one, two, three, or multiple graphene layers. In some embodiments, a graphene body may have 10, 15, 20, or even more layers. Graphene may be present in exfoliated form. Graphene bodies may also be present in sheet form, as particles, as rods, and the like. The compositions may contain graphene bodies of different shapes and sizes. In some embodiments, the compositions contain graphene bodies that are essentially monodisperse.

A graphene body suitably has at least one cross-sectional dimension in the range of from about 0.1 nm to about 100 nm, or from 1 to 10 nm, or even about 5 nm. A cross-sectional dimension is a thickness, a length, a width, a height, a diameter, and the like. Graphene bodies—e.g., platelets—suitably have a thickness in the range of from about 3 nm to about 10 nm.

A graphene body also suitably has an aspect ratio in the range of from about 5,000 to about 20,000. The aspect ratio is defined as the ratio of the body's length (i.e., the body's longest axis) to the body's thickness (shortest axis). In some embodiments, the aspect ratio is less than 5,000, e.g., 2,000, 1,000, 500, 200, 100, 50, 10, 5, or even about 1.

In some embodiments, a graphene body includes at least one functional group. Suitable functional groups include hydroxyl, epoxy, carboxyl and carbonyl, and the like. Nitrogen-containing functional groups are also suitable; carboxyl groups are considered especially suitable.

The compositions may also include additional materials. Organic molecules (e.g., solvents) having molecular weight smaller than about 1000 Daltons are suitable. Such solvents may include any of dimethylacetamide, tetrahydrofuran, and methyl ethyl ketone. Mixtures of solvents or co-solvents are also suitable for the claimed invention.

Graphene bodies are suitably distributed essentially uniformly within the composition, although absolute uniformity is not necessary. A given article may include regions having different distributions of graphene bodies. As described elsewhere herein, the inclusion of the graphene bodies effects an improvement in at least one of ultimate tensile strength, tensile modulus, critical stress intensity factor, or critical strain energy release rate relative to resin that is essentially free of graphene bodies. Additional detail on this point is provided elsewhere herein.

The claimed invention also provides methods for forming graphene-containing resins. These methods include dispersing a population of graphene bodies in a resin so as to form a precursor mixture, the graphene bodies being dispersed in a first solvent; and curing the precursor mixture.

Graphene bodies are suitably dispersed in the first solvent by physical mixing, by sonication, and the like. The first solvent suitably includes dimethylacetamide, tetrahydrofuran, and the like. Volatile polar protic solvents such as formic acid, methanol, ethanol, n-propanol, isopropanol, n-butanol, acetic acid are suitable, as is water. Aprotic solvents such as acetone, tetrahydrofuran (THF), dichloromethane (DCM), dimethylformamide (DMF), dimethylsulfoxide (DMSO), dimethylacetamide (DMAC), ethyl acetate, n-methylpyrrolidone (NMP) and non-polar solvents such as toluene, hexane, 1,4-dioxane, diethylether and chloroform are also suitable for the claimed methods. Dimethylacetamide is considered an especially suitable solvent.

The first solvent suitably represents from about 0.10% to about 10.0% of the weight of the precursor mixture; about 2.5 wt % is considered especially suitable. The first solvent may represent from about 1% to about 3% of the weight of the precursor.

In some embodiments, the methods further include contacting the graphene bodies, the resin, or both, with a second solvent. The second solvent is suitably methyl ethyl ketone. Other suitable second solvents include diaryl and dialkyl peroxides, ketone peroxides (such as methyl ethyl ketone peroxide), peresters, diacylperoxides, hydroperoxides (such as cumene hydroperoxide), and the like. The second solvent suitably represents from about 0.5% to about 5.0% of the weight of the precursor mixture. The second solvent is suitably present at about 0.75 wt % of the precursor mixture.

Graphene bodies suitably represent about 0.001% to about 0.5% of the weight of the precursor mixture, or even about 0.002 wt % of the mixture. A particularly suitable combination is using DMAC solvent at about 2.5% with graphene bodies present at about 0.002 wt % together with a vinylester resin to produce nanocomposites.

The curing step is suitably performed in a mold. Curing may be accomplished by thermal curing, radiation curing, thermosetting curing, crystallization, glassification, solvent removal, and the like.

Illustrative Embodiments

Vinylesters

Illustrative, non-limiting embodiments of vinylester compositions according to the present disclosure are described herein. Characterization of the vinyl ester nanoresins was performed employing tensile testing and fracture toughness testing employing the single-edge-notched-bend (SENB) tests. Tensile properties such as ultimate tensile strength, strain-to-failure, and elastic modulus were measured employing the ASTM D638 standard test method, while the fracture toughness properties, such as strain energy release rate, was calculated employing the ASTM D5045 standard. In most cases, five specimens were tested using an Instron universal testing machine type 4200. To demonstrate percentages of the mechanical properties improvements tests were performed on the pristine vinyl ester as well as its nanoresin and hybrid nanoresin counterparts. Results demonstrated significant improvements in the ultimate tensile strength and strain-to-failure, while improving the toughness as well.

Specimen Dimensions

Vinyl ester resin system Hsydrex 100 (33350) Reichhold and catalyst MEK peroxide hardener were used as the base pristine material. All the specimens were cut from a larger square plate with overall dimensions of 20×20 cm with an average thickness of about 3.0 mm To characterize the mechanical properties of the proposed hybrid vinyl ester nanoresins, two different mechanical testing were performed. 1) tensile tests for the determination of the ultimate tensile strength, strain-to-failure, and elastic Young's modulus; and 2) single-edge-notched-bending (SENB) tests for the determination of strain energy release rate ($G_{IC}$).

Figure 69:
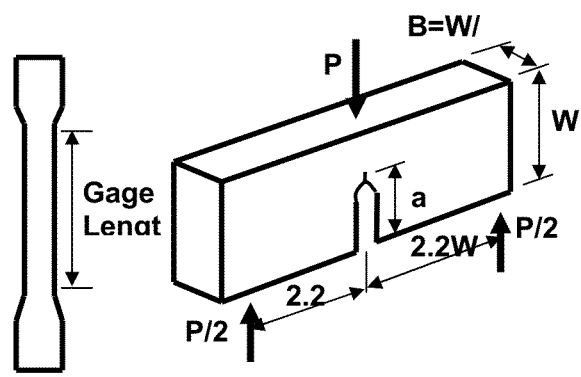
FIG. 69 illustrates the schematics of test samples a) Dog bone tensile test, and b) SENB sample.

Tensile specimens were prepared in form of dog-bone shapes in accordance with the ASTM D 638-03 standards shown in FIG. 69a, with overall gage length of 25.4 mm, average width of 8.0 mm, and average thickness of about 3.0 mm. Tensile properties such as strength, strain-to-failure, and elastic modulus were measured from the recorded stress-strain diagram. Strain was measured using an extensometer having gage length of 25.0 mm that was attached to the thickness side of the specimen. An Instron universal testing machine was used where cross-head speed was set at a constant rate of 1.0 mm/min.

Fracture toughness test specimens followed ASTM D5045 standards with a nominal span length (L) of 56 mm, width (W) of about 12.8 mm, an average thickness (B) of about 3.2 mm, and ratio of width to thickness (W/B) of about 4.0. An artificial notch about 6 mm long and about 1.5 mm wide was cut in the middle of the span along the specimen width using a milling cutter machine. Subsequently, a natural crack was formed by inserting a sharp razor blade and moving it back and forth was initiated as (see FIG. 69b). All SENB specimens were followed the ASTM D 5045-99 standard procedures of crack length (a) to specimen width ratio (a/W) of approximately 0.5 to validate the SENB tests. Once again, an Instron universal testing machine equipped with necessary fixtures was used to perform SENB tests.

For the SENB tests, the Instron cross-head speed was set at the constant rate of 0.25 mm/min. Reported values for the strain energy release rate ($G_{IC}$) are in accordance with the ASTM formulas and based on an average of at least five test specimens. For each SENB test, the applied load versus loading-point displacement was recorded. Strain energy release rate was calculated in correspondence to the total energy required to cause failure due to the presence of an artificial sharp crack. Fracture toughness was calculated as a measure of the material resistance to failure in the presence of a sharp induced crack.

Nano-Manufacturing

Nano-Manufacturing of Dimethylacetamide

Manufacturing of VE-DMAC nanoresin included preparation of VE-DMAC solution nanoresin, then applying MEK peroxide as the hardener agent, followed by room temperature curing. In the studied embodiments, the DMAC solvent weight percentage was kept constant at 2.5% of the total vinyl ester weight, which was mixed with Part A of resin at room temperature employing very slow manual stirring for about 15 minutes. A glass rod was used as the mixing device to minimize micro bubbles formation during the stirring. DMAC solvent lowered the vinyl ester resin viscosity.

A glass rod was placed vertically inside the mixture at the center and stirred manually in clockwise and counterclockwise directions at fifty strokes, repeated 8 times. The mixture was degassed, e.g., for about 10 minutes using a sonication machine to remove bubbles that formed during the manual stirring. Catalyst MEK peroxide was then added to this homogeneous solution. The solution was mixed well with manual stirring for about 10 minutes. This mixture was poured into a polished aluminum mold and kept in a closed container and was allowed to cure at room temperature.

Sonication and Dispersion of Graphene Nanosheets

This section describes an exemplary mixing technique for dispersing nanomaterial such as different type of graphenes, produced under different conditions, with vinyl ester resin using a sonication machine followed by a hot plate magnetic stirrer. Exemplary steps are as follows:

Step 1: dispersing graphene within a proper solvent, in this case DMAC solution. Step 2: uniform dispersion of Graphene-Dimethylacetamide solution into the vinyl ester, the user may minimize formation of micro bubbles during the mixing process (i.e., Nano-Manufacturing). Step 3: employing the catalyst MEK peroxide and its proper mixing to ensure a suitable (e.g., uniform) distribution with the generation of little to no micro bubbles.

The DMAC solution was used as a medium to uniformly disperse the required amount of the GNSs. GNSs and DMAC solution were mixed initially using a sonication machine for almost two days while the water temperature was set at about 30° c. In this hybridization study, DMAC solvent with a weight fraction of 2.5% and GNSs in the fixed weight fraction of 0.002% of the vinyl ester resin were employed. At the final step GNS-DMAC mixture solution was added to the vinyl ester resin which followed by a slow manual stirring for about 15 minutes.

To achieve homogeneous mixing of the GNSs within the resin system, one may hold the vessel at about 45-degree angle and use a glass rod as a mixing device. The user may stir in a clockwise direction for about fifty times and then repeat the process additional times. To eliminate bubbles formed during mixing, one may degas the mixture for about 10 minutes using a sonication machine.

The user suitably adds catalyst MEK peroxide to this well dispersed mixture. Mixing of Part A and Part B continues with manual stirring for another 10 minutes (e.g., a total of 8 fifty times sequence of clockwise (i.e., 4 times) and counterclockwise rotations (i.e., 4 times) as explained before). After mixing, the mixture was poured into a well polished aluminum mold and kept in a closed container and let it cure at room temperature.

Specimen Name Description

For these samples, the first two letters "VE" signify vinyl ester from Fiber Glass Hawaii. The label on the container identified this resin system as 100% vinyl ester resin Hydrex 100 (33350) Reichhold having a room temperature cure cycle. The first word after "VE" identifies the solvent solution, in this case DMAC. The first number after DMAC refers to the number of plates manufactured while the following number is indicative of the weight percentage of that solvent used (e.g., 2.5 is equivalent to 2.5% by weight of DMAC solvent used).

In this study, the weight percentage of DMAC was kept fixed at 2.5% for all the cases considered. The last remaining letters designated the different type of GNSs used (e.g., RGNS-I=GIF, RGNS-II=GII, and GNS-III=GIII, described below). The remaining numbers after letter G indicate the weight percentage of the GNSs utilized (e.g., 002 is equivalent to 0.002% by weight of GNSs used).

Three Different Types of Graphene Nanosheets (GNSs)

GNSs' mechanical properties (i.e., tensile strength, strain-to-failure, and elastic modulus) elevate load transferring mechanism from the matrix, in this case vinyl ester, to the fiber. Homogeneous dispersion of GNSs within the vinyl ester is useful.

This section focuses on a process utilizing three different types of GNSs, using DMAC as the solvent solution to enhance vinyl ester mechanical properties. For the cases considered, GNS's weight percentage was kept fixed at 0.002% and the DMAC weight percentage was kept fixed at 2.5%. For the sake of comparison, pristine vinyl ester resin and VE-DMAC solution nanoresin were also manufactured.

These illustrative embodiments used hybrid VE-DMAC GNS nanoresin plates employing three different types of GNSs as designated by RGNSI=GIF, RGNSII=GII, GNSIII=GIII, respectively. The GIF is in form of a film, and GII and GIII are in form of solid "particles" to begin with. Visual inspection of all plates revealed smooth surfaces and presence of no bubbles.

GNSs Experimental Results

Figure 70:
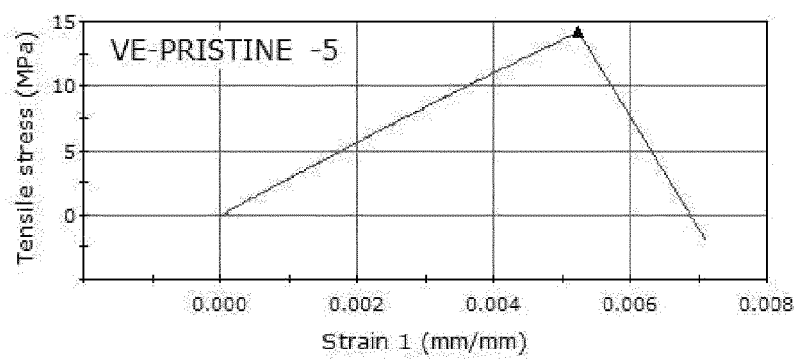
FIG. 70 illustrates an exemplary stress-strain plot a) Vinyl ester pristine, and b) Hybrid VE-DMAC-GIF nanoresin plate.
Figure 70:
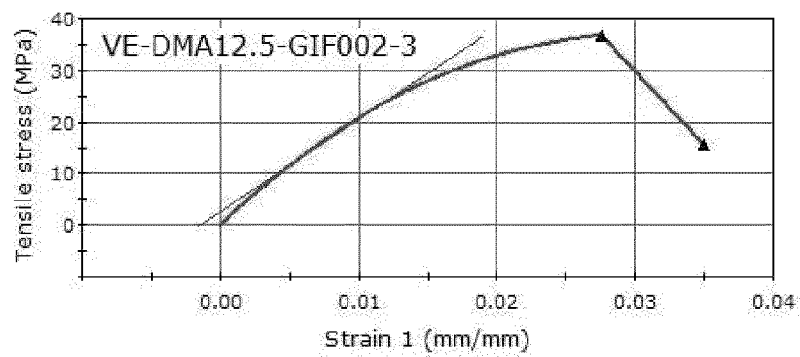

Tensile loading experimental results of five nanoresins; namely, vinyl ester pristine, VE-DMAC nanoresin, and three hybride VE-DMAC-GNS nanoresins cured at room temperature are discussed herein. Stress-strain plots of pristine vinyl ester resin demonstrated a linear curve up to the breaking stress, and showed that all the samples failed in a brittle fashion since the fracture surfaces were smooth and normal to the load direction (see FIG. 70a). The hybrid specimens with different types of GNS inclusions demonstrated nonlinear behavior up to the breaking stress with slightly rougher fracture surfaces. A exemplary stress-strain curve associated with the hybrid VE-DMAC-GIF is shown in FIG. 70b. All the hybrid specimens demonstrated much higher ultimate tensile strength and strain-to-failure in comparison to the vinyl ester pristine.

Figure 71:
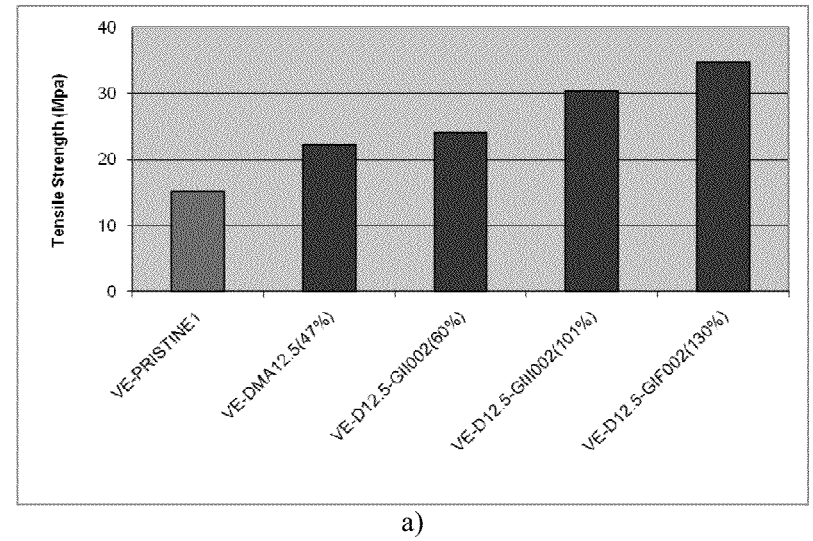
FIG. 71 illustrates a comparison of tensile properties of hybrid VE-DMAC GNSs with pristine and VE-DMAC nanoresins: a) Ultimate tensile strength b) Strain-to-failure, and c) Elastic Modulus.
Figure 71:
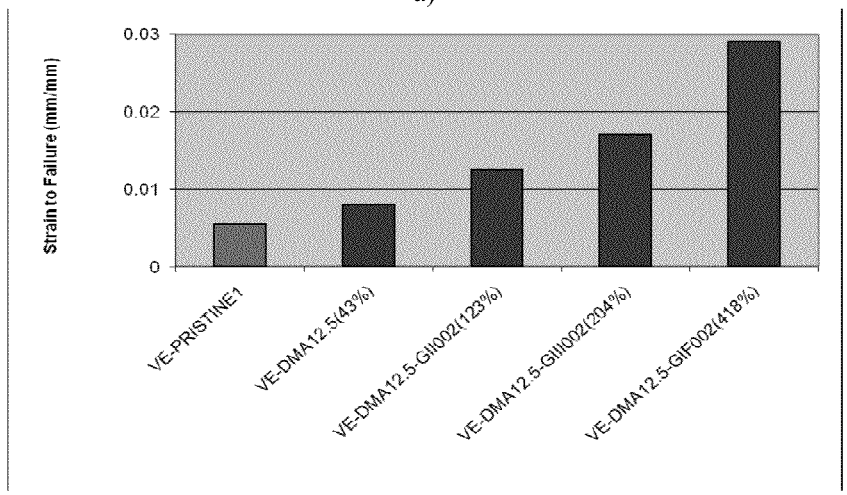
Figure 71:
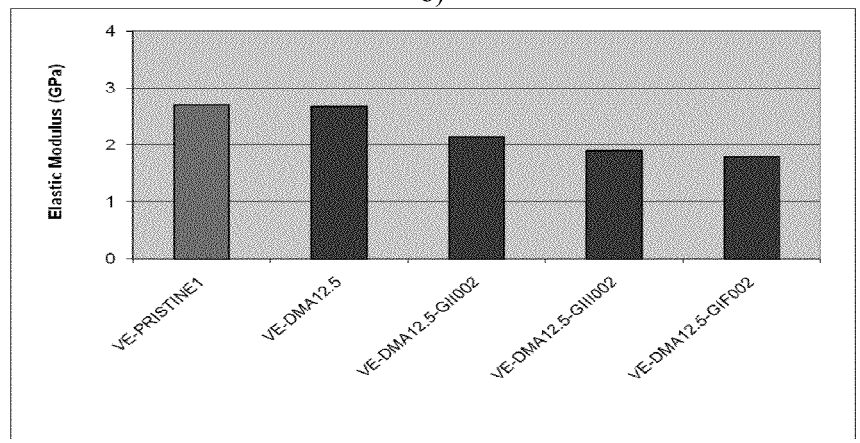

FIGS. 71a and 71b show the comparison of ultimate tensile strength and strain-to-failure, respectively, of all three hybrid VE-DMAC-GNS with VE-DMAC nanoresin and vinyl ester pristine base plate. Results demonstrate that a high tensile strength as well as a high strain-to-failure was associated with the hybrid vinyl ester case of DMAC-RGNSI=GIF type. For the RGNSI=GIF hybridization, the enhancement in ultimate tensile strength is about 130% and the enhancement in strain-to-failure is about 418%. For the GNSIII=GIII hybridization, the enhancement in ultimate tensile strength is about 101% and the enhancement in strain-to-failure is about 204%. Other hybrid cases also demonstrated significant improvement. Elastic modulus reduced in all cases.

Figure 72:
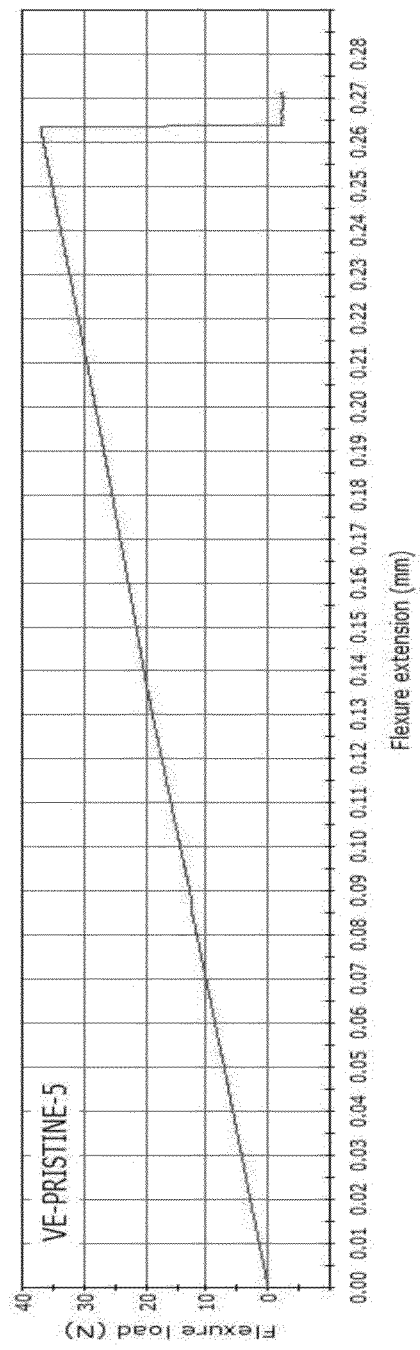
FIG. 72 illustrates load vs. displacement for a) Vinyl ester-pristine b) vinyl ester-DMAC nanoresin.
Figure 72B:
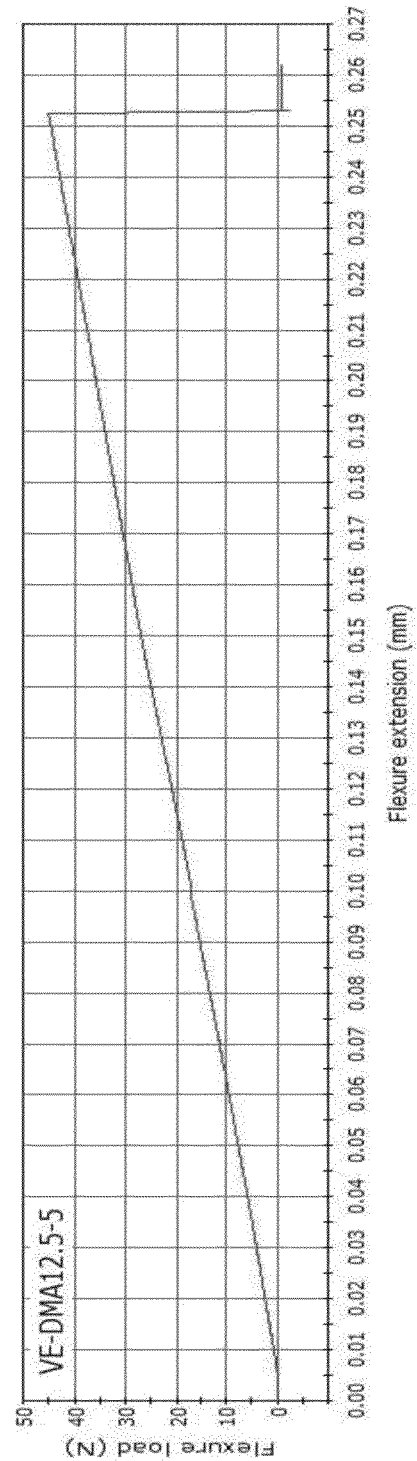

Fracture toughness is the material resistance to crack initiation, which requires an energy that is proportional to the area under the load versus load-point displacement curve (see FIG. 72). FIG. 72a shows an exemplary load vs. load-point displacement for vinyl ester pristine resin, while FIG. 72b shows a similar plot for the VE-DMAC nanoresin with DMAC solvent at 2.5%. Similar load vs. load-point displacement curves were obtained for the remaining three hybrid VE with DMAC at 2.5% and GNSs at 0.002%. All the load vs. load-point displacement curves demonstrated linear behavior up to the breaking point. For all the cases, the cross head travel rate was maintained at 0.25 mm/min.

Figure 73:
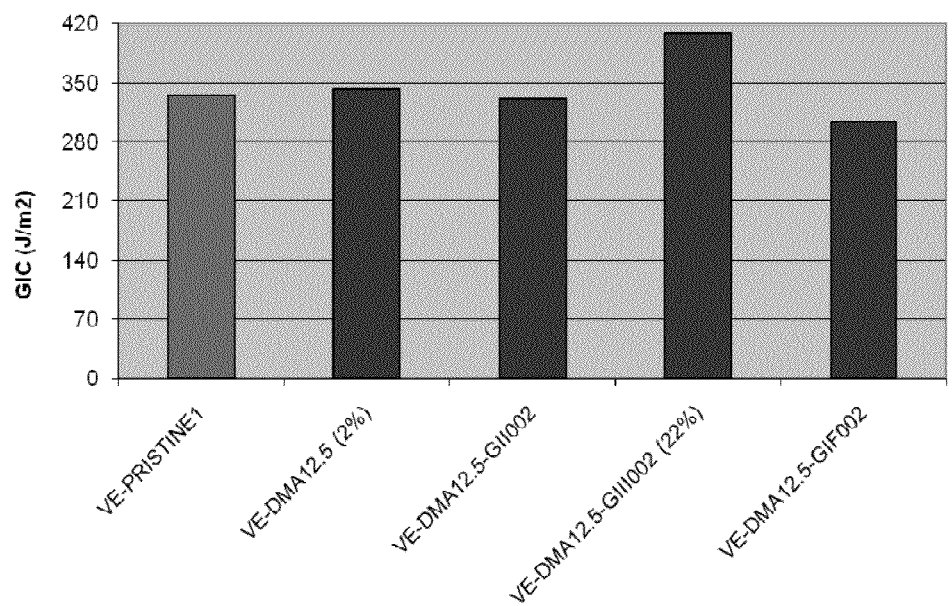
FIG. 73 illustrates a comparison of $G_{IC}$ between VE-PRISTINE, VE-DM, and three hybrid VE-DM-GNS nanoresins.

Comparison of the fracture toughness test results are shown in FIG. 73, where $G_{IC}$s are displayed vs. vinyl ester pristine, VE-DMAC nanoresin, and the three hybrid VE-DMAC-GNS nanoresins with different GNS types but having the same weight percentages of 0.002%. The plot demonstrate that the highest $G_{IC}$ was obtained for the hybrid VE-DMAC-GNSIII=GIII. The enhancement in $G_1$ at 0.002% GNSIII is about 22% as indicated within the parentheses. The ultimate tensile strength for this hybrid vinyl ester improved by about 101% in comparison to the vinyl ester pristine (see FIG. 71a).

The table below shows the comparison between the ultimate tensile strength, strain to failure, elastic modulus, and fracture toughness for the vinyl ester pristine, VE-DMAC nanoresin, and the three different hybrid VE-DMAC-GNS nanoresin materials. Ultimate tensile strength increased by about 130%, strain to failure improved by about 418%, elastic modulus decreased up to 33%, and fracture toughness remained more or less unchanged in the case of hybrid VE-DMAC-RGNSI=GIF nanoresin. The percentage of enhancements are listed next to the actual values inside the parenthesis. All the cases under consideration were shown significant improvement in terms of ultimate tensile strength as well as strain-to-failure, also with improvements for fracture toughness.

The following (Table 17) is a comparison of VE-pristine with VE-DMAC and the three hybrid VE-DMAC-GNS nanoresins:

| Name | Strength (MPa) | Strain (mm/mm) | E (GPa) | $G_{IC}$ (J/M2) |
|---|---|---|---|---|
| VE-PRISTINE | 15.1 | 0.0056 | 2.7 | 335 |
| VE-DMA12.5 | 22.2 (47%) | 0.008 (43%) | 2.68 | 343 (2%) |

-continued

| Name | Strength (MPa) | Strain (mm/mm) | E (GPa) | $G_{IC}$ (J/M2) |
|---|---|---|---|---|
| VE-DMA12.5-GII002 | 24.1 (60%) | 0.0125 (123%) | 2.14 | 331 |
| VE-DMA12.5-GIII002 | 30.4 (101%) | 0.017 (204%) | 1.9 | 408 (22%) |
| VE-DMA12.5-GIF002 | 34.7 (130%) | 0.029 (418%) | 1.8 | 304 |

SUMMARY

Vinylester Resins

To improve vinyl ester mechanical properties with major focus on the enhancement of the Ultimate Tensile Strength, while improving fracture toughness, four different enhancement agents; namely, DMAC and three different types of Graphene Nanosheets (GNSs) were employed. First vinyl ester nanoresin plate was made of dimethylacetamide solvent while the remaining three hybrid nanoresin plates were manufactured from the combination of dimethylacetamide solution with three different types of GNSs. Vinyl ester-DMAC as well as the hybrid vinyl ester-DMAC-GNS nanoresin enhanced mechanical properties as measured in form of ultimate tensile strength, strain to failure, elastic modulus, and fracture toughness.

Hybrid vinyl ester-DMAC-GIF graphene nanoresin showed the highest ultimate tensile strength of about 130% and the highest strain-to-failure of about 418% in their hybrid family. Hybrid vinyl ester-DMAC-GIII graphene nanoresin showed to have the highest fracture toughness improvement of about 22% in their hybrid family while simultaneously its ultimate tensile strength increased by about 101% and its strain-to-failure improved by about 204%.

The remaining vinyl ester hybrid nanoresins also demonstrated significant enhancements in ultimate tensile strength and strain-to-failure. The elastic modulus decreased slightly for all the cases and the largest dropped was associated with the hybrid vinyl ester cases. Elastic modulus decreased significantly by about 33% for the hybrid case of the highest ultimate tensile strength (by 130%), i.e., hybrid vinyl ester-DMAC-GIF graphene nanoresin, and was the only case that the fracture toughness dropped by about 10%. In one embodiment, the strength improved by 110% and fracture toughness improved by 22%, i.e., hybrid vinyl ester-DMAC-GIII graphene nanoresin.

Illustrative Embodiments

Polyesters

Described here are illustrative enhancements of mechanical properties of an orthophthalic laminating polyester (i.e., PE) resin to improve primarily the Ultimate Tensile Strength and Fracture Toughness simultaneously by combining this matrix with two other constituents either individually or combined (which may act as a hybrid reinforcing agents). To achieve this goal two different families of reinforcing agents were considered: 1) Graphene Nanosheets (GNSs) type GNSIII (i.e., GIII), only, employing ethanol as the solvent, and 2) Two different hybridizing reinforcing agents employing two different types of GNSs designated as GNSIII=GIII and RGNSI=GIF, individually combined with Dimethylacetamide (i.e., DMAc) as the solvent. The PE-GIII resin system is referred to as "Nanoresin" while the combination of PE-DMAc-GNS is referred to as "Hybrid Nanoresin".

Reinforcing constituents such as DMAc and GNSs (or their combinations) can provide properties enhancements in form of ultimate tensile strength, strain-to-failure, elastic modulus, and fracture toughness when proper optimizations are performed. There are three primary parameters that contribute to achieving such extraordinary properties: 1) Selection of Nanomaterials, 2) Nanomanufacturing, and 3) Nanoprocessing.

Characterization of the polyester nanoresin properties have been performed through tensile and fracture toughness (single-edge-notch-bend tests, i.e., SENB) testing. Tensile properties such as ultimate tensile strength, strain-to-failure, and elastic modulus were measured in accordance to the ASTM standard D638 while, fracture properties such as strain energy release rate was calculated in accordance to the ASTM standard D5045. In general, a minimum of five specimens were tested using Instron universal testing machine type 4200. To demonstrate percentages of the mechanical improvements, tests were performed on the pristine polyester, as well. Results demonstrated simultaneous improvements in the ultimate tensile strength, strain-to-failure, and fracture toughness.

Specimen Dimensions

Figure 74:
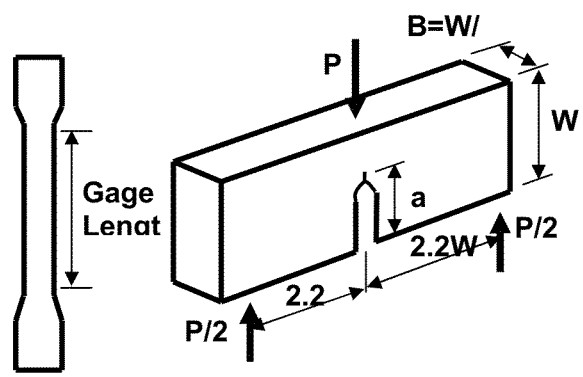
FIG. 74 illustrates schematics of test samples a) Dog bone tensile sample, and b) SENB sample.

Orthophthalic laminating polyester resin and catalyst methyl ethyl ketone peroxide (i.e., MEKP) hardener were used as the base polyester-pristine material. All specimens were cut from a larger square plate with overall dimensions of 20×20 cm with an average thickness of about 3.0 mm. To characterize the mechanical properties of the proposed polyester nanoresins two different mechanical testing were performed: 1) tensile tests to determine the ultimate tensile strength, strain-to-failure, and elastic Young's modulus, 2) single-edge-notch-bending (SENB) tests to determine the strain energy release rate (i.e., $G_{IC}$). Tensile specimens were prepared in form of dog bone shapes and in accordance with the ASTM D 638-03 standards (see FIG. 74a) with overall gage length of 25.4 mm, average width of 8.0 mm, and average thickness of about 3.0 mm. Tensile properties such as strength, strain-to-failure, and elastic modulus were measured from the recorded stress-strain diagrams. Strain was measured using an extensometer having gage length of 25.0 mm that was attached to the thickness side of the specimen. Instron universal testing machine was used where cross-head speed was set at constant rate of 1.0 mm/min. Fracture test specimens followed ASTM standards with a nominal span length (L) of 56 mm, width (W) of about 12.8 mm, an average thickness (B) of about 3.2 mm, and ratio of width to thickness (W/B) of about 4.0. An artificial notch about 6 mm long and about 1.5 mm wide was cut in the middle of the span along the specimen width using a milling cutter machine. Subsequently, a natural crack by inserting a sharp razor blade and moving it back and forth was initiated (see FIG. 74b). All the SENB specimens were followed the ASTM D 5045-99 standard procedures of crack length (a) to specimen width ration (a/W) of approximately 0.5 to validate the SENB tests.

Once again, Instron universal testing machine equipped with necessary fixtures was used to perform SEND tests. For SENB tests, the Instron cross-head speed was set at the constant rate of 0.25 mm/min. The reported values for the strain energy release rate ($G_{IC}$) are in accordance with the ASTM formulas and based on the average of at least five test specimens. For each SENB test, the applied load versus loading-point displacement was recorded. For the results to be considered valid, the size criteria was satisfied. Strain energy release rate was calculated in correspondence to the total energy required to cause failure due to the presence of an artificial sharp crack. Fracture toughness was calculated as a measure of the material resistance to failure in the presence of a sharp induced crack.

Nano-Manufacturing

Sonication and Dispersion of GNSs

This section describes a technique for dispersing nanomaterials, in this case different types of graphenes designated as GIII and GIF utilizing two different sonication machines. In general, manufacturing of our nanoresins follow three steps.

Step one, dispersing the GNS within the DMAC solvent for the case of hybrid and employing ethanol as solvent for the case of nanoresin. Step two, uniform and homogeneous dispersion of Graphene-DMAc or the Graphene-ethanol mixture into the polyester and the steps to minimize the amount of micro bubbles formation and the evaporation of the unwanted solvent such as ethanol (i.e., Nano-Manufacturing). Step three, employing the catalyst MEKP and the proper mixing to ensure uniform distribution and dispersion; and also, not to generate any micro bubbles.

Dispersion of nanomaterials within the polyester resin can be challenging. Bubbles may form as polyester resin is poured from a larger container into a smaller cup. The samples were accordingly vacuumed for at least 20 minutes.

DMAc solution was used as a proper medium not only to uniformly disperse the required amount of the graphene but also as an enhancing agent. GNSs were dispersed within the DMAc solution utilizing two different sonication methods, i.e., the tip sonicator as well as the bath sonication machines. The tip or localized sonication machine was employed four times at equal intervals with time durations of five minutes while the amplitude was set at 25. The hot water bath sonicator was used continuously for the remaining of the 12 hours sonication process when the water temperature was set at 30 C. For all the hybridization cases, DMAc weight fraction was set fixed at 2.5% while GIII graphene weight fractions were set fixed at 0.002% and 0.02%, respectively. GIF graphene weight fraction was set at 0.002% only. For the polyester nanoresin case, Ethanol at 1 gram was added to the GIII at weight fraction of 0.002% and employing the same sonication technique. At the second step, Graphene-DMAc mixture was added to the required amount of the polyester resin which followed by a slow manual stirring for about 15 minutes. To achieve homogeneous mixing of the graphene-DMAc within the resin system hold your cup at about 45 degree angle and use a glass rod as a mixing device. One may stir in a clockwise direction for about fifty times with no shear mixing and repeat the process at least 8 times, as the next fifty stirrings are performed in counter clockwise direction. Shearing the mixture between the glass rod and the wall of the cup can produce bubbles. In the case of graphene-ethanol, this mixture was poured on the top of the polyester already within the sample cup. Ethanol solvent was evaporated using cold air blow technique accompanied very slow manual center spin mixing. Ethanol was evaporated fully as the weight of the mixture was monitored.

One may then add the catalyst MEKP to this well dispersed mixture. Mixing of Part A and Part B must continue with very slow manual stirring for another extra 10 minutes employing the eight sequences of the fifty times rotations of clockwise (i.e., 4 times) and counterclockwise (i.e., 4 times) as explained earlier. After mixing, the mixture was poured into a well polished aluminum mold and cured for 2 Hours at 140 F.

Specimen Name Description

The first two letters "PE" stand for PolyEster which was purchased from Fiber Glass Hawaii. Labels on the container identified this resin system as a orthophthalic laminating polyester resin. In general, the first word after "PE" identifies the solvent type in this case DMAc solution as a enhancing agent. If the solvent name has not been identified, ethanol has been used as the solvent but has been evaporated from the mixture. First number after DMAc refers to the number of plates manufactured, and the following numbers are indicative of the weight percentage of that solvent (i.e., for example 2.5 is equivalent to 2.5% by weight of DMAc solution used). It is important to note that in this hybridization study the weight percentage of DMAc was kept fixed at 2.5% for all the cases considered. The last letters designate the different type of GNS such as GIII or GIF. The remaining numbers after letter G are indicative of the weight percentage of the different type of GNS used (i.e., for example 002 is equivalent to 0.002%).

Two Different Types of GNSs

Graphene Nanosheets (i.e., GNSs) have been used as reinforcing inclusions with the matrix system to improve variety of mechanical properties. The GNSs' mechanical properties (i.e., Tensile strength, strain-to-failure, and the elastic modulus) can elevate load transferring mechanism from the matrix, in this case polyester, to the fiber. Improper dispersion of GNSs can cause agglomeration which eventually degrades certain mechanical properties.

This section focuses on the hybridization process utilizing two different types of graphenes (i.e., GNSIII-GIII at two different weight percentages and RGNSI=GIF at one weight percentage) employing DMAc solution as the solvent to enhance polyester mechanical properties. The polyester-GIII graphene nanoresin, where the graphene weight percentage was kept fixed at 0.002% and ethanol was used as the solvent which was fully evaporated before mixing. The hybrid polyester-DMAc with GIII and GIF employed GIII with different weight percentages fixed at 0.002% and 0.02%, and GIF at 0.002% only with DMAc weight percentage fixed at 2.5%. For the sake of comparison, pristine polyester resin was also manufactured.

Stress-Strain Experimental Results

Figure 75:
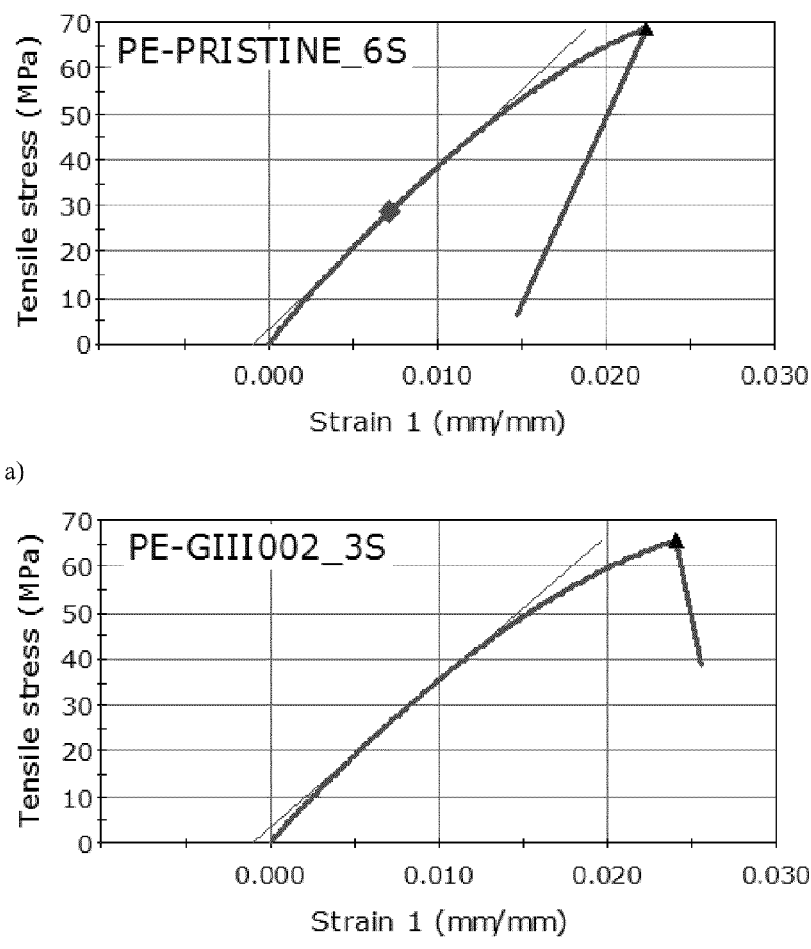
FIG. 75 illustrates exemplary stress-strain curve a) polyester-pristine, and b) polyester-GIII002 nanresin.

Tensile Stress-Strain experimental plots of five polyester nanoresin and hybrid cases; namely, polyester-pristine, PE-GIII nanoresin, and three hybride PE-DMAc with two different types of Graphenes cured for 2 hours at 140 F are discussed below. Stress-strain plot of pristine polyester resin demonstrated almost non-linear behavior up to the breaking stress with failure in a brittle fashion since the fracture surfaces were smooth and normal to the load direction (see FIG. 75a). The polyester nanoresin specimens with only type GIII graphene inclusions also demonstrated similar non-linear behavior as polyester pristine up to the breaking stress with more or less identical fracture surfaces. A exemplary stress strain curve associated with the nanoresin PE-GIII is shown in FIG. 75b. This polyester-GIII nanoresin with GIII graphene at 0.002% and employing Ethanol as solvent demonstrated the highest enhancement in ultimate tensile strength at about 11% improvement. The remaining hybrid specimens demonstrated similar stress-strain curves, with less improvement in strength than this polyester nanoresin.

Figure 76:
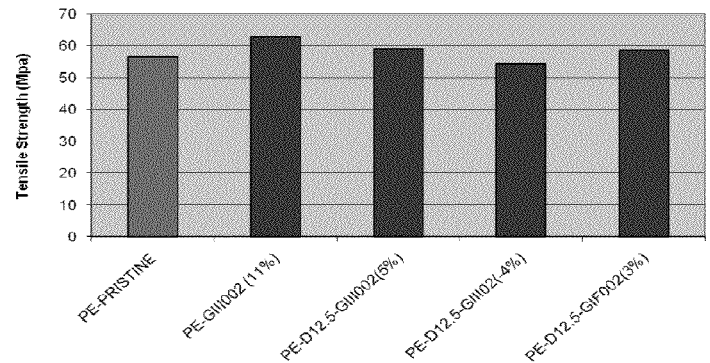
FIG. 76 illustrates a comparison of tensile properties between polyester-pristine, polyester-nanoresin, and polyester-hybrid: a) Ultimate tensile strength, b) Strain-to-failure, and c) Elastic Modulus.
Figure 76:
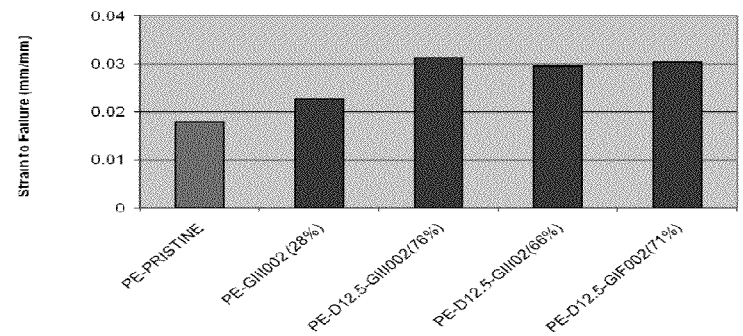
Figure 76:
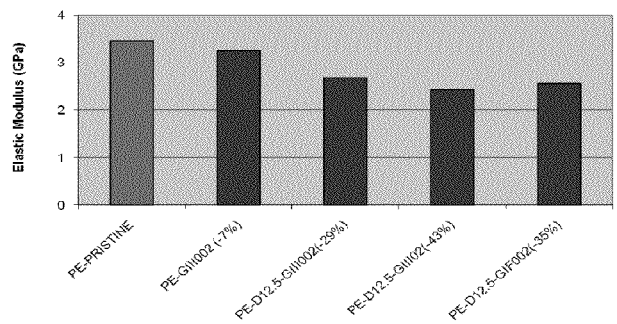

FIGS. 76a and 76b show the comparison of ultimate tensile strength and strain-to-failure, respectively, for the polyester pristine base plate, PE-GIII nanoresin, and the three hybrid PE-DMAc-Graphene. Results demonstrated that the highest ultimate tensile strength is associated with the polyester-GIII at 0.002% concentration nanoresin with about 11% improvement. The hybrid polyester-DMAc with GIII and GIF at 0.002% concentration demonstrated slight strength improvement in the range of 5% and 3%, respectively. The hybrid sample with GIII at 0.02% degraded the ultimate tensile strength by 4% (see FIG. 76a). The highest strain-to-failure is associated with the two hybrid cases of GIII and GIF at 0.002% concentration with 76% and 71% improvement, respectively. Strain-to-failure was enhanced for other cases as well (see FIG. 76b). Elastic modulus dropped in all cases from low to higher, and the largest decline was associated with the hybrid case of GIII at 0.02% concentration at 43% (see FIG. 76c).

Load-Deflection Experimental Results

Figure 77A:
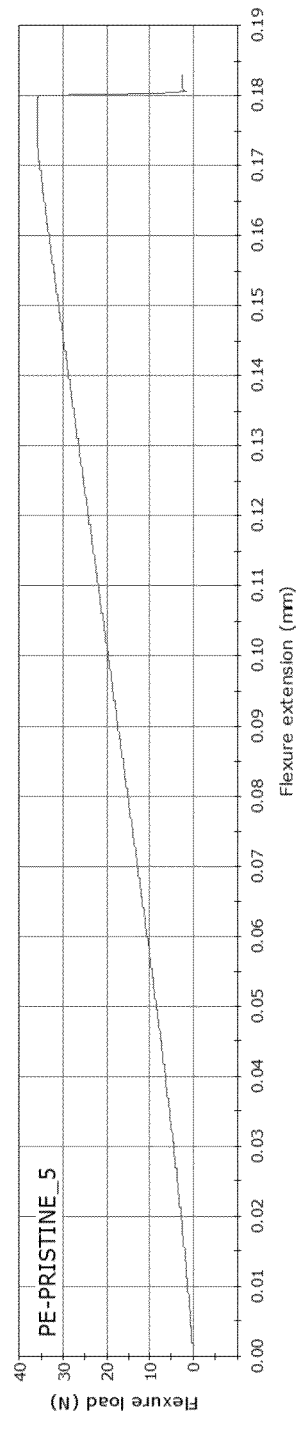
FIG. 77 illustrates Load-Displacement for a) Pristine, b) polyester-GIII nanoresin, c) polyester-DMAc-GIF hybrid.
Figure 77B:
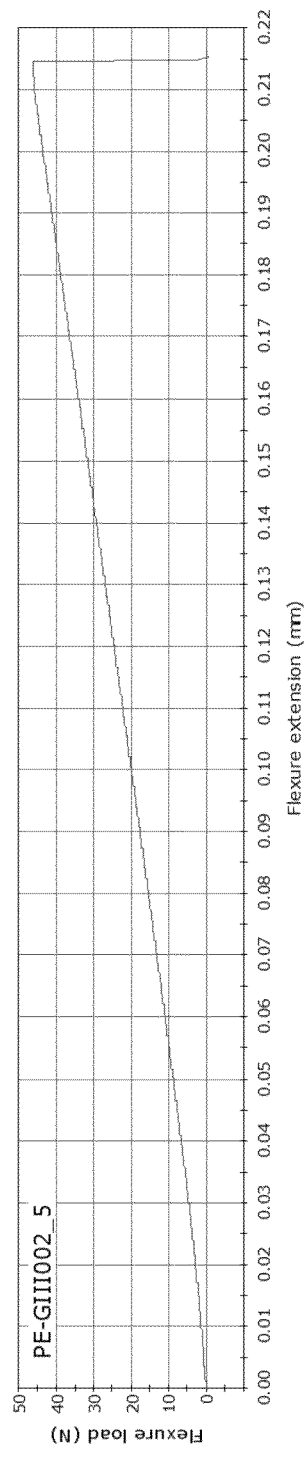
Figure 77C:
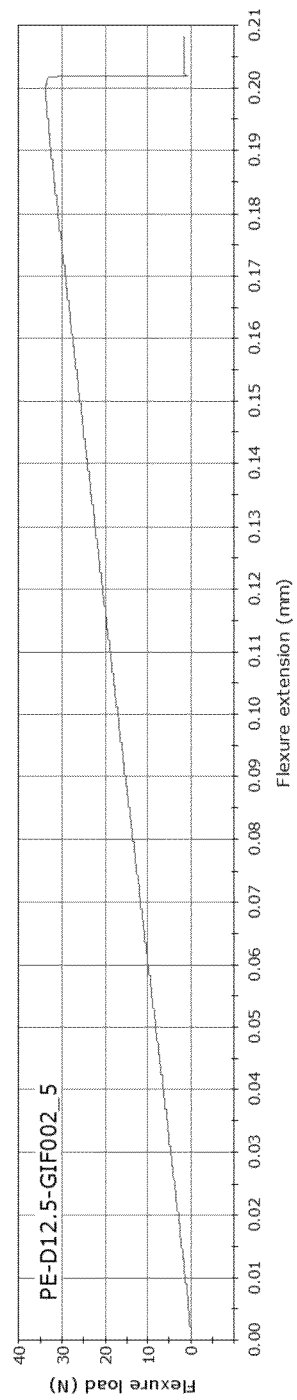

Fracture toughness or material resistance to crack initiation requires energy which is related to the area under the load versus load-point displacement curve (see FIG. 77). FIG. 77a shows a exemplary load vs. load-point displacement for the pristine polyester resin system, while FIGS. 77b and 77c show similar plots for the PE-GIII nanoresin and PE-DMAc-GIF hybrid case. Similar load vs. load-point displacement curves were obtained for the other remaining cases. All load vs. load-point displacement curves demonstrated linear behavior up to the breaking point. The cross head travel rate was maintained at 0.25 mm/min for all cases.

Figure 78:
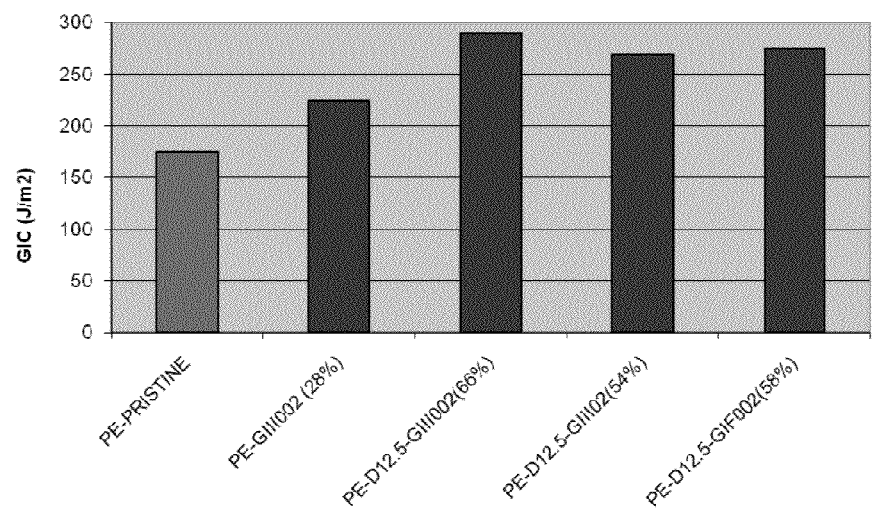
FIG. 78 illustrates a comparison of $G_{IC}$ between PE-PRISTINE, PE-GIII, and three hybrid PE-DMAc-Graphene.

Comparison of the fracture toughness test results are shown in FIG. 78, where $G_{IC}$s are displayed vs. pristine polyester, PE-GIII nanoresin, and the three hybrid PE-DMAc-Graphenes. This comparison plot demonstrates that the highest $G_{IC}$ at 66% improvement was associated with the hybrid PE-DMAc-GIII at 0.002% concentration. As explained earlier for this hybrid case the ultimate tensile strength enhanced by about 5%, strain-to-failure improved by about 76%, and the elastic modulus dropped by about 29%. Other hybrid cases also, demonstrated $G_{IC}$ improvement around 55%. The polyester-GIII nanoresin demonstrated the lowest improvement of all at about 28% (see FIG. 78).

The table below shows the overall comparison between the ultimate tensile strength, strain-to-failure, elastic modulus, and the fracture toughness for the pristine polyester, PE-GIII nanoresin, and the three hybrid PE-DMA-Graphene nanoresin materials. Results indicated simultaneous improvement in the ultimate tensile strength by about 11% and fracture toughness of about 28% for the PE-GIII nanoresin with GIII at 0.002% concentration. For this case, strain-to-failure also increased by about 28% while the elastic modulus dropped slightly by about 7%. The highest improvement in the fracture toughness (about 66%) was associated with the hybrid PE-DMAc-GIII made with 0.002% concentration of unfunctionalized graphene for which the ultimate tensile strength increased by about only 5%. Other cases also demonstrated simultaneous enhancement in the ultimate tensile strength and fracture toughness (see table). Percentages of enhancements are listed next to the actual values inside the parenthesis. All the cases showed significant improvement in terms of strain-to-failure (Table 18):

SUMMARY

To enhance the polyester mechanical properties with focus on the simultaneous improvement of the Ultimate Tensile Strength and the Fracture Toughness two different enhancement agents; namely, two different graphene types (i.e., GNSIII=GIII and RGNSI-GIF) combined with DMAc as solvent as well as agent were employed. First, polyester nanoresin plate was made of GIII graphene employing Ethanol as the solvent and proper medium for the graphene dispersion while the remaining three hybrid polyester plates were manufactured from two different type of graphenes and employing the DMAc as the solvent as well as the agent. It was demonstrated that the PE-GIII nanoresin as well as the hybrid PE-DMAc-Graphenes can enhance mechanical properties in form of ultimate tensile strength, strain-to-failure, and fracture toughness (see Table 1).

Experimental findings demonstrated that the PE-GIII nanoresin showed the highest ultimate tensile strength improvement of about 11% while at the same time the fracture toughness improved by about 28%. On the other hand, hybrid PE-DMAc-GIII at 0.002% concentration showed the highest fracture toughness at about 66% while at the same time the ultimate tensile strength improved by about 5%. The hybrid PE-DMAc-GIF at 0.002% concentration also showed similar results to that of PE-DMAc-GIII with 3% enhancement in ultimate tensile strength and 58% improvement in the fracture toughness. A concentration of GIII at 0.02% concentration degrades the ultimate tensile strength slightly but increases the fracture toughness by about 54%. Elastic modulus decreased from low to high for all the hybrid polyester cases and the smallest drop was associated with the polyester nanoresin of about 7%.

What is claimed:
1. A cured nanocomposite material, comprising:
   a cured resin;
   nanoparticles dispersed throughout the cured nanocomposite material, wherein the weight fraction of nanoparticles is in the range of from about 0.0005 wt % to less than about 0.1 wt % based on total weight of the cured nanocomposite resin; wherein the nanoparticles comprise one or more of the following nanoparticles: SiC, $TiO_2$, $Y_2O_3$, carbon, Au, Ag, Cu, Ge, Pt, Fe, CoPt, PbS, CdS, CdSe, CdTe, ZnO, PbSe, ZnSe, montmorillonite, vermiculite, hectorite, $CaCO_3$, ferric oxide, or any combination thereof; and
   0.1 to 10 wt %, based on total weight of the cured nanocomposite resin one or both of
   (i) polyamic acid and
   (ii) reinforcing solvent, said reinforcing solvent selected from formic acid, methanol, ethanol, n-propanol, isopropanol, n-butanol, acetic acid, water, tetrahydrofuran (THF), dichloromethane (DCM), dimethylformamide (DMF), dimethylsulfoxide (DMSO),

TABLE 18

| Name | Strength (MPa) | Strain (mm/mm) | E (GPa) | $G_{IC}$ (J/M2) |
| --- | --- | --- | --- | --- |
| PE-PRISTINE | 56.51 | 0.0178 | 3.47 | 174.6 |
| PE-GIII002 | 62.75 (11%) | 0.0227 (28%) | 3.25 (−6%) | 224.05 (28%) |
| PE-D12.5-GIII002 | 59.09 (5%) | 0.0313 (76%) | 2.69 (−22%) | 289.64 (66%) |
| PE-D12.5-GIII02 | 54.28 (−4%) | 0.0296 (66%) | 2.43 (−30%) | 268.17 (54%) |
| PE-D12.5-GIF002 | 58.37 (3%) | 0.0304 (71%) | 2.57 (−26%) | 275.34 (58%) | dimethylacetamide (DMAC), ethyl acetate, and n-methylpyrrolidone (NMP).

2. The cured nanocomposite material of claim 1, wherein the cured resin comprises one or more of the following resins: vinyl esters, polyesters, epoxies, polyethylenes, polystyrenes, polypropylenes, or any combination thereof.

3. The cured resin of claim 2, wherein the cured resins comprise one or more of the following resins: vinyl esters, polyesters, epoxies.

4. The cured nanocomposite of claim 1, wherein the nanoparticles comprise SiC, $TiO_2$, $Y_2O_3$, carbon, or any combination thereof.

5. The cured nanocomposite of claim 1, wherein the carbon comprises functionalized nanotubes, unfunctionalized nanotubes, functionalized graphene, unfunctionalized graphene, reduced graphene, nanodiamonds or any combination thereof.

6. The cured nanocomposite of claim 1, wherein the cured nanocomposite is characterized as having a tensile strength that is in the range of from 25% to 600% higher than the tensile strength of the resin cured with no nanoparticles.

7. The cured nanocomposite of claim 1, wherein the cured nanocomposite is characterized as having a toughness that is at least 50% higher than the toughness of the resin cured with no nanoparticles.

8. The cured nanocomposite of claim 1, wherein the cured nanocomposite is characterized as having a modulus that is in the range of from 50% to 600% higher than the modulus of the resin cured with no nanoparticles.

9. The cured nanocomposite of claim 1, wherein the cured nanocomposite is characterized as having a strain energy release rate that is in the range of from 50% to 600% higher than the strain energy release rate of the resin cured with no nanoparticles.

10. The cured nanocomposite of claim 1, wherein the cured nanocomposite is characterized as having a strain-to-failure that is in the range of from 50% to 600% higher than the strain-to-failure of the resin cured with no nanoparticles.

11. The cured nanocomposite of claim 1, wherein the cured nanocomposite is characterized as having a damping factor that is in the range of from 50% to 600% higher than the damping factor of the resin cured with no nanoparticles.

12. The cured nanocomposite of claim 1, wherein the reinforcing solvent is one or more of toluene, hexane, 1,4-dioxane, diethylether and chloroform.

13. The cured nanocomposite of claim 1, comprising polyamic acid.

14. The cured nanocomposite of claim 1, comprising one or more reinforcing solvents.

15. The cured nanocomposite of claim 14 wherein said reinforcing solvent comprises dimethyl acetamide.

16. A cured nanocomposite material, comprising:
a cured resin;
nanoparticles dispersed throughout the cured nanocomposite material, wherein the weight fraction of nanoparticles is in the range of from about 0.0005 wt % to less than about 0.1 wt % based on total weight of the cured nanocomposite resin; wherein the nanoparticles comprise one or more of the following nanoparticles: SiC, $TiO_2$, $Y_2O_3$, carbon, Au, Ag, Cu, Ge, Pt, Fe, CoPt, PbS, CdS, CdSe, CdTe, ZnO, PbSe, ZnSe, montmorillonite, vermiculite, hectorite, $CaCO_3$, ferric oxide, or any combination thereof; and
0.1 to 10 wt %, based on total weight of the cured nanocomposite resin one or both of (i) polyamic acid and (ii) a reinforcing solvent.

* * * * *